(12) United States Patent
Chen et al.

(10) Patent No.: US 12,712,963 B2
(45) Date of Patent: Aug. 18, 2026

(54) COMMUNICATION METHOD AND ELECTRONIC DEVICE

(71) Applicant: Honor Device Co., Ltd., Shenzhen (CN)

(72) Inventors: Jiazi Chen, Shenzhen (CN); Feng Ge, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 540 days.

(21) Appl. No.: 18/549,290

(22) PCT Filed: Oct. 21, 2022

(86) PCT No.: PCT/CN2022/126823
§ 371 (c)(1),
(2) Date: Sep. 6, 2023

(87) PCT Pub. No.: WO2024/016503
PCT Pub. Date: Jan. 25, 2024

(65) Prior Publication Data

US 2025/0023979 A1 Jan. 16, 2025

(30) Foreign Application Priority Data

Jul. 18, 2022 (CN) ......................... 202210839098.4

(51) Int. Cl.
*H04M 1/72469* (2021.01)
*H04W 8/18* (2009.01)

(52) U.S. Cl.
CPC ....... *H04M 1/72469* (2021.01); *H04W 8/183* (2013.01); *H04M 2250/66* (2013.01)

(58) Field of Classification Search
None
See application file for complete search history.

(56) References Cited

U.S. PATENT DOCUMENTS 9,245,441 B1 1/2016 Poojary
11,083,036 B1 8/2021 Weksler et al.
2010/0263015 A1 10/2010 Pandey et al.
(Continued)

FOREIGN PATENT DOCUMENTS

CN 101064748 A 10/2007
CN 101646145 A 2/2010
(Continued)

*Primary Examiner* — Jinsong Hu
*Assistant Examiner* — Alexander J Yi
(74) *Attorney, Agent, or Firm* — Slater Matsil, LLP

(57) ABSTRACT

This application provides a communication method and an electronic device, and relates to the field of terminal technologies. A first device displays a first interface, where the first interface includes a plurality of dialing options and a first number, the plurality of dialing options include an option of a first SIM card and an option of a second SIM card, the first SIM card is configured in the second device, the second SIM card is configured in the third device, and the first device, the second device, and the third device belong to a same local area network; and in response to a first operation on the option of the first SIM card, the first device displays a second interface, and sends a dialing instruction to the second device to trigger the second device to send a session request to a fourth device.

13 Claims, 52 Drawing Sheets

(56) References Cited

U.S. PATENT DOCUMENTS

| | | | | |
|---|---|---|---|---|
| 2012/0076291 | A1 | 3/2012 | Bhogal et al. | |
| 2012/0209950 | A1 | 8/2012 | Zhong et al. | |
| 2016/0337826 | A1* | 11/2016 | Baek | H04W 4/16 |

FOREIGN PATENT DOCUMENTS

| | | | | | |
|---|---|---|---|---|---|
| CN | 104702777 | A | * | 6/2015 | |
| CN | 105450866 | A | | 3/2016 | |
| CN | 105515619 | A | | 4/2016 | |
| CN | 107147793 | A | | 9/2017 | |
| CN | 106851023 | B | * | 12/2019 | H04M 1/72403 |
| CN | 111742564 | A | * | 10/2020 | H04W 4/16 |
| CN | 113572731 | A | | 10/2021 | |
| CN | 114500716 | A | | 5/2022 | |
| CN | 114584734 | A | | 6/2022 | |
| CN | 114928831 | A | | 8/2022 | |
| EP | 2375709 | B1 | | 1/2018 | |
| WO | WO-2020224486 | A1 | * | 11/2020 | H04M 1/72484 |

* cited by examiner

COMMUNICATION METHOD AND ELECTRONIC DEVICE

CROSS-REFERENCE TO RELATED APPLICATIONS

This application is a national stage of International Application No. PCT/CN2022/126823, filed on Oct. 21, 2022, which claims priority to Chinese Patent Application No. 202210839098.4, filed on Jul. 18, 2022. The disclosures of both of the aforementioned applications are hereby incorporated by reference in their entireties.

TECHNICAL FIELD

This application relates to the field of terminal technologies, and in particular, to a communication method and an electronic device.

BACKGROUND

Currently, users have increasingly more types and quantities of electronic devices, for example, one user may simultaneously have three electronic devices: a smartphone, a tablet computer, and a notebook computer. Certainly, not all electronic devices are configured with a subscriber identity module (subscriber identity module, SIM) card. For example, generally, a mobile phone is configured with a SIM card, but a tablet computer is configured with no SIM card. In other words, not all devices can be used to directly make a call.

As a result, if a user needs to make a call during use of an electronic device, such as a tablet computer, configured with no SIM card, the user needs to replace the used device. In other words, it is extremely inconvenient to make a call during use of an electronic device configured with no SIM card.

SUMMARY

Embodiments of this application provide a communication method and an electronic device, to resolve a dialing problem of an electronic device configured with no SIM card, thereby improving human-computer interaction efficiency in making a call.

According to a first aspect, an embodiment of this application provides a communication method, and the method includes: A first device displays a first interface, where the first interface includes a plurality of dialing options and a first number, the plurality of dialing options include an option of a first SIM card and an option of a second SIM card, the first SIM card is configured in the second device, the second SIM card is configured in the third device, and the first device, the second device, and the third device belong to a same local area network; and in response to a first operation on the option of the first SIM card, the first device displays a second interface, and sends a dialing instruction to the second device to trigger the second device to send a session request to a fourth device, where a third SIM card corresponding to the first number is configured in the fourth device, and the second interface includes the first number.

For example, the first number corresponds to the third SIM card in the fourth device. The first number may be a phone number corresponding to the third SIM card, or may be a contact identifier indicating the third SIM card. The second interface may be a dialing waiting interface. The first number is displayed in the second interface to prompt a user that establishment of a session with the corresponding fourth device is being requested.

In the foregoing embodiment, the plurality of dialing options include the option of the first SIM card and the option of the second SIM card. The first SIM card and the second SIM card are from different devices, for example, the first SIM card is from the second device, and the second SIM card is from the third device. In this way, during display of the first interface by the first device, a user may select, by using the first device, SIM cards from different devices to dial the first number. For example, in response to the first operation on the option of the first SIM card, the first device determines that the user selects the first SIM card of the second device to dial the first number. Then, the first device can display the second interface, and indicate the second device to request to establish a session with the fourth device. In this way, even if no SIM card is configured in the first device, the user can select different devices to assist in completing dialing without changing the first device that is being used, thereby improving human-computer efficiency in making a call.

In some embodiments, before the first device displays the first interface, the method further includes: The first device displays a third interface, where the third interface includes a dialing key and the first number; and that the first device displays a first interface includes: the first device displays the first interface in response to a second operation on the dialing key, where the first interface further includes a first window, and the first window displays the option of the first SIM card and the option of the second SIM card.

It may be understood that, the first device, the second device, and the third device need to be in a same local area network, so that the first device can perform dialing by using the first SIM card or the second SIM card. To be specific, during display of the first interface, the first device needs to determine, through querying, that the first device, the second device, and the third device are in a same local area network. In this way, a user can be prevented from selecting an unavailable SIM card to perform dialing.

In the foregoing embodiment, in response to the operation on the dialing key, the first device displays the option of the first SIM card and the option of the second SIM card in a form of the first window. This only requires the first device to determine, before displaying the first window, that the first device, the second device, and the third device are in a same local area network.

In some embodiments, if no SIM card is configured in the first device, after the first device exits the local area network, the method further includes: The first device displays a home screen in response to a third operation; during display of the home screen, the first device displays a fourth interface in response to a fourth operation of enabling a phone application, where the fourth interface includes a first pop-up box, and the first pop-up box is used to prompt a user that dialing cannot be performed temporarily; and during display of the fourth interface, the first device cancels, in response to a tap operation, display of the first pop-up box.

In some embodiments, after display of the first pop-up box is cancelled, the method further includes: The first device displays the first pop-up box again in response to a call making operation in the fourth interface.

In some embodiments, the third interface includes a first call record, the first call record is a call record between the first SIM card and the third SIM card, and the method further includes: During display of the third interface, in response to an operation on the first call record, the first device displays the second interface, and sends the dialing instruction to the second device to trigger the second device to send the session request to the fourth device.

In the foregoing embodiment, when the first device can use the first SIM card, in response to the operation on the first call record, the first device can directly select the first SIM card to perform dialing to implement one-click callback, thereby improving human-computer interaction efficiency during dialing.

In some embodiments, after the second device exits the local area network, the method further includes: During display of the third interface, the first device displays a second window in response to the operation on the first call record, where the second window includes the option of the second SIM card and second prompt information, and the second prompt information indicates that the first SIM card is unavailable.

In the foregoing embodiment, in a scenario in which one-click callback cannot be performed, a user may be prompted in a timely manner to select another SIM card to perform dialing.

In some embodiments, the third interface includes a first call record, the first call record is a call record between the first SIM card and the third SIM card, and the method further includes: During display of the third interface, the first device displays a third window in response to an operation on the first call record, where the third window includes the option of the first SIM card and the option of the second SIM card.

In some embodiments, after the second device exits the first local area network, the method further includes: During display of the third interface, the first device displays a fourth window in the third interface in response to the second operation on the dialing key, where the fourth window includes the option of the second SIM card and does not include the option of the first SIM card; and in response to an operation on the option of the second SIM card, the first device displays a fifth interface, and sends a dialing instruction to the third device to trigger the third device to send a session request to the fourth device.

In some embodiments, the method further includes: When dialing performed by using the first SIM card fails, a second pop-up box in the second interface of the first device, where the second pop-up box indicates a dialing failure.

For example, the dialing failure may be a failure caused when the second device refuses to respond to the dialing instruction, or may be a failure in sending the session request to the fourth device by the second device.

In some embodiments, before the first device displays the first interface, the method further includes: The first device displays a home screen, where the home screen includes a first icon corresponding to a phone application; and that the first device displays a first interface includes: the first device displays the first interface in response to an operation on the first icon.

In the foregoing embodiment, the first device may continuously query, starting from enabling of the phone application, a device that belongs to a same local area network as the first device; and when determining that the first device, the second device, and the third device belong to a same local area network, display the first interface that includes the option of the first SIM card and the option of the second SIM card.

In some embodiments, the method further includes: During display of the first interface, in response to a fifth operation on the option of the second SIM card, the first device displays a fifth interface, and sends a dialing instruction to the third device to trigger the third device to send a session request to the fourth device.

In some embodiments, if a fourth SIM card is configured in the first device, the method further includes: The first device displays a sixth interface, where the sixth interface includes a third option and a navigation bar, and the third option corresponds to the default dialing card; and if the default dialing card is the first SIM card, in response to a sixth operation on the third option, the first device displays the second interface, and sends the dialing instruction to the second device to trigger the second device to send the session request to the fourth device.

In the foregoing embodiment, as a quantity of SIM cards that can be used by the first device increases, the first device can switch from displaying the first interface to displaying the sixth interface. In this scenario, the first device can perform dialing by using the default dialing card in response to the operation on the third option, to reduce operations of selecting a SIM card by a user, thereby improving human-computer interaction efficiency.

In some embodiments, if a fourth SIM card is configured in the first device, the method further includes: The first device displays a sixth interface, where the sixth interface includes a third option and a navigation bar; the first device displays a fifth window in response to an operation on the navigation bar, where the fifth window includes the option of the first SIM card, the option of the second SIM card, and an option of the fourth SIM card; in response to an operation on the option of the second SIM card, the first device sets the second SIM card as a default dialing card, and displays the sixth interface again; and in response to the sixth operation on the third option, the first device displays a fifth interface, and sends a dialing instruction to the third device to trigger the third device to send a session request to the fourth device.

In some embodiments, after the first device displays the second interface, the method further includes: The first device displays a seventh interface after a session is established between the second device and the fourth device; the first device receives first call data sent by the second device, where the first call data is sent by the fourth device to the second device by using a mobile communication network; the first device plays voice data corresponding to the first call data; and the first device sends second call data to the fourth device by using the second device.

According to a second aspect, an embodiment of this application provides an electronic device. The electronic device includes one or more processors and a memory. The memory is coupled to the processor, the memory is configured to store computer program code, and the computer program code includes computer instructions. When the one or more processors execute the computer instructions, the one or more processors are configured to: display a first interface, where the first interface includes a plurality of dialing options and a first number, the plurality of dialing options include an option of a first SIM card and an option of a second SIM card, the first SIM card is configured in the second device, the second SIM card is configured in the third device, and the electronic device, the second device, and the third device belong to a same local area network; and in response to a first operation on the option of the first SIM card, display a second interface, and send a dialing instruction to the second device to trigger the second device to send a session request to a fourth device, where a third SIM card corresponding to the first number is configured in the fourth device, and the second interface includes the first number.

In some embodiments, the one or more processors are further configured to: display a third interface, where the third interface includes a dialing key and the first number; and display the first interface in response to a second operation on the dialing key, where the first interface further includes a first window, and the first window displays the option of the first SIM card and the option of the second SIM card.

In some embodiments, if no SIM card is configured in the electronic device, after the electronic device exits the local area network, the one or more processors are further configured to: display a home screen in response to a third operation; during display of the home screen, display a fourth interface in response to a fourth operation of enabling a phone application, where the fourth interface includes a first pop-up box, and the first pop-up box is used to prompt a user that dialing cannot be performed temporarily; and during display of the fourth interface, cancel, in response to a tap operation, display of the first pop-up box.

In some embodiments, after cancelling display of the first pop-up box, the one or more processors are further configured to display the first pop-up box again in response to a call making operation in the fourth interface.

In some embodiments, the third interface includes a first call record, the first call record is a call record between the first SIM card and the third SIM card, and the one or more processors are further configured to: during display of the third interface, in response to an operation on the first call record, display the second interface, and send the dialing instruction to the second device to trigger the second device to send the session request to the fourth device.

In some embodiments, after the second device exits the local area network, the one or more processors are further configured to: during display of the third interface, display a second window in response to the operation on the first call record, where the second window is used to display the option of the second SIM card and second prompt information, and the second prompt information indicates that the first SIM card is unavailable.

In some embodiments, the third interface includes a first call record, the first call record is a call record between the first SIM card and the third SIM card, and the one or more processors are further configured to: during display of the third interface, display a third window for an operation on the first call record, where the third window includes the option of the first SIM card and the option of the second SIM card.

In some embodiments, after the second device exits the first local area network, the one or more processors are further configured to: during display of the third interface, display a fourth window in the third interface in response to the second operation on the dialing key, where the fourth window includes the option of the second SIM card and does not include the option of the first SIM card; and in response to an operation on the option of the second SIM card, display a fifth interface, and send a dialing instruction to the third device to trigger the third device to send a session request to the fourth device.

In some embodiments, the one or more processors are further configured to: when dialing performed by using the first SIM card fails, a second pop-up box in the second interface, where the second pop-up box indicates a dialing failure.

In some embodiments, before displaying the first interface, the one or more processors are further configured to: display a home screen, where the home screen includes a first icon corresponding to a phone application; and display the first interface in response to an operation on the first icon.

In some embodiments, the one or more processors are further configured to: during display of the first interface, in response to a fifth operation on the option of the second SIM card, display a fifth interface, and send a dialing instruction to the third device to trigger the third device to send a session request to the fourth device.

In some embodiments, if a fourth SIM card is configured in the electronic device, the one or more processors are further configured to: display a sixth interface, where the sixth interface includes a third option and a navigation bar, and the third option corresponds to the default dialing card; and if the default dialing card is the first SIM card, in response to a sixth operation on the third option, display the second interface, and send the dialing instruction to the second device to trigger the second device to send the session request to the fourth device.

In some embodiments, if a fourth SIM card is configured in the electronic device, the one or more processors are further configured to: display a sixth interface, where the sixth interface includes a third option and a navigation bar; display a fifth window in response to an operation on the navigation bar, where the fifth window includes the option of the first SIM card, the option of the second SIM card, and an option of the fourth SIM card; in response to an operation on the option of the second SIM card, set the second SIM card as a default dialing card, and display the sixth interface again; and in response to the sixth operation on the third option, display a fifth interface, and send a dialing instruction to the third device to trigger the third device to send a session request to the fourth device.

In some embodiments, after displaying the second interface, the one or more processors are further configured to: display a seventh interface after a session is established between the second device and the fourth device; receive first call data sent by the second device, where the first call data is sent by the fourth device to the second device by using a mobile communication network; play voice data corresponding to the first call data; and send second call data to the fourth device by using the second device.

According to a third aspect, an embodiment of this application provides a computer storage medium, including computer instructions. When the computer instructions are run on an electronic device, the electronic device is enabled to perform the method according to the first aspect and the possible embodiments of the first aspect.

According to a fourth aspect, this application provides a computer program product. When the computer program product runs on the foregoing electronic device, the electronic device is enabled to perform the method according to the first aspect and the possible embodiments of the first aspect.

It may be understood that the electronic device, the computer storage medium, and the computer program product provided in the foregoing aspects are all applied to the corresponding method provided above. Therefore, for beneficial effects that can be achieved by the electronic device, the computer storage medium, and the computer program product, refer to the beneficial effects in the corresponding method provided above. Details are not described herein again.

DETAILED DESCRIPTION OF ILLUSTRATIVE EMBODIMENTS

Figure 1:
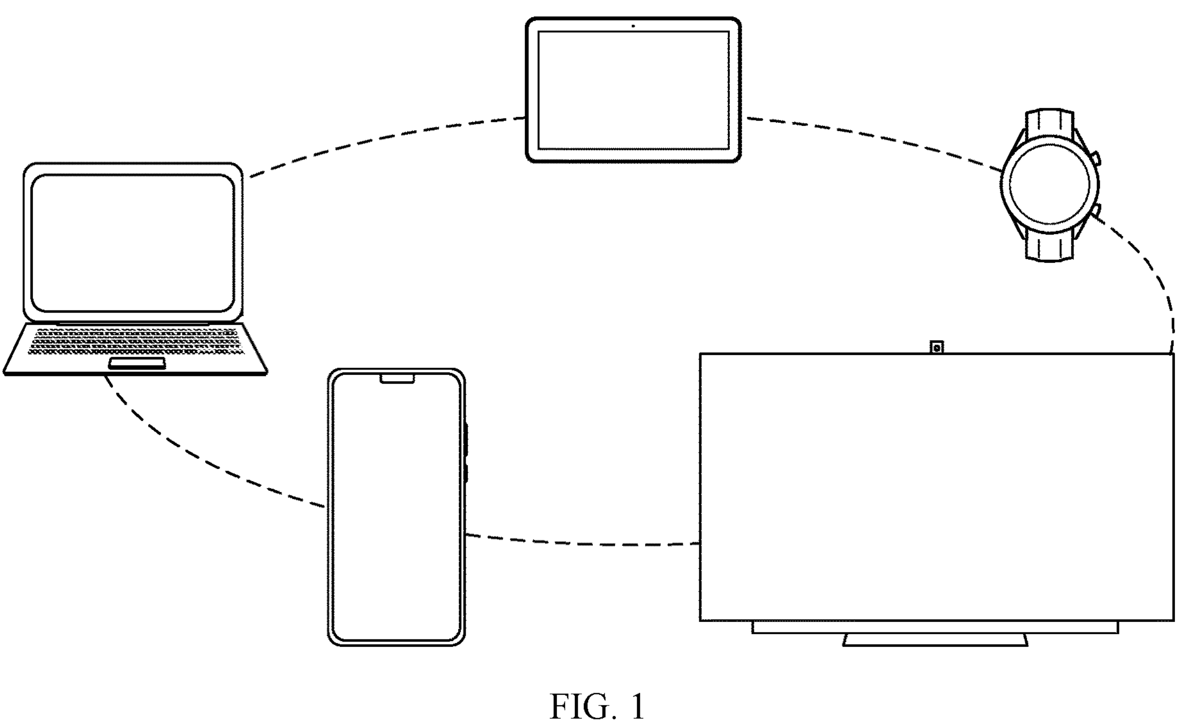
FIG. 1 is a schematic diagram of a structure of a trust system according to an embodiment of this application.

Embodiments of this application provide a communication method, applied to a trust system shown in FIG. 1. The trust system includes a plurality of electronic devices. The plurality of electronic devices have a trust relationship (for example, any two devices have a trust relationship), and belong to a same local area network. In this way, the plurality of electronic devices can collaboratively implement a same service, for example, collaboratively implement a call service, a screen projection service, or a remote control service.

For example, the electronic device may be an intelligent electronic device, for example, a mobile phone, a tablet computer, a handheld computer, a PC, a cellular phone, a personal digital assistant (personal digital assistant, PDA), a wearable device (for example, a smartwatch), a smart large screen, a game console, and an augmented reality (augmented reality, AR)\virtual reality (virtual reality, VR) device.

In some embodiments, a trust relationship between a plurality of electronic devices may be established in a manner such as account authentication or device authorization.

For example, when a device a and a device b log in to a same system authentication account, it may be determined that a trust relationship exists between the device a and the device b. The system authentication account may be a registration account provided by a cloud server.

In some examples, a device manager/out of box experience (out of box experience, OOBE) application may be installed on the device a. The device manager/OOBE application may schedule an account management assembly. The account management assembly may be configured to implement functions such as registration, login, and management of a system authentication account. In this way, a user may operate the device manager/OOBE application to indicate the device a to log in to a specified system authentication account, for example, a system authentication account a.

Figure 2:
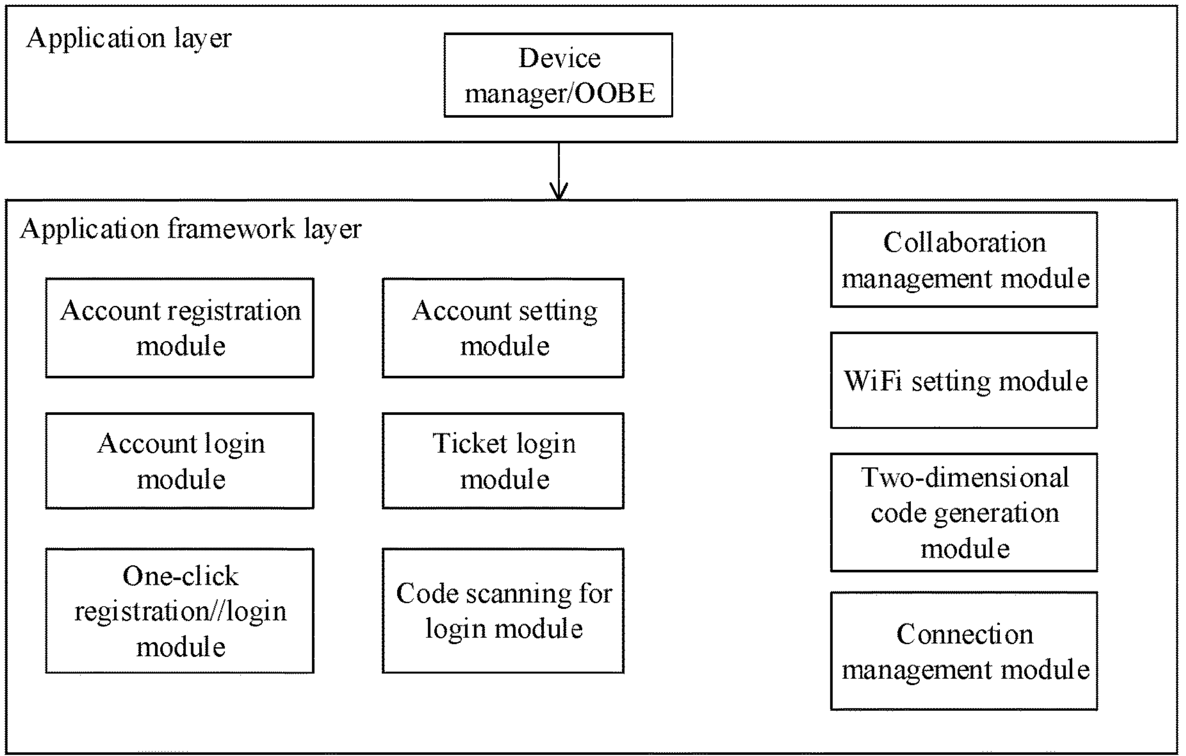
FIG. 2 is a schematic diagram of a software structure of an electronic device according to an embodiment of this application.

In an implementation, as shown in FIG. 2, an application layer of the device a includes the device manager/OOBE application, and an application framework layer of the device a includes the account management assembly. The account management assembly may include an account registration module, an account setting module, an account login module, a ticket (Ticket) login module, a one-click registration/login module, a code scanning for login module, a collaboration management module, a WiFi setting module, a two-dimensional code generation module, and a connection management module. It may be understood that division of the foregoing functional modules is merely an example. In actual application, the foregoing functions may be allocated to different functional modules for implementation based on a requirement.

The account registration module is configured to implement registration of a system authentication account. If the device a receives, during running of the device manager/OOBE application, an operation indicating to register an account, the device manager/OOBE application may schedule the account registration module, and indicate the account registration module to interact with the cloud server, to complete registration of a system authentication account.

The account setting module is configured to receive a system authentication account entered by a user to obtain a specified system authentication account, for example, the system authentication account a.

The account login module is configured to log in to a specified system authentication account. For example, during running of the device manager/OOBE application, the account login module may receive an account verification code (for example, a password), and send the specified system authentication account and the account verification code to the cloud server, to verify whether the specified system authentication account and the account verification code match each other. When determining that the specified system authentication account and the account verification code match each other, the account login module may determine that the device a completes login to the specified system authentication account.

The one-click registration/login module is configured to implement a one-click login function. For example, during running of the device manager/OOBE application, when the device a receives an operation that is of a user and that indicates to perform one-click login or one-click registration, the device manager/OOBE application may schedule the one-click registration/login module to directly log in to a bound system authentication account or directly and automatically register an account. The bound system authentication account may be a system authentication account that the device a has recently logged in to.

The Ticket login module is configured to implement a single sign-on function.

The code scanning for login module is configured to implement a scanning for login function. For example, during running of the device manager/OOBE application, when the device a receives an operation indicating to perform scanning for login, the code scanning for login module indicates the device a to display a scanning interface and enable a code scanning mode. In the scanning mode, the device a may scan a two-dimensional code that carries account information. The account information may include a login credential (for example, an account and a password) corresponding to a system authentication account. After obtaining the account information through scanning, the code scanning for login module sends the account information to the cloud server, so that the cloud server performs verification, for example, verifies whether the system authentication account included in the account information is a valid account, and verifies whether the system authentication account matches the password. When determining that the system authentication account is valid and matches the password, the cloud server feeds back verification success information to the device a. In this way, the code scanning for login module of the device a may respond to the verification success information to indicate to display a login success interface.

The collaboration management module is configured to assist another device in logging in to a system authentication account that the device a currently logs in to, for example, the system authentication account a. For example, during running of the device manager/OOBE application, if the device a detects that a distance between the device a and a new device (a device in an OOBE startup phase) is less than a specified value (for example, an effective distance value in near field communication), or detects that the device a is contact with a new device, the device a may synchronize the system authentication account a to the new device. In this way, the new device can log in to the system authentication account a.

The WiFi setting module is configured to assist another device in logging in to a WiFi network to which the device a currently belongs. The two-dimensional code generation module is configured to generate a two-dimensional code based on the system authentication account a, and indicate the device a to display the two-dimensional code. The two-dimensional code carries account information, and the account information includes a login credential of the system authentication account a. The connection management module is configured to manage a connection between devices that log in to a same system authentication account.

In addition, the application framework layer may further include a call service module and a device profile (Device Profile) module. Functions implemented by the foregoing modules and implementation principles are described in subsequent embodiments, and details are not described herein.

Certainly, FIG. 2 shows only the application layer and the application framework layer of the device a. It may be understood that, in addition to the application layer and the application framework layer, a software architecture of the electronic device may further include other layers, for example, a kernel library and android runtime (libraries & android runtime) layer, and a kernel (Kernel) layer (also referred to as a driver layer). Each layer has a clear role and task. The layers communicate with each other through a software interface. For details, refer to a related technology. Details are not described herein.

Similarly, the device manager/OOBE application may also be installed in the device b. A user may operate the device manager/OOBE application to indicate the device b to log in to a specified system authentication account, for example, a system authentication account b.

When the system authentication account a to which the device a logs in is the same as the system authentication account b to which the device b logs in, it may be determined that a trust relationship exists between the device a and the device b.

For another example, when a mutual authentication operation (for example, an authorization operation) is performed between the device a and the device b, it may also be determined that there is a trust relationship between the device a and the device b.

In addition, as shown above, all electronic devices in the trust system belong to a same local area network. In this way, data exchange between devices is more reliable, stable, and rapid. For example, the local area network may be a short-range communication network, for example, a wifi hotspot network, a wifi P2P network, a Bluetooth network, a zigbee network, or a near field communication (near field communication, NFC) network.

For example, a mobile phone and a notebook computer log in to a same system authentication account, for example, an Honor system account, and it may be determined that a trust relationship exists between the mobile phone and the notebook computer. On the premise that there is a trust relationship, the mobile phone and the notebook computer join a same local area network. For example, when the notebook computer joins a WiFi hotspot network created by the mobile phone, it may be determined that the mobile phone and the notebook computer belong to a same trust system.

In some possible embodiments, the electronic devices in the trust system may alternatively separately access different local area networks, and different local area networks may communicate with each other. In other words, a networking manner of the devices in the trust system is not specifically limited, provided that it is ensured that the devices in the trust system can communicate with each other.

In some embodiments, the electronic devices in the trust system may change dynamically. A trust system that includes a mobile phone and a notebook computer is used as an example. After the notebook computer exits a local area network that includes the mobile phone, a trust system corresponding to the mobile phone does not include the notebook computer. Alternatively, after a trust relationship between the notebook computer and the mobile phone is invalid, for example, after system authentication accounts to which the notebook computer and the mobile phone log in change to different accounts, a trust system corresponding to the mobile phone does not include the notebook computer. For another example, in a scenario in which a tablet computer and the mobile phone also log in to a same system authentication account, after the tablet computer joins the local area network that includes the mobile phone, the tablet computer joins a trust network corresponding to the mobile phone.

In addition, in a trust system, any electronic device can publish a collaborative task to another device. In this way, the another device can also respond to the collaborative task to collaboratively complete the task.

An example in which an electronic device publishes a collaborative call task in a trust system is used. The trust system includes a mobile phone, a tablet computer, and a notebook computer. A subscriber identity module (subscriber identity module, SIM) card is configured in the mobile phone, and the mobile phone may be used to answer a call from another person, that is, the mobile phone may receive incoming call request information, which is referred to as an incoming call. However, no SIM card is configured in the tablet computer and the notebook computer.

In a scenario in which the mobile phone receives an incoming call, the mobile phone may publish a collaborative incoming call task to the notebook computer and the tablet computer. In this way, in response to the collaborative incoming call task, the notebook computer and the tablet computer may also remind an incoming call, for example, start ringing, vibrate, or display a reminder interface. In this way, even if the mobile phone is not around a user, another device may also prompt the user to answer an incoming call, to avoid missing an incoming call.

In addition, the tablet computer (or the notebook computer) may indicate the mobile phone to collaboratively complete a task of making a call, which is referred to as an outgoing call. To be specific, the mobile phone is indicated to perform dialing based on the configured SIM card, and after getting through, the mobile phone transfers call data to the tablet computer (or the notebook computer). For example, a user may operate the tablet computer to make, by using a mobile phone 1, a call to a mobile phone 2 configured with a SIM card. To be specific, the tablet computer may receive an operation that is of the user and that indicates to make a call to the mobile phone 2, and in response to the operation, send a collaborative dialing request to the mobile phone 1 by using a local area network, to indicate the mobile phone 1 to perform a dialing task. To be specific, after receiving the collaborative dialing request, the mobile phone 1 sends incoming call request information 1 to the mobile phone 2 based on a SIM card configured in the mobile phone 1. After the mobile phone 2 answers an incoming call indicated by the incoming call request information 1, the mobile phone 2 may encode collected audio data 1 into call data 1, and send the call data 1 to the mobile phone 1 by using a mobile communication network. After the mobile phone 1 receives the call data 1, the mobile phone 1 may decode the call data 1 to obtain the audio data 1. Then, the mobile phone 1 may send the audio data 1 to the tablet computer by using the local area network. In this way, after receiving the audio data 1, the tablet computer may play the audio data 1. In addition, a microphone of the tablet computer may also collect audio data 2, and send the audio data 2 to the mobile phone 1 by using the local area network. After receiving the audio data 2, the mobile phone 1 encodes the audio data 2 into call data 2. Then, the mobile phone 1 may send the call data 2 to the mobile phone 2 by using the mobile communication network. In this way, the user may also make a call by using the tablet computer configured with no SIM card.

In this way, after joining a trust system, an electronic device, such as a tablet computer or a notebook computer configured with no SIM card, that does not support separately making a call, may make a call by using another device such as a mobile phone in the trust system, to improve a device restriction of a call making service, thereby improving human-computer interaction efficiency in making a call by a user.

The following describes a hardware structure of an electronic device in a trust system by using an example in which the electronic device is a mobile phone.

Figure 3:
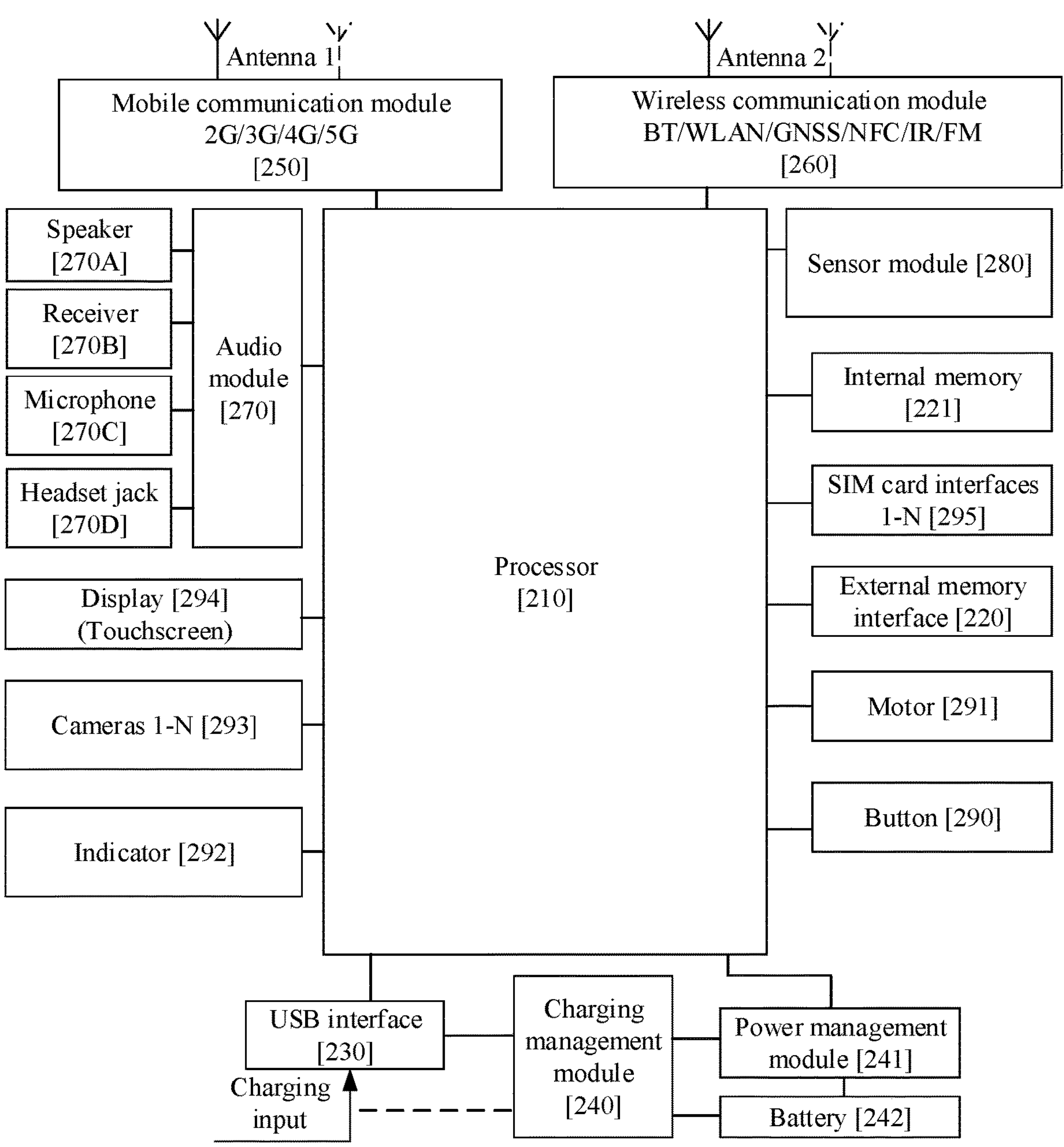
FIG. 3 is an example diagram of a software structure and a hardware structure of an electronic device according to an embodiment of this application.

As shown in FIG. 3, the electronic device (for example, a mobile phone) may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, and a SIM card interface 295.

The sensor module 280 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the structure shown in this embodiment does not specifically limit the electronic device. In some other embodiments, the electronic device may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device. The controller may generate an operation control signal based on instruction operation code and a timing signal, to control instruction fetching and instruction execution.

The memory may be further disposed in the processor 210 to store instructions and data. In some embodiments, the memory in the processor 210 is a cache. The memory may store instructions or data that is just used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that, an interface connection relationship between the modules shown in this embodiment is merely an example for description, and does not constitute a limitation on the structure of the electronic device. In some other embodiments, the electronic device may alternatively use an interface connection manner different from that in the foregoing embodiment, or use a combination of a plurality of interface connection manners.

The charging management module 240 is configured to receive a charging input from a charger. The charger may be a wireless charger, or may be a wired charger. When charging the battery 242, the charging management module 240 may further supply power to the electronic device by using the power management module 241.

The power management module 241 is configured to connect the battery 242 and the charging management module 240 to the processor 210. The power management module 241 receives an input from the battery 242 and/or an input from the charging management module 240, to supply power to the processor 210, the internal memory 221, an external memory, the display 294, the camera 293, the wireless communication module 260, and the like. In some embodiments, the power management module 241 and the charging management module 240 may alternatively be disposed in a same component.

A wireless communication function of the electronic device may be implemented by using the antenna 1, the antenna 2, the mobile communication module 250, the wireless communication module 260, the modem processor, the baseband processor, and the like. In some embodiments, in the electronic device, the antenna 1 is coupled to the mobile communication module 250, and the antenna 2 is coupled to the wireless communication module 260, so that the electronic device can communicate with a network and another device such as a wearable device by using a wireless communication technology.

The antenna 1 and the antenna 2 are configured to transmit and receive an electromagnetic wave signal. Each antenna in the electronic device may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 250 may provide a solution for wireless communication including 2G/3G/4G/5G and the like applied to the electronic device. The mobile communication module 250 may include at least one filter, switch, power amplifier, low noise amplifier (low noise amplifier, LNA), and the like. The mobile communication module 250 may receive an electromagnetic wave through the antenna 1, perform processing such as filtering and amplification on the received electromagnetic wave, and send a processed electromagnetic wave to the modem processor for demodulation.

The mobile communication module 250 may further amplify a signal modulated by the modem processor, and convert the signal into an electromagnetic wave through the antenna 1 for radiation. In some embodiments, at least some functional modules of the mobile communication module 250 may be disposed in the processor 210. In some embodiments, at least some functional modules of the mobile communication module 250 and at least some modules of the processor 210 may be disposed in a same component.

The wireless communication module 260 may provide a solution for wireless communication including a WLAN (for example, a (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the electronic device.

The GNSS may include a BeiDou navigation satellite system (beidou navigation satellite system, BDS), a global positioning system (global positioning system, GPS), a global navigation satellite system (global navigation satellite system, GLONASS), a quasi-zenith satellite system (quasi-zenith satellite system, QZSS), and/or a satellite based augmentation system (satellite based augmentation systems, SBAS).

The wireless communication module 260 may be one or more components integrated with at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave through the antenna 2 for radiation.

The electronic device implements a display function by using the GPU, the display 294, the application processor, and the like. The GPU is a microprocessor for image processing, and is connected to the display 294 and the application processor. The GPU is configured to perform mathematical and geometric calculation for graphics rendering. The processor 210 may include one or more GPUs that execute program instructions to generate or change displayed information.

The display 294 is configured to display an image, a video, and the like. The display 294 includes a display panel.

The electronic device may implement a photographing function by using the ISP, the camera 293, the video codec, the GPU, the display 294, the application processor, and the like. The ISP is configured to process data fed back by the camera 293. The camera 293 is configured to capture a still image or a video. In some embodiments, the electronic device may include one or N cameras 293, where N is a positive integer greater than 1.

The external memory interface 220 may be configured to connect to an external storage card, for example, a Micro SD card, to extend a storage capability of the electronic device. The external storage card communicates with the processor 210 through the external memory interface 220 to implement a data storage function, for example, files such as music and videos are stored in the external storage card.

The internal memory 221 may be configured to store computer-executable program code, and the executable program code includes instructions. The processor 210 runs the instructions stored in the internal memory 221 to perform various functional applications and data processing of the electronic device. For example, in this embodiment of this application, the processor 210 may execute instructions stored in the internal memory 221. The internal memory 221 may include a program storage area and a data storage area.

The program storage area may store an operating system, an application required by at least one function (for example, a sound playing function or an image playing function), and the like. The data storage area may store data (for example, audio data and a phone book) and the like created during use of the electronic device. In addition, the internal memory 221 may include a high-speed random access memory, and may further include a non-volatile memory, for example, at least one magnetic disk memory, a flash memory device, or a universal flash storage (universal flash storage, UFS).

It may be understood that the structure shown in this embodiment of this application does not constitute a specific limitation on the electronic device. In some other embodiments of this application, the electronic device may include more or fewer components than those shown in the figure, or combine some components, or split some components, or have different component arrangements. The components shown in the figure may be implemented by hardware, software, or a combination of software and hardware.

The communication method provided in the embodiments of this application may be implemented in a device, such as a first device, that has the foregoing hardware structure. The following describes in detail implementations of the embodiments of this application with reference to the accompanying drawings.

In the embodiments of this application, after logging in to a first authentication account, the first device (for example, a tablet computer) may actively discover a surrounding electronic device, and determine whether there is a trust relationship between the first device and the surrounding electronic device.

Figure 4:
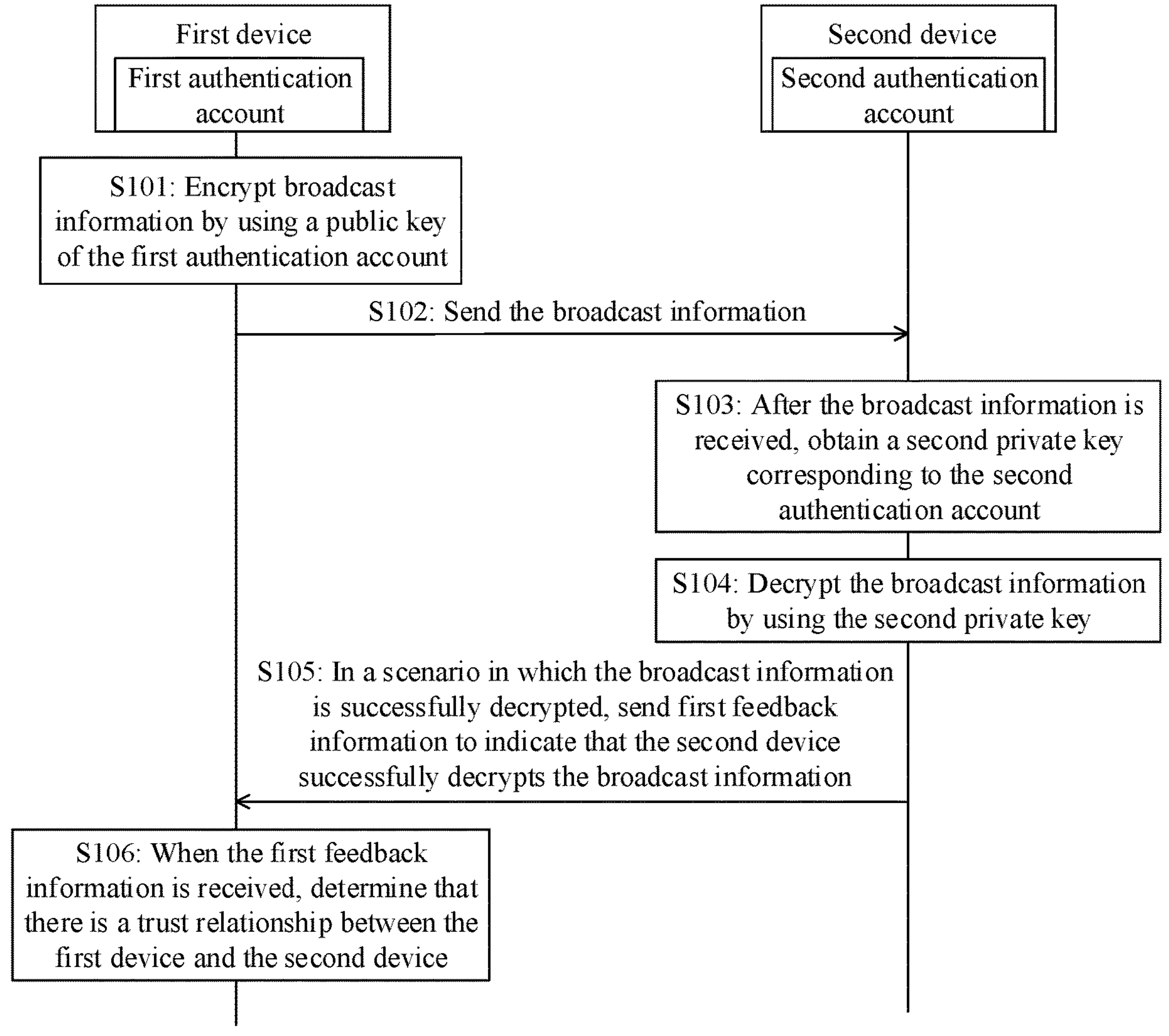
FIG. 4 is a first diagram of a step procedure of a communication method according to an embodiment of this application.

In some embodiments, as shown in FIG. 4, the method includes the following steps.

S101: The first device encrypts broadcast information by using a public key of the first authentication account.

In some embodiments, the broadcast information is used to discover a nearby device. For example, the broadcast information may include the first authentication account.

In addition, the public key corresponding to the first authentication account may be obtained from a cloud server. Each system authentication account registered in the cloud server corresponds to a public key. The public key may be used to encrypt information, such as the broadcast information, associated with the system authentication account. In some embodiments, public keys of all system authentication accounts may be stored in the cloud server. For example, the cloud server stores a first public key corresponding to the first authentication account.

In some embodiments, when logging in to the first authentication account, the first device may obtain the corresponding first public key by sending a public key request to the cloud server. In this way, the first device may encrypt the first authentication account by using the first public key, to obtain the broadcast information. For example, the account may be an Honor account. A mobile phone may first obtain, from an Honor cloud server, a public key corresponding to the logged Honor account, encrypt the Honor account by using the public key, and then generate broadcast information.

S102: The first device sends the broadcast information.

In some embodiments, the first device may send the broadcast information by using a near field communication technology, for example, a Bluetooth technology, broadcast, a WiFi technology, or an NFC technology, to ensure that an electronic device near the first device can accept the broadcast information. For implementation of the near field communication technology, refer to a related technology. Details are not described herein.

In some embodiments, the first device may send the broadcast information to the outside in real time. In some other instances, after a specific scenario is identified, the first device may start to send the broadcast information to the outside. For example, the specific scenario may be that it is identified that the first device changes from a static state to a moving state. For another example, the specific scenario may alternatively be that it is identified that a location of the device changes. For still another example, the specific scenario may alternatively be that the first device receives a first packet sent by an access router. The access router is a wireless access point currently accessed by the first device, and the first packet is a notification packet sent by the access router to the first device after the access router detects access of another device.

When a second device (for example, a mobile phone) exists near the first device, and the second device has enabled a near field communication function (for example, a function such as Bluetooth or NFC), the second device can receive the broadcast information.

In addition, in another embodiment, when the second device shakes synchronously with the first device or when the second device is in contact with the first device, the second device can also receive the broadcast information sent by the first device.

S103: After receiving the broadcast information, the second device obtains a second private key corresponding to a second authentication account.

The second authentication account is a system authentication account to which the second device currently logs in. In addition, it may be understood that, the cloud server not only stores a public key corresponding to a system authentication account, but also stores a private key corresponding to the system authentication account. A public key and a private key that correspond to a same account match each other. In other words, data encrypted by using the public key may be decrypted by using the private key corresponding to the same account.

In some examples, after logging in to the second authentication account, the second device may obtain, from the cloud server, a second private key corresponding to the second authentication account, and store the obtained second private key into a trusted storage location, for example, referred to as a trusted storage area. In this way, the second device can query and use the second private key based on a service requirement. Certainly, after logging in to another system authentication account, the second device may further delete the second private key from the trusted storage area, and download a private key of the another system authentication account from the cloud server. The newly downloaded private key may also be stored into the trusted storage area.

In this way, in this embodiment of this application, after receiving the broadcast information, the second device determines that the broadcast information has encrypted content. Then, the second device may read a stored private key from the trusted storage area, for example, read the second private key.

S104: The second device decrypts the broadcast information by using the second private key.

In some embodiments, if the first authentication account and the second authentication account are a same account, the second private key matches the first public key. In this case, the second device can successfully decrypt the broadcast information by using the second private key. If the first authentication account and the second authentication account are not a same account, the second private key does not match the first public key. In this case, the second device cannot decrypt the broadcast information by using the second private key.

In some embodiments, after successfully decoding the broadcast information, the second device may determine that there is a trust relationship between the second device and the first device. Then, the second device may write the first device into a trusted device list. All devices in the trusted device list are trusted devices of the second device. When the trusted device list includes the first device, the second device may securely receive data sent by the first device, to reduce a possibility of unauthorized access to data.

S105: In a scenario in which the broadcast information is successfully decrypted, the second device sends first feedback information to the first device, to indicate that the second device successfully decrypts the broadcast information.

In some embodiments, the first feedback information may carry an identifier indicating that the decryption succeeds, and certainly, may also carry a system authentication account, for example, the second authentication account, to which the second device currently logs in.

In addition, in a scenario in which the broadcast information is not successfully decrypted, the second device may not respond to the broadcast information, that is, does not send any information to the first device. Alternatively, the second device sends second feedback information to the first device, to indicate that the second device fails to decrypt the broadcast information. The second feedback information may carry an identifier indicating that the decryption fails.

In another embodiment, before the second device sends the first feedback information, the second device may further encrypt the first feedback information by using a public key corresponding to the second authentication account, to improve security of the first feedback information.

S106: When receiving the first feedback information, the first device determines that there is a trust relationship exists with the second device.

In some embodiments, when receiving the first feedback information, the first device may determine that there is a trust relationship between the first device and the second device. Based on this, the first device may write the second device into a trusted device list.

In addition, in a scenario in which the first feedback information is encrypted, the first device may decrypt the first feedback information by using the second private key corresponding to the first authentication account. When the first feedback information is successfully decrypted, the first device determines that there is a trust relationship between the first device and the second device, and writes the second device into the trusted device list. When the trusted device list of the first device includes the second device, the first device may securely receive data sent by the second device, to reduce a possibility of unauthorized access to data.

In this embodiment of this application, after the first device accesses a wireless access point, when a distance between the second device and the first device is less than an effective communication distance (for example, five meters) of Bluetooth, the second device can also access the wireless access point. It may be understood that, after the first device and the second device access a same wireless access point, both a socket (socket) of the first device and a socket of the second device may send request information to the wireless access point. After monitoring connection request information from the first device or the second device, a socket of the wireless access point may establish a communication link between the first device and the second device in response to the request information.

For another example, after accessing the wireless access point, the first device may create a WiFi hotspot network. After the WiFi hotspot network is created, the distance between the second device and the first device is less than the effective communication distance of Bluetooth, and the second device can access the WiFi hotspot network created by the first device. After the second device accesses the WiFi hotspot network, the socket of the first device may monitor request information from the second device. After monitoring a request message from the second device, the socket of the first device may establish a communication link with the second device.

In some examples, when the first device and the second device access a same local area network, whether there is a trust relationship between the first device and the second device may be determined by querying a trusted device list. For example, after accessing a wireless access point, if the first device detects that the second device accesses the wireless access point, the first device may determine, through S101-S106, whether there is a trust relationship between the first device and the second device. Certainly, in another example, if it has been determined, through S101-S106, that there is a trust relationship between the first device and the second device, when system authentication accounts of the first device and the second device are not changed, it is not necessary to repeatedly confirm the trust relationship. Certainly, when the system authentication account of the first device is changed, the first device may clear the trusted device list, and redetermine whether there is a trust relationship between the first device and a peripheral device.

In some scenarios, the first device may access a same local area network with a plurality of electronic devices (referred to as trusted devices) that have a trust relationship with the first device. For example, the first device and each of the second device, a third device, and a fifth device trust each other, and access a same local area network. After accessing the same local area network with the second device, the third device, and the fifth device, the first device may communicate with the second device, the third device, and the fifth device at anytime. In this scenario, a communication system that includes the first device, the second device, the third device, and the fifth device may also be referred to as a trust system.

In some possible embodiments, when the first device, the second device, the third device, and the fifth device access a same local area network, the first device may perform S101-106 in response to an operation that is of a user and that indicates to perform dialing, to determine that there is a trust relationship between the first device and each of the second device, the third device, and the fifth device. Alternatively, the first device may perform S101-106 in response to an operation that is of the user and that indicates to enable a phone application, to determine that there is a trust relationship between the first device and each of the second device, the third device, and the fifth device.

When there is a trust relationship between the first device and each of the second device, the third device, and the fifth device, in response to the operation that is of the user and that indicates to perform dialing, the first device may further determine a trusted device configured with a SIM card from the second device, the third device, and the fifth device. In this way, the first device may indicate any trusted device configured with a SIM card to perform a dialing task, that is, send a call request by using the SIM card configured in the trusted device.

Figure 5:
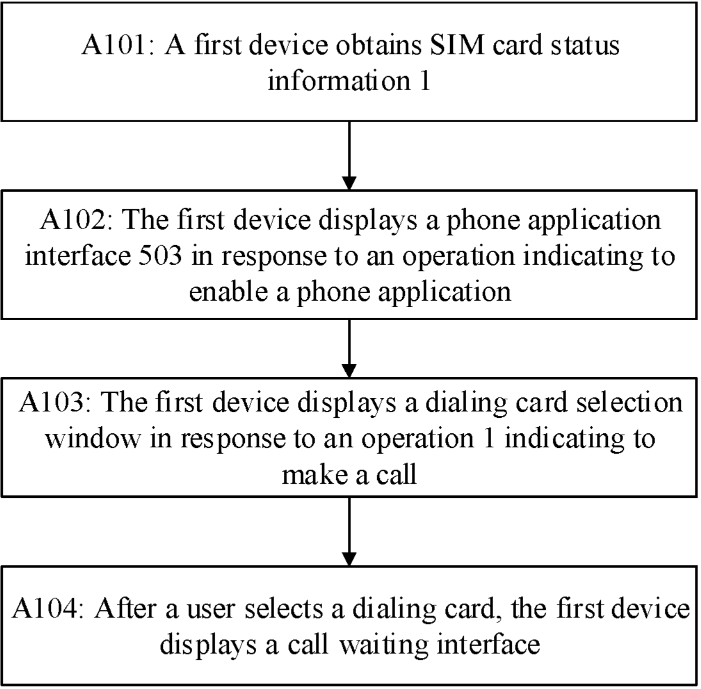
FIG. 5 is a second diagram of a step procedure of a communication method according to an embodiment of this application.

An embodiment of this application provides a communication method. The following describes the communication method by using an example in which the communication method is applied to the trust system that includes the first device, the second device, the third device, and the fifth device. As shown in FIG. 5, the method may include the following steps.

A101: The first device obtains SIM card status information 1.

The SIM card status information 1 includes an identifier indicating whether a SIM card is configured in the first device. For example, when a SIM card is configured in the first device, the SIM card status information 1 includes an identifier m. For another example, if no SIM card is configured in the first device, the SIM card status information 1 includes an identifier b. Certainly, the identifier m is different from the identifier b.

In addition, when the SIM card status message 1 includes the identifier m, that is, in a scenario in which a SIM card is configured in the first device, the SIM card status information 1 may further include related information of the configured SIM card in the first device, for example, information such as a quantity of configured SIM cards in the first device, a number of the SIM card, and an operator to which the SIM card belongs.

The related information of the configured SIM card is merely an example. In another possible embodiment, the related information of the configured SIM card may further include identification information indicating whether each configured SIM card is idle. For example, if a SIM card in the first device is in a call with another device, the SIM card corresponds to a non-idle identifier. For another example, if a SIM card in the first device does not have a call with any device, the SIM card corresponds to an idle identifier.

Figure 6A:
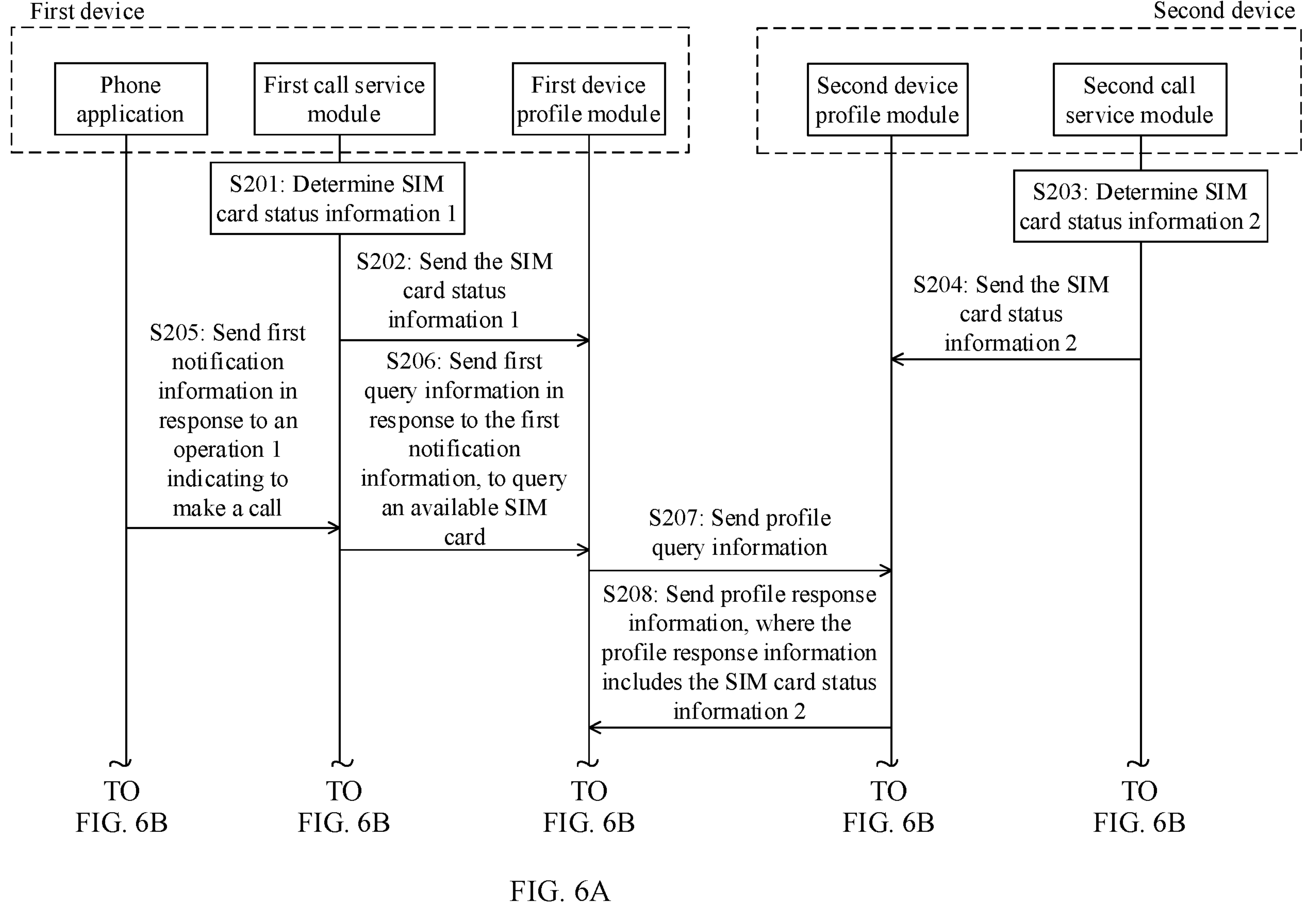
FIG. 6A and FIG. 6B are a third diagram of a step procedure of a communication method according to an embodiment of this application.

For example, as shown in FIG. 6A, the first device includes a phone application program (referred to as a phone application), a first call service module, and a first Device Profile module. The phone application belongs to an application layer of the first device. The first call service module and the first Device Profile module belong to an application framework layer of the first device. The phone application may receive an operation of a user, and schedule a module (for example, the first call service module or the first Device Profile module) at the application framework layer, to implement a call service indicated by the operation. The first call service module is configured to manage a call service of the first device. The first Device Profile module is configured to manage various types of device capability information of the first device, for example, the SIM card status information 1.

In some embodiments, the first device may periodically obtain the SIM card status information 1. For example, after being powered on, the first device starts to periodically obtain the SIM card status information 1. For another example, after enabling the phone application, the first device starts to periodically determine current SIM card status information 1 of the first device.

In some other embodiments, the first device may alternatively obtain the SIM card status information 1 in response to a specific event. For example, the specific event may be detecting that a SIM card in the first device is removed or a SIM card is inserted into the first device.

In an implementation, an implementation process of A101 may be S201 and S202 shown in FIG. 6A.

S201: The first call service module of the first device determines the SIM card status information 1.

In some embodiments, the first call service module may indicate a processor 210 to invoke a SIM card interface 295 to obtain the SIM card status information 1 of the first device.

For example, the first call service module may periodically determine current SIM card status information 1 of the first device. For example, after being powered on, the first device periodically determines the current SIM card status information 1 of the first device. For another example, after enabling the phone application, the first device starts to periodically determine the current SIM card status information 1 of the first device.

For another example, when a SIM card in the first device changes, the first call service module is triggered to obtain the SIM card status information 1. For example, if a user inserts a SIM card into the first device or the user removes a SIM card configured in the first device, the first call service module may be triggered to obtain the SIM card status information 1.

In addition, when the first device has no SIM card slot, the first call service module fails to read the SIM card status information through the SIM card interface 295, and may determine that the corresponding SIM card status information 1 includes the identifier b.

S202: The first call service module sends the SIM card status information 1 to the first Device Profile module.

The first Device Profile module may perform a read/write operation on a specified storage area in the first device. The specified storage area is used to store the device capability information of the first device. The SIM card status information may be one type of device capability information.

In some embodiments, after receiving the SIM card status information 1, the first Device Profile module may write the SIM card status information 1 into the specified storage area. In addition to storing the corresponding SIM card status information 1, the first device may find the corresponding SIM card status information 1 by using the first Device Profile module. Similarly, another device (for example, the second device) may also find the SIM card status information 1 by using the first Device Profile module.

Certainly, like the first device, another device in the trust system may also obtain SIM card status information of the another device, and maintain the obtained SIM card status information by using a Device Profile module of the another device. An example in which the another device is the second device is used. In some embodiments, the method further includes: The second device obtains SIM card status information 2.

The SIM card status information 2 includes an identifier indicating whether a SIM card is configured in the second device. For example, when a SIM card is configured in the second device, the SIM card status information 2 includes an identifier c. For another example, when no SIM card is configured in the second device, the SIM card status information 2 includes an identifier d. Certainly, the identifier c is different from the identifier d.

In addition, when the SIM card status message 2 includes the identifier c, that is, in a scenario in which a SIM card is configured in the second device, the SIM card status information 2 may further include related information of the configured SIM card in the first device, for example, information such as a quantity of configured SIM cards, a number of the SIM card, and an operator.

For example, as shown in FIG. 6A, the second device includes a second call service module and a second Device Profile module. The second call service module and the second Device Profile module belong to an application framework layer of the second device. The second call service module is configured to manage a call service of the second device. The second Device Profile module is configured to manage various types of device capability information of the second device, for example, the SIM card status information 2.

In an implementation, an implementation process in which the second device obtains the SIM card status information 2 may be S203 and S204 shown in FIG. 6A.

S203: The second call service module of the second device determines the SIM card status information 2.

S204: The second call service module sends the SIM card status information 2 to the second Device Profile module.

In some embodiments, for implementations of S203 and S204, refer to S201 and S202. Details are not described herein again.

In some embodiments, when a user uses the first device, as shown in FIG. 5, the communication method provided in this embodiment of this application may include the following steps.

A102: The first device displays a phone application interface 503 in response to an operation of enabling the phone application.

The phone application may be installed at the application layer of the first device. The phone application may be a native application in the system, or may be a third-party application installed by the user.

In some embodiments, the operation of enabling the phone application may be that the user taps a phone application icon on a touchscreen of the first device.

Figure 7A:
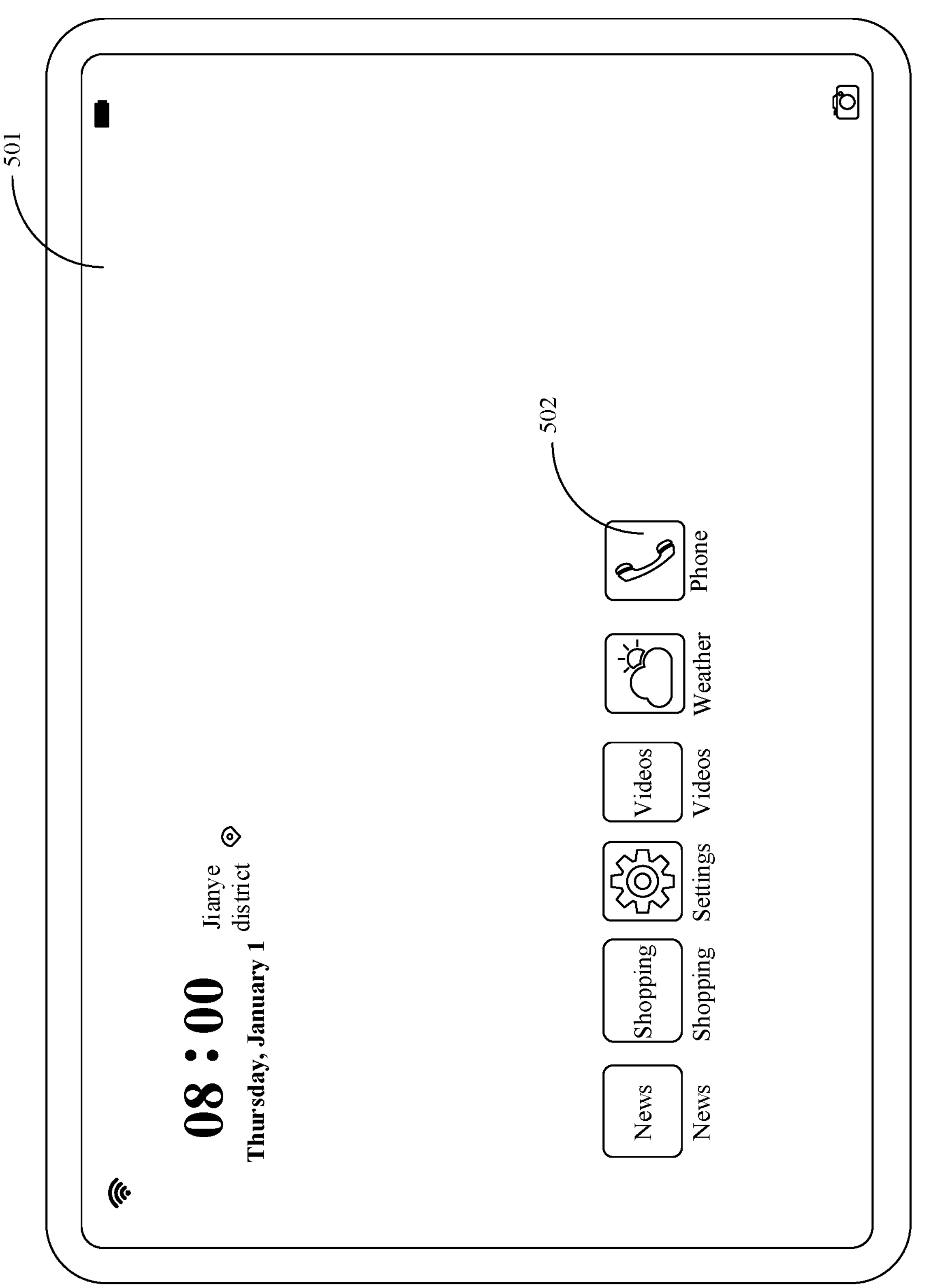
FIG. 7A and FIG. 7B are a first schematic diagram of interface display of a first device according to an embodiment of this application.

For example, FIG. 7A shows a home screen 501 of the first device (for example, a tablet computer). The home screen 501 includes a phone application icon 502 (for example, referred to as a first icon) and application icons of other applications. During display of the home screen 501, the first device may display the phone application interface, that is, the phone application interface 503 shown in FIG. 7B, in response to an operation of tapping the phone application icon 502 by the user on the touchscreen.

In another embodiment, when a background application of the first device includes the phone application, the operation of enabling the phone application may alternatively be that the user taps a first thumbnail window in a multitask interface on the touchscreen, where the first thumbnail window displays a thumbnail of the phone application interface. For example, during display of the home screen 501, the first device may display the multitask interface in response to an operation indicating to display the multitask interface (for example, an upward sliding operation performed by the user on the touchscreen). When the multitask interface is displayed and the multitask interface includes the first thumbnail window, the first device may display the phone application interface 503 in response to the operation of tapping the first thumbnail window by the user on the touchscreen.

The phone application interface 503 includes a call record area 504 and a dialing area 505. The call record area 504 is used to display a call record. The call record may include a record actually received by the first device, and may also include a record synchronized from another device. The dialing area 505 displays at least one digit key. When the user taps the digit key, the device invokes a corresponding control to enter a corresponding number.

In an example, the call record area 504 and the dialing area 505 are arranged left and right. For example, the call record area 504 is located on a left side of the dialing area 505. In another example, the call record area 504 and the dialing area 505 may alternatively be stacked, and a size of the dialing area 505 is smaller than that of the call record area 504. The dialing area 505 is stacked on the call record area 504. In response to a sliding operation performed by the user in the call record area 504, the electronic device may hide the dialing area 505, and display only the call record area 504.

In some embodiments, the call record area 504 includes at least one display bar, for example, a first display bar 506, a second display bar 507, and a third display bar 508. One display bar corresponds to one call record, and one display bar may display related information of a corresponding call record. For example, when the call record is an incoming call record, the related information of the call record may include incoming call time of the call record, an identifier of a local SIM card, a home location of a peer SIM card, and the like. For another example, when the call record is an outgoing call record, the related information of the call record may include outgoing call time of the call record, an identifier of a local SIM card, a home location of a peer SIM card, and the like.

It may be understood that the SIM card is a port used by the electronic device to access a mobile communication network. The foregoing call is a session initiated by two devices based on the mobile communication network. In other words, a call between two devices needs to be implemented by using two SIM cards. In this way, each call record corresponds to one local SIM card and one peer SIM card. When the call record is the incoming call record, the local SIM card is a SIM card used to answer the call, that is, a SIM card that receives a call request in the mobile communication network. When the call record is the outgoing call record, the local SIM card is a SIM card that makes the call, that is, a SIM card that initiates a call request in the mobile communication network. When the call record is the incoming call record, the peer SIM card is a SIM card that makes the call. When the call record is the outgoing call record, the peer SIM card is a SIM card that answers the call. In addition, a SIM card identifier can uniquely indicate a SIM card. The SIM card identifier may include an identifier of a device in which the SIM card is installed. Certainly, when a plurality of SIM cards are configured in a same device, the SIM card identifier may further include a card sequence number of the SIM card in the device. For example, if two SIM cards are installed in the second device, corresponding SIM card identifiers are respectively “a card 1 of the second device” and “a card 2 of the second device”.

For example, the fourth device may send a call request (or referred to as a session request) to the second device. For example, the fourth device sends the call request to the card 1 of the second device by using the mobile communication network and based on a SIM card (for example, a third SIM card) configured in the fourth device. After the second device receives the call request, the second device may record the call, for example, generate a call record “incoming call 1”. In this way, after the first device synchronizes all call records of the second device, the first device may also display the call record “incoming call 1”. In addition, the call record “incoming call 1” may also be referred to as an incoming call record for the first device. A local SIM card of the call record “incoming call 1” is the card 1 of the second device, a peer SIM card is the SIM card of the fourth device, a time point at which the second device receives the call request is five minutes ago, and a home location of the SIM card of the fourth device is Beijing. In this way, the first device may display, in the first display bar 506, the incoming call time (five minutes ago), the home location (Beijing), and an identifier of the local SIM card (the card 1 of the second device).

In addition, when the fourth device sends the call request to the second device, the second device may indicate the first device to synchronously remind the call request. In this scenario, the first device may also generate the call record “incoming call 1”. In this way, the first device may also display, in the first display bar 506, related information of the call record “incoming call 1”.

Figure 7B:
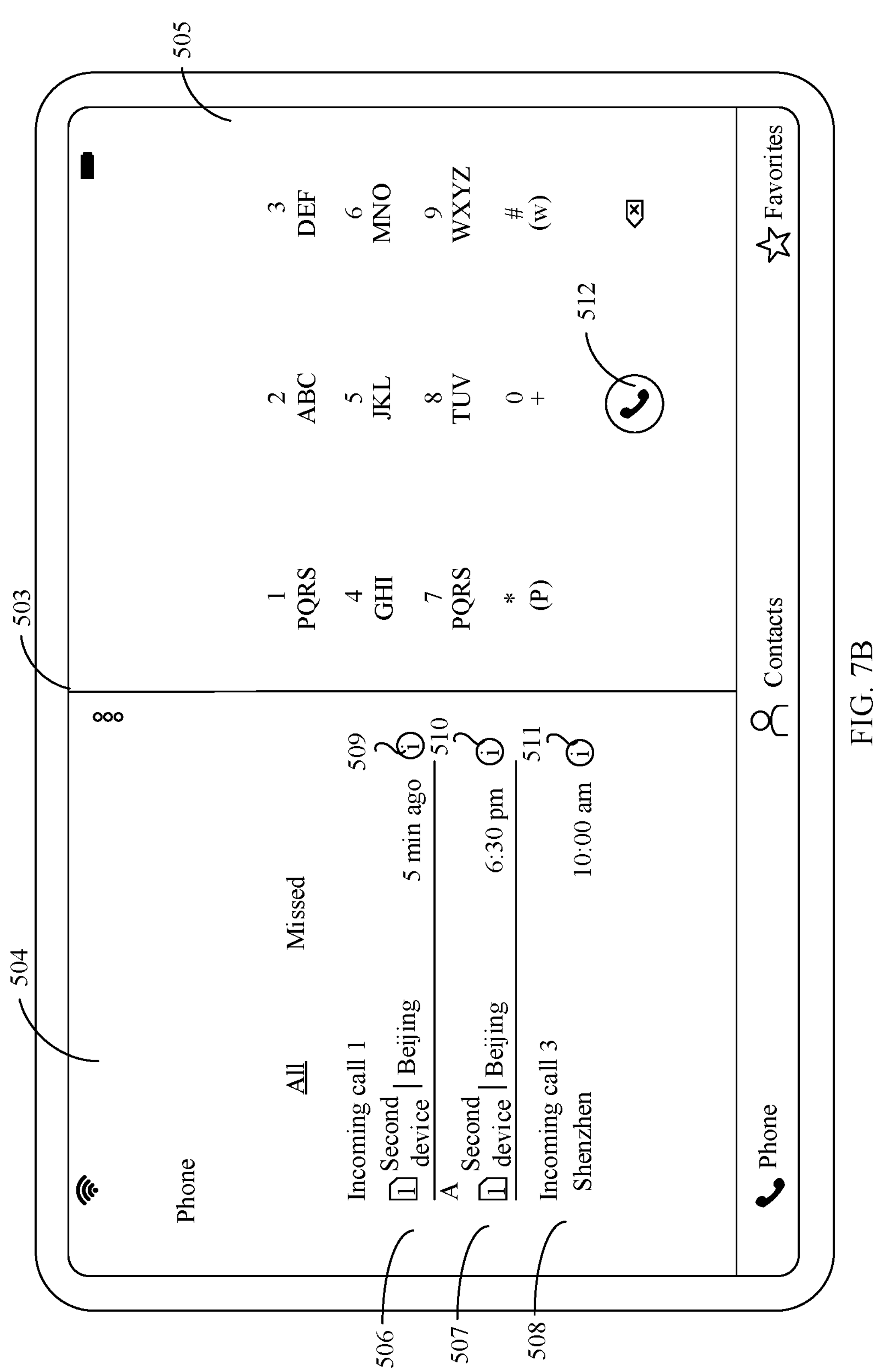

Likewise, the second display bar 507 is also used to display related information of a call record of A. Incoming call time of the call record is 6:30 pm, a home location of a peer SIM card is Beijing, and an identifier of a local SIM card corresponding to the call record is the card 1 of the second device. The third display bar 508 is used to display related information of a call record “incoming call 2”, for example, display incoming call time (10:00 am) of the incoming call 2, and a home location Shenzhen of a peer SIM card. As shown in FIG. 7B, if an identifier of a local SIM card is not displayed in the third display bar 508, it indicates that the local SIM card is a SIM card configured in the first device, and only the SIM card is configured in the first device.

In addition, a quantity of display bars in the call record area 504 is related to a quantity of call records, to be specific, a larger quantity of call records indicates a larger quantity of display bars.

In some examples, the call record area 504 further includes details controls in a one-to-one correspondence with the display bars, for example, a first details control 509, a second details control 510, and a third details control 511. The details controls are displayed relative to the display bars. For example, the first details control 509 is displayed relative to the first display bar 506, the second details control 510 is displayed relative to the second display bar 507, and the third details control 511 is displayed relative to the third display bar 508.

In addition, the details control is used to trigger display of detailed information of a corresponding call record, for example, a mobile directory number (Mobile Directory Number, MDN) corresponding to the call record, namely, an MDN number corresponding to a peer SIM card of the call record.

A103: The first device displays a dialing card selection window in response to an operation 1 indicating to make a call.

In some embodiments, the user may perform an operation in the call record area 504 and/or the dialing area 505 to indicate the first device to make a call. The operation indicating the first device to make a call is also referred to as the operation 1.

Figure 8A:
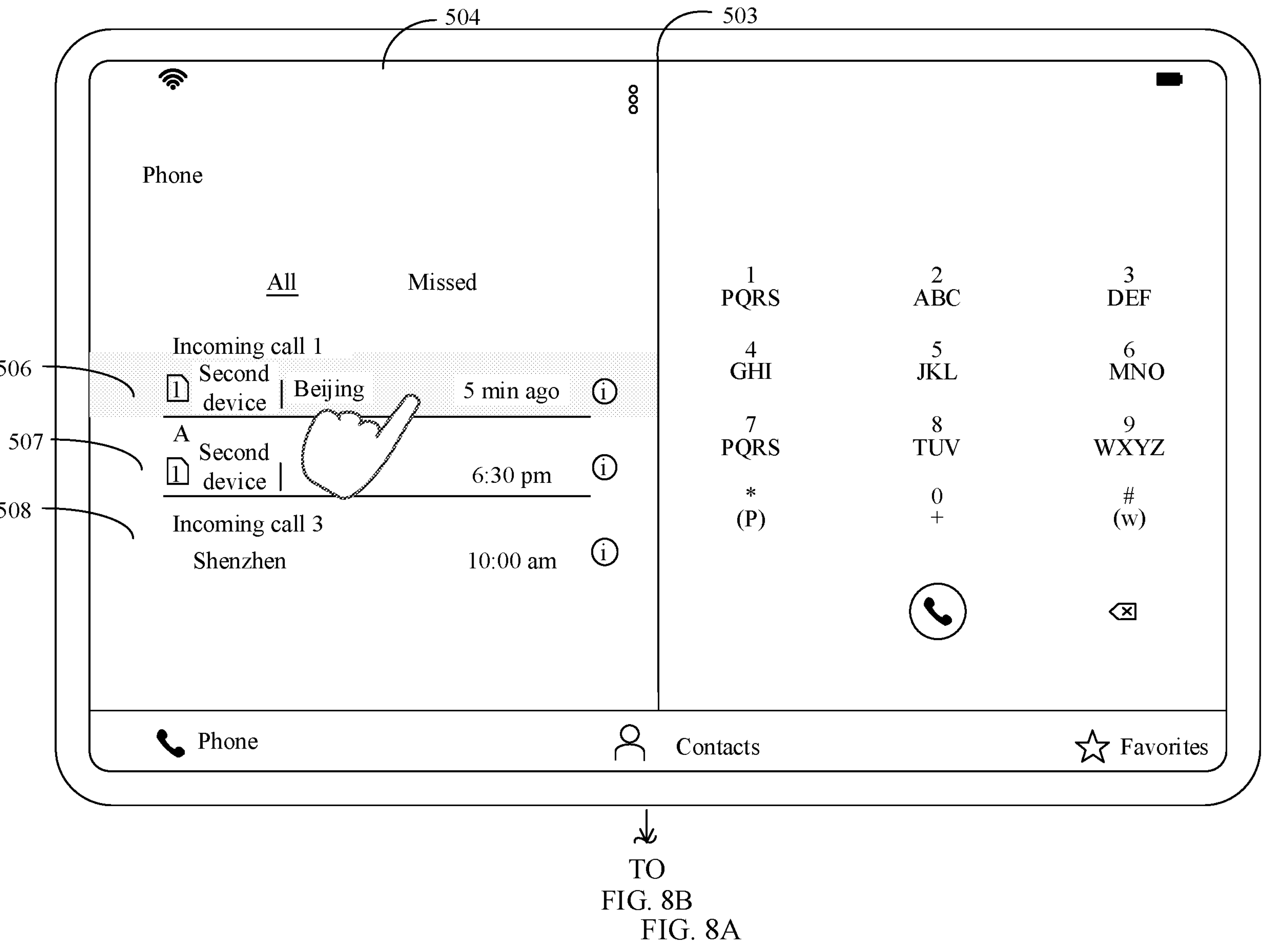
FIG. 8A and FIG. 8B are a second schematic diagram of interface display of a first device according to an embodiment of this application.

For example, as shown in FIG. 8A, when the first device displays the phone application interface 503, the user may tap the call record in the call record area 504 to indicate the first device to make a call. The call record area 504 includes the first display bar 506, the second display bar 507, and the third display bar 508. The first display bar 506 displays the call record “incoming call 1”, the second display bar 507 displays the call record of “A”, and the third display bar 508 displays the call record “incoming call 2”.

For example, when the user taps the first display bar 506 on the touchscreen, the first device may determine that the user indicates to dial an MDN number corresponding to the "incoming call 1". In this way, the first device may display the dialing card selection window in the phone application interface 503 in response to the operation of tapping the first display bar 506.

For another example, when the first device displays the phone application interface 503, the user may perform an operation in the dialing area 505 to indicate the first device to make a call.

Figure 9A:
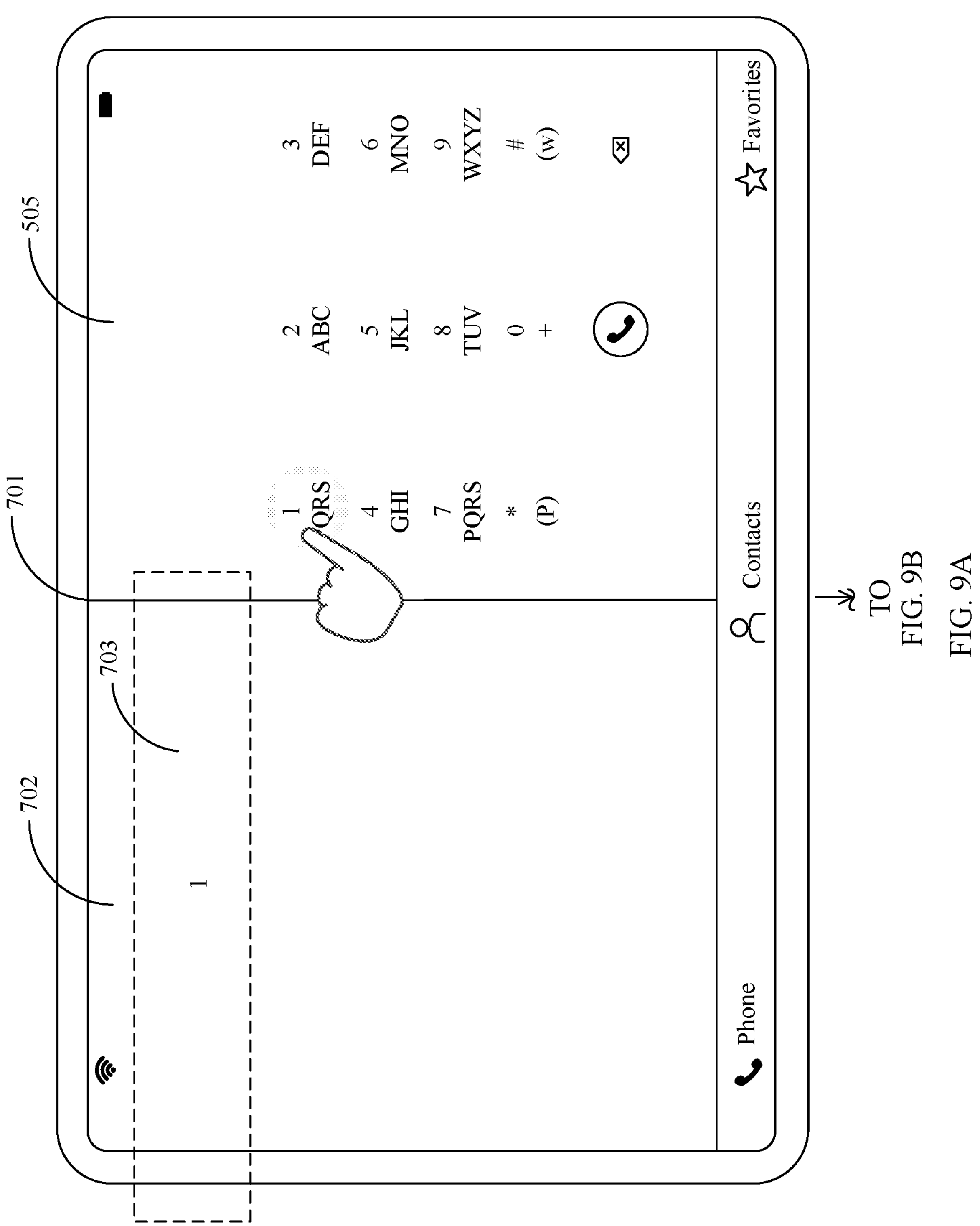
FIG. 9A and FIG. 9B are a third schematic diagram of interface display of a first device according to an embodiment of this application.

For example, during display of the phone application interface 503, the first device may display, in response to an operation of tapping a digit key by the user in the dialing area 505, a digit dialing interface 701 shown in FIG. 9A. The digit dialing interface 701 includes the dialing area 505 and a number display area 702. For example, the number display area 702 and the dialing area 505 are arranged left and right. The number display area 702 includes a display sub-area 703. The display sub-area 703 displays a digit corresponding to a tapped digit key. For example, the display sub-area 703 displays a digit "1" when the first device responds to that the user taps a digit key "1" in the dialing area 505.

Then, during display of the digit dialing interface 701, the user may continue to tap a data key in the dialing area 505. In this way, the first device may invoke a corresponding control to complete entry of an MDN number. In addition, the first device may further display an entered MDN number in the number display area 702.

Figure 9B:
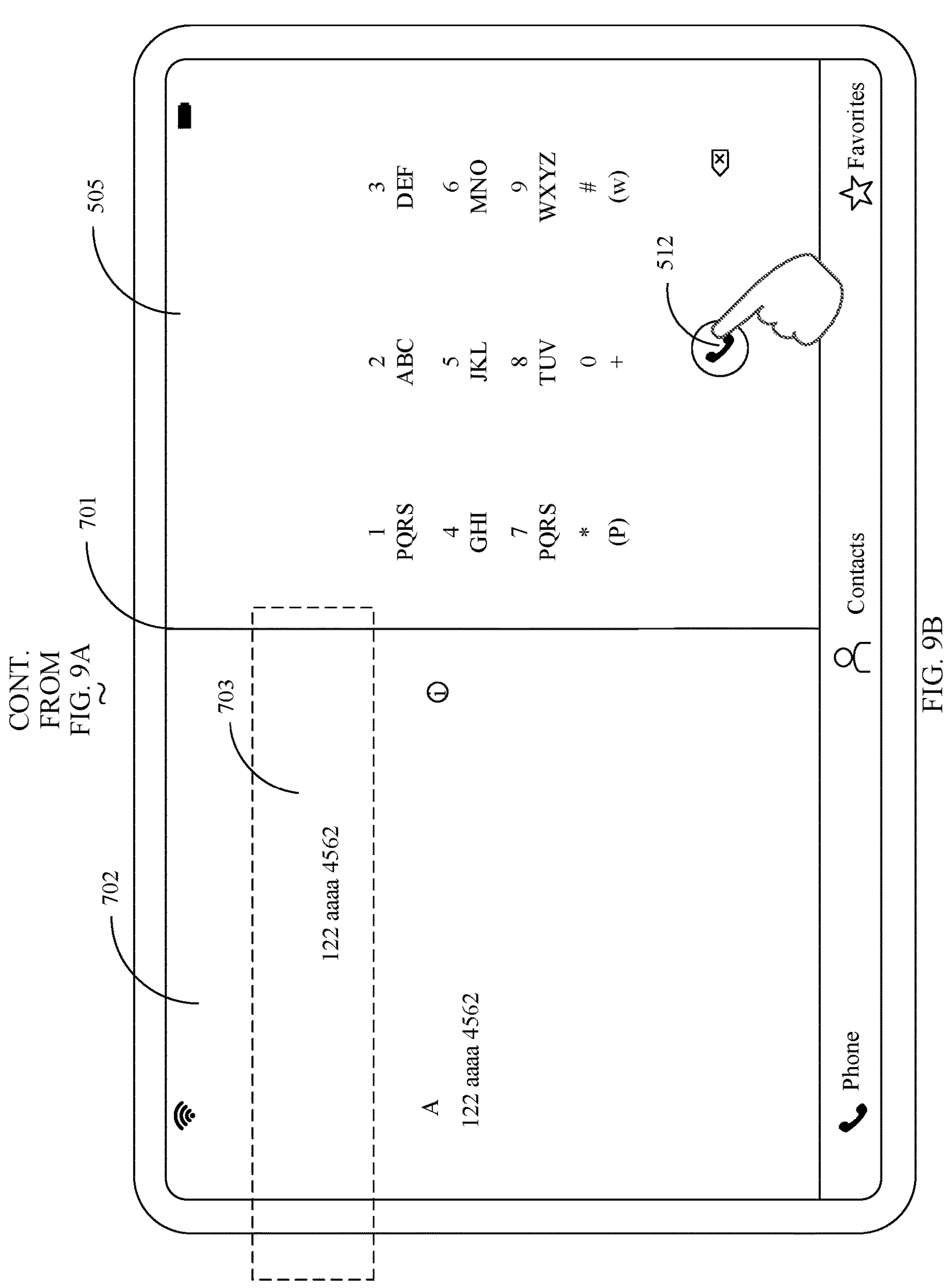

As shown in FIG. 9B, when an entered number is an MDN number of a stored contact, for example, when the entered "122 aaaa 4562" is an MDN number of a contact A, related information of the contact may be further displayed in the number display area 702. Alternatively, when the entered number corresponds to a call record, the call record may be further displayed in the number display area 702.

In addition, the digit dialing interface 701 further includes a first dialing control 512. The first device may display the dialing card selection window in the digit dialing interface 701 in response to an operation of tapping the first dialing control 512 by the user in the digit dialing interface 701.

Figure 11A:
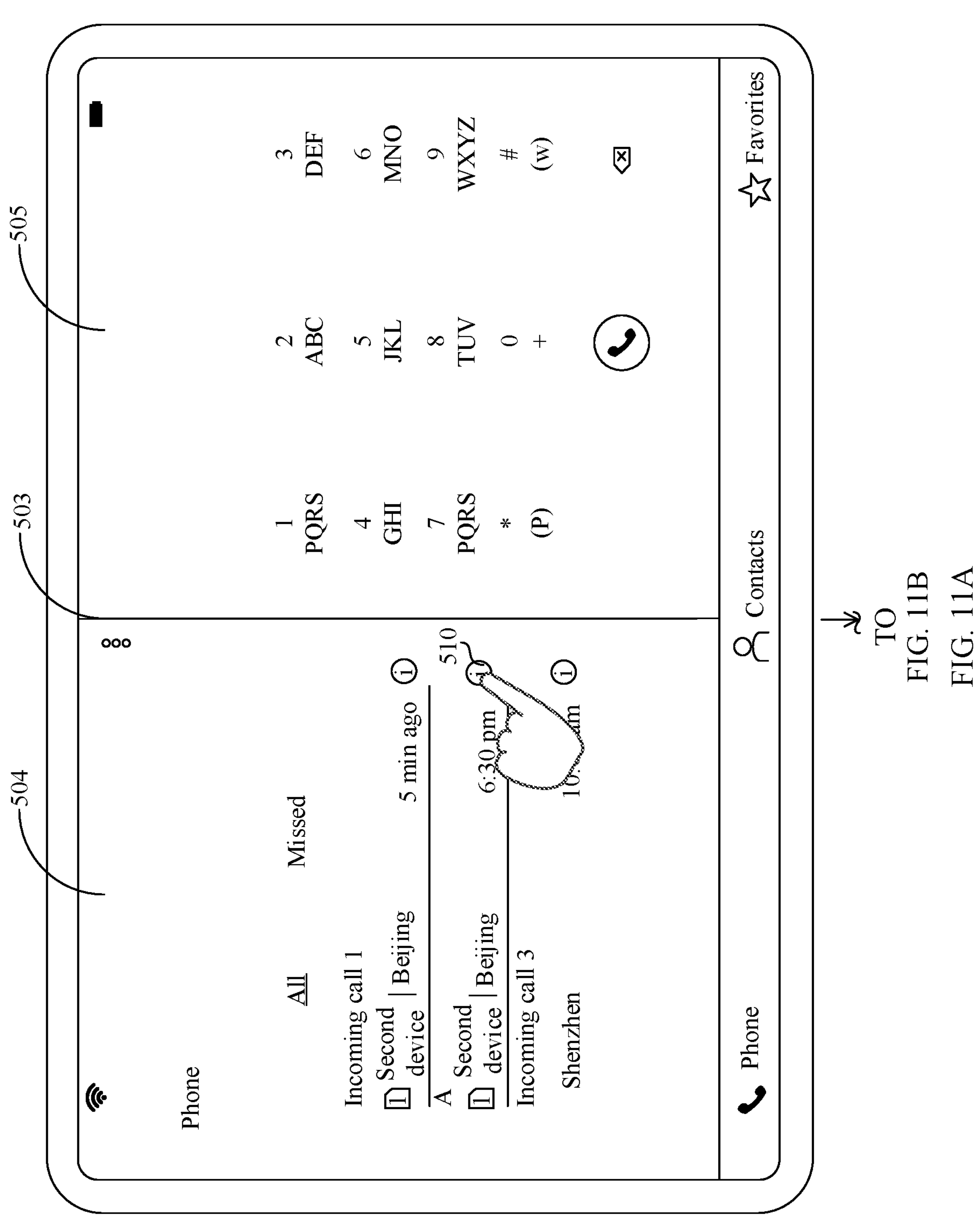
FIG. 11A and FIG. 11B are a fifth schematic diagram of interface display of a first device according to an embodiment of this application.
Figure 11B:
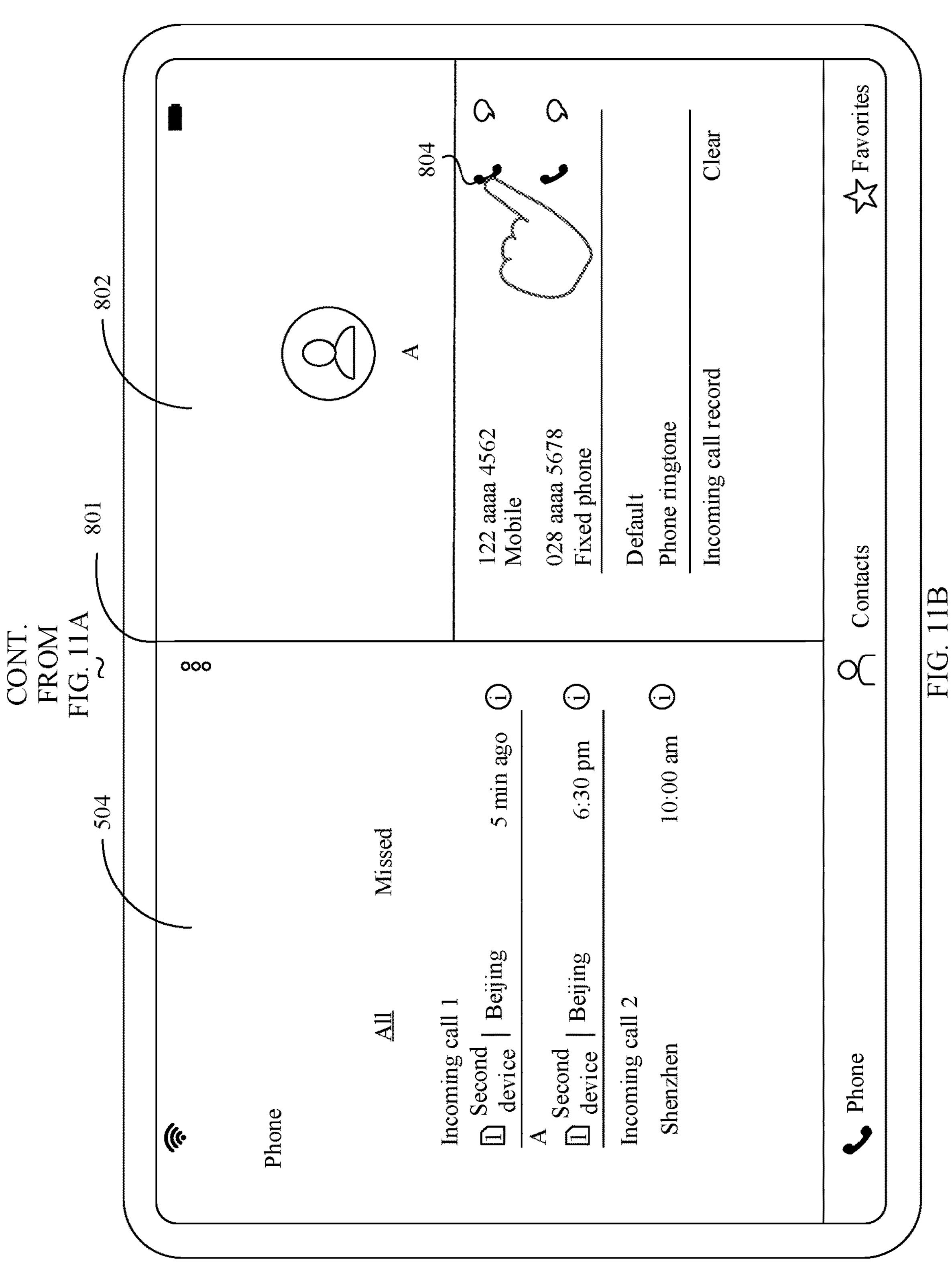

For another example, when the first device displays the phone application interface 503, as shown in FIG. 11A, the first device may display a corresponding call details interface in response to an operation indicating to display call record details. For example, the first device may display, as shown in FIG. 11B, a call details interface 801 in response to that the user taps the second details control 510 in the phone application interface 503.

Figure 12:
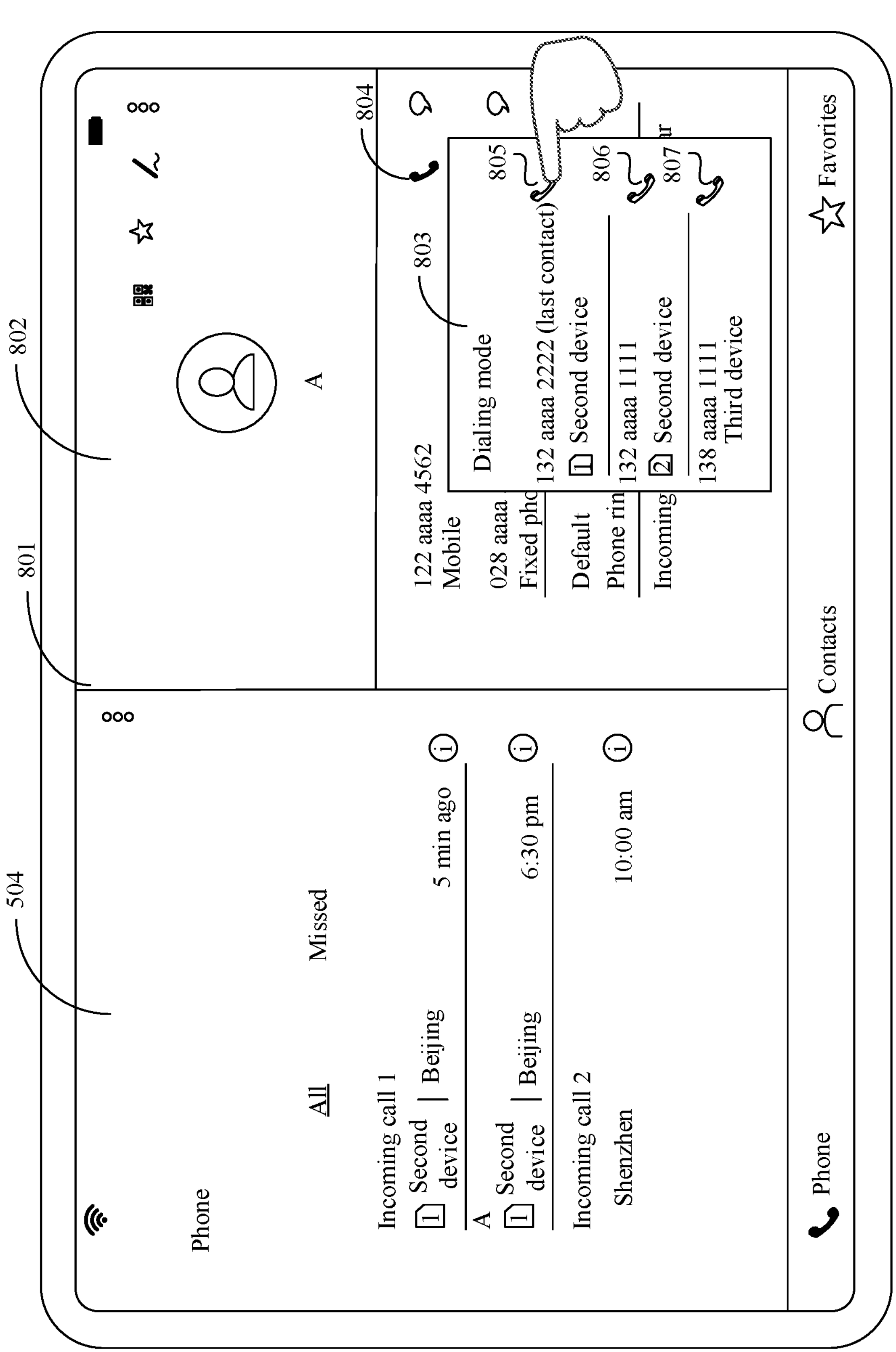
FIG. 12 is a sixth schematic diagram of interface display of a first device according to an embodiment of this application.

The call details interface 801 includes a call record area 504 and a details area 802. The details area 802 is used to display detailed information of a call record, for example, an MDN number of a contact corresponding to the call record. A dialing control, for example, a second dialing control 804, is displayed corresponding to each MDN number displayed in the details area 802. After the first device determines that the user indicates to select the second dialing control 804, the first device may determine that the user indicates to dial an MDN number, namely, "122 aaaa 4562", corresponding to the second dialing control 804. In this way, as shown in FIG. 12, the first device may display the dialing card selection window in the call details interface 801.

Figure 13A:
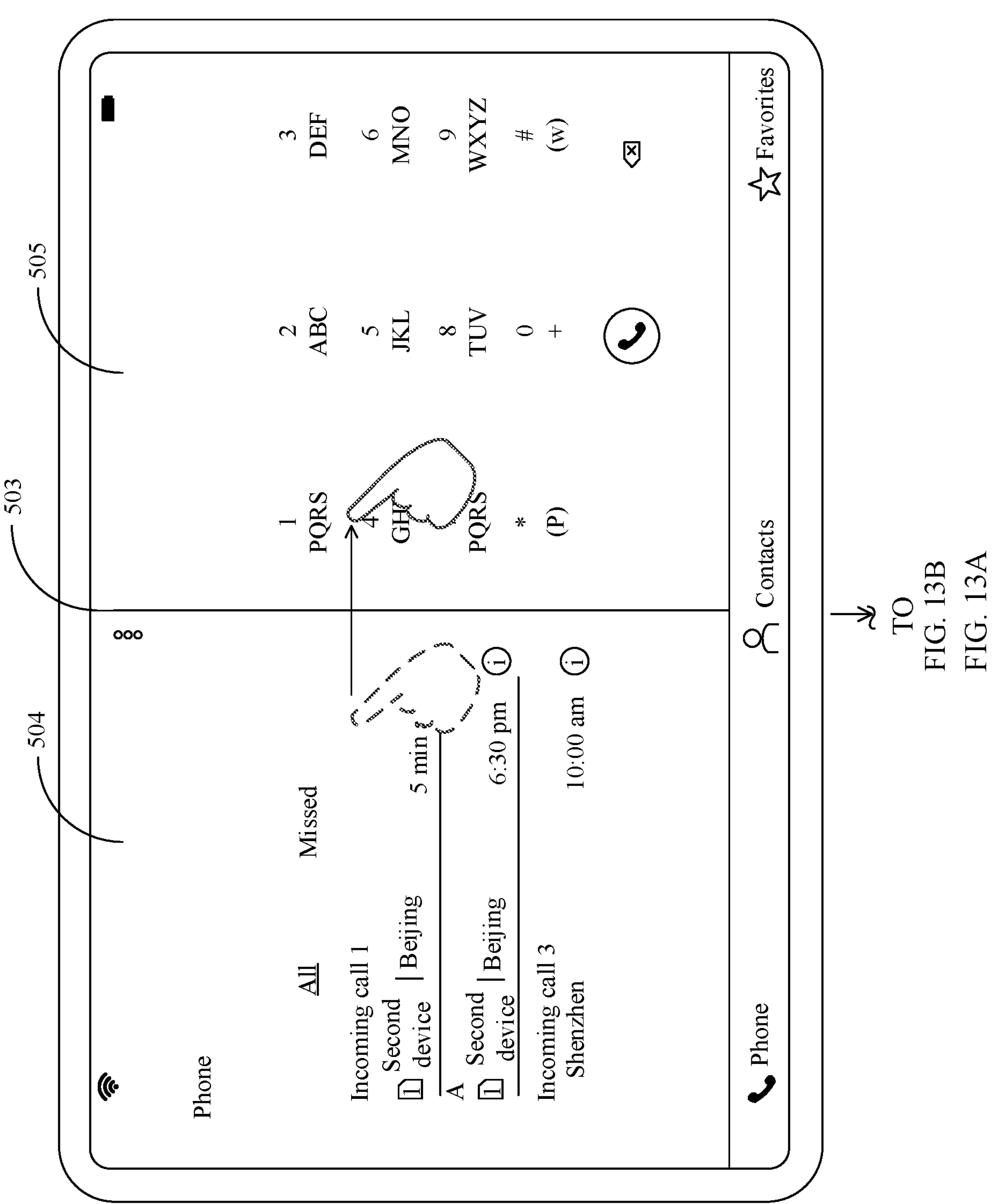
FIG. 13A and FIG. 13B are a seventh schematic diagram of interface display of a first device according to an embodiment of this application.
Figure 13B:
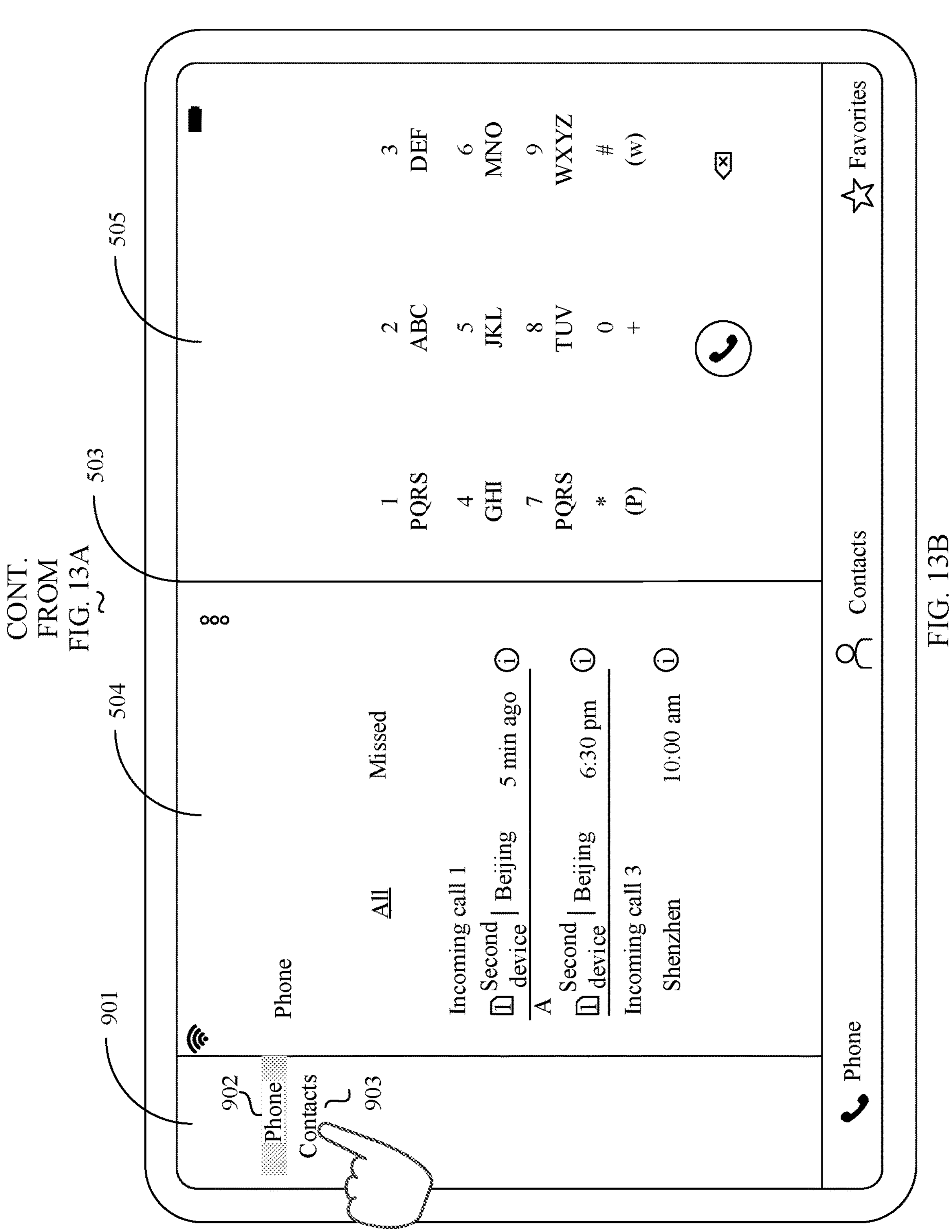

For another example, as shown in FIG. 13A, during display of the phone application interface 503, the user may indicate the first device to display a contacts interface. For example, when the first device displays the phone application interface 503, as shown in FIG. 13B, the first device may newly display a function switching area 901 to the phone application interface 503 in response to an operation (for example, a right sliding operation performed by the user in the phone application interface 503) indicating to display a contact. When the function switching area 901 is newly displayed, the call record area 504 and the dialing area 505 in the phone application interface 503 are synchronously zoomed out. For example, the call record area 504 and the dialing area 505 are synchronously zoomed out toward a right side, and the function switching area 901 is displayed on a left side of the call record area 504.

Figure 14A:
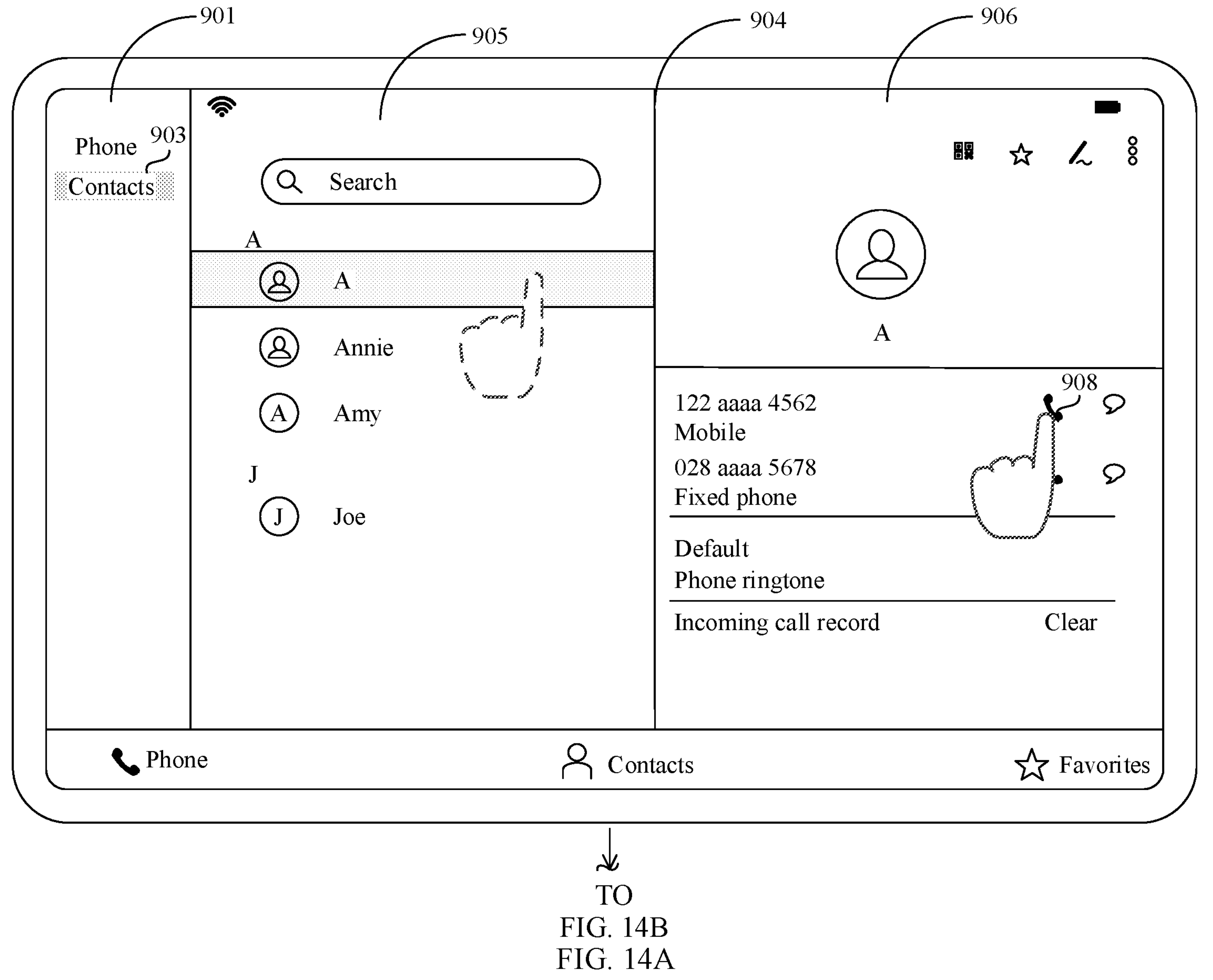
FIG. 14A and FIG. 14B are an eighth schematic diagram of interface display of a first device according to an embodiment of this application.
Figure 14B:
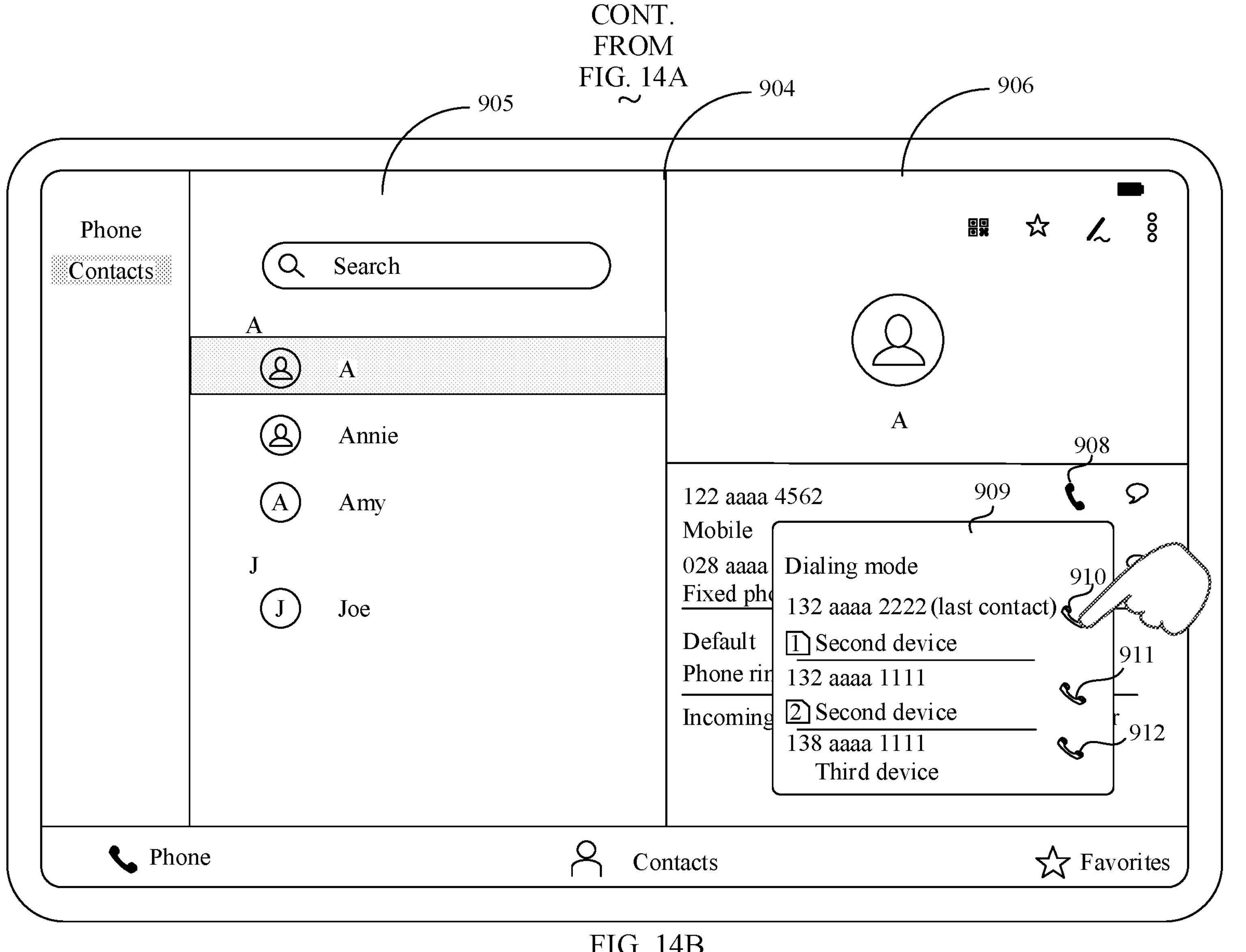

As shown in FIG. 13B, the function switching area 901 is used to display a function switching control, for example, a first function control 902 indicating to display a call record and a second function control 903 indicating to display a contacts list. The first function control 902 is in a selected state. In this scenario, as shown in FIG. 14A, the first device may display a contacts interface 904 in response to an operation that is of the user and that indicates to select the second function control 903. The contacts interface 904 includes the function switching area 901, a contacts list area 905, and a contact details area 906. The contacts list area 905 is used to display a stored contacts list. The user may select a contact in the contacts list area 905 through tapping, for example, select a contact "A" through tapping. In this way, in response to the foregoing operation of the user, the first device may display contact information of the selected contact in the contact details area 906, for example, an MDN number corresponding to the contact. Each MDN number displayed in the contact details area 906 corresponds to a dialing control. For example, the number "122 aaaa 4562" corresponds to a third dialing control 908. As shown in FIG. 14B, the first device displays the dialing card selection window in the contacts interface 904 in response to an operation of tapping the third dialing control 908 by the user on the touchscreen.

In some embodiments, the dialing card selection window may include information about an available SIM card. The information about an available SIM card may indicate a SIM card that can be used currently by the first device. It may be understood that, when a SIM card (which may also be referred to as a local card) is configured in the first device, the local card is one of SIM cards that can be used by the first device. In this way, the information about an available SIM card may include related information of the local card (for example, an MDN identifier and a SIM card identifier that correspond to the local card).

In addition, if a SIM card is configured in another device (for example, the second device) in the trust system, and the first device has permission to use the SIM card in the second device, the SIM card in the second device is also a SIM card that can be used by the first device. In this way, the information about an available SIM card may include related information (for example, an MDN identifier and a SIM card identifier) of the SIM card in the second device.

For example, no SIM card is configured in the first device, two SIM cards are configured in the second device, and corresponding SIM card identifiers are respectively a card 1 of the second device and a card 2 of the second device. The card 1 of the second device corresponds to a number "132 aaaa 2222", and the card 2 of the second device corresponds to a number "132 aaaa 1111". When the first device has permission to use the SIM card in the second device, the information about an available SIM card is shown in the following Table 1:

TABLE 1

| SIM card identifier | MDN number |
|---|---|
| Card 1 of the second device | 132 aaaa 2222 |
| Card 2 of the second device | 132 aaaa 1111 |

For another example, a SIM card, for example, referred to as a local card, is configured in the first device, and a corresponding SIM card identifier is a SIM card of the first device. An MDN number of the local card is "136 aaaa 2222". In addition, two SIM cards are configured in the second device, and corresponding SIM card identifiers are respectively a card 1 of the second device and a card 2 of the second device. When the first device has permission to use the SIM card in the second device, information about an available SIM card is shown in the following Table 2:

TABLE 2

| SIM card identifier | MDN number |
|---|---|
| SIM card of the first device | 136 aaaa 2222 |
| Card 1 of the second device | 132 aaaa 2222 |
| Card 2 of the second device | 132 aaaa 1111 |

Following the foregoing example, in addition to the second device, the third device is also configured with a SIM card. A SIM card identifier corresponding to the SIM card is a card of the third device, and a corresponding MDN number is "138 aaaa 1111". When the first device has permission to use the SIM card in the third device, corresponding information about an available SIM card is shown in Table 3:

TABLE 3

| SIM card identifier | MDN number |
|---|---|
| SIM card of the first device | 136 aaaa 2222 |
| Card 1 of the second device | 132 aaaa 2222 |
| Card 2 of the second device | 132 aaaa 1111 |
| SIM card of the third device | 138 aaaa 1111 |

It may be understood that, when the first device does not belong to a permission restriction list of the second device, the first device has permission to use the SIM card in the second device. Likewise, when the first device does not belong to a permission restriction list of the third device, the first device has permission to use the SIM card in the third device.

Figure 15A:
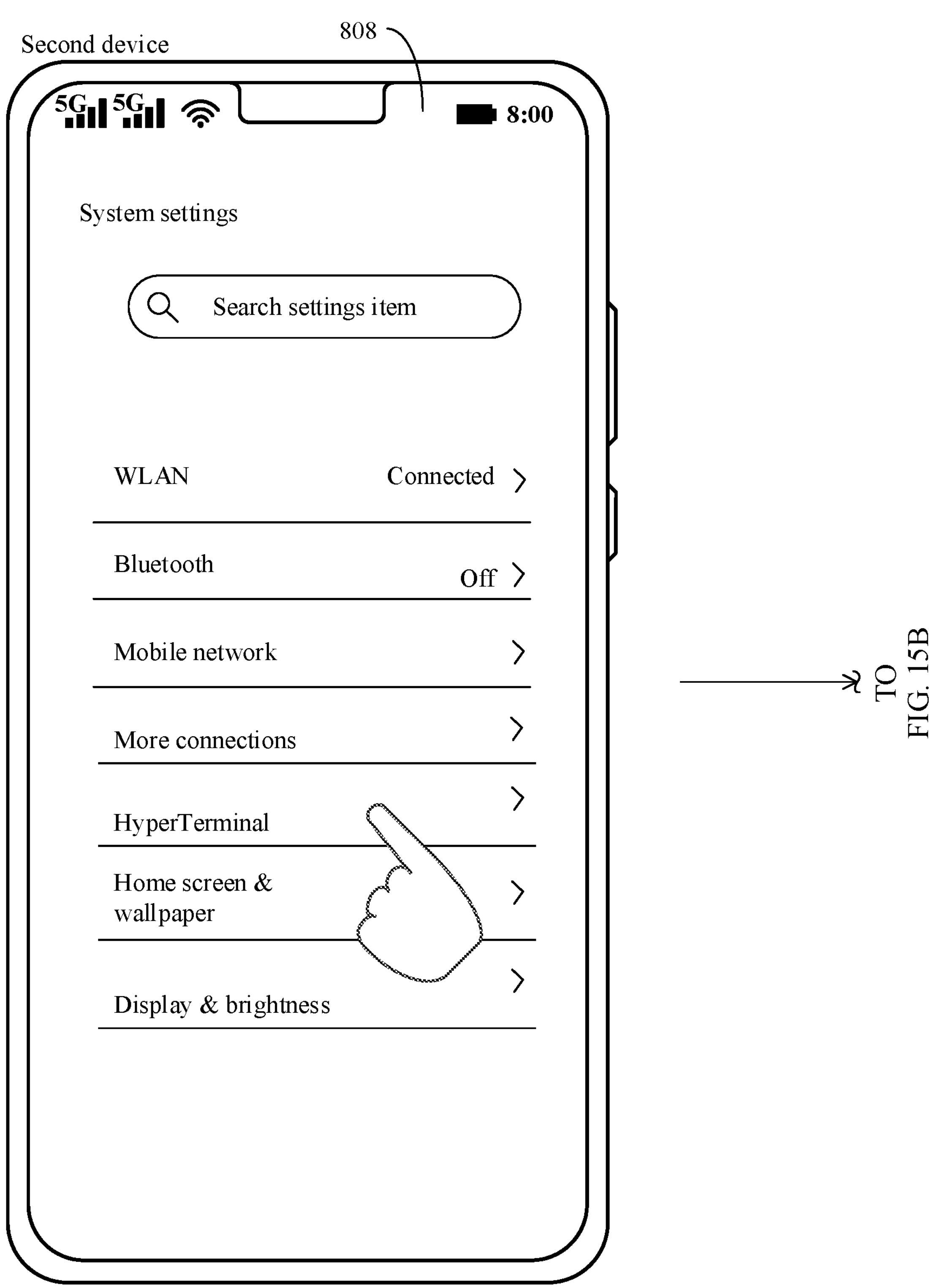
FIG. 15A and FIG. 15B are a ninth schematic diagram of interface display of a second device according to an embodiment of this application.
Figure 15B:
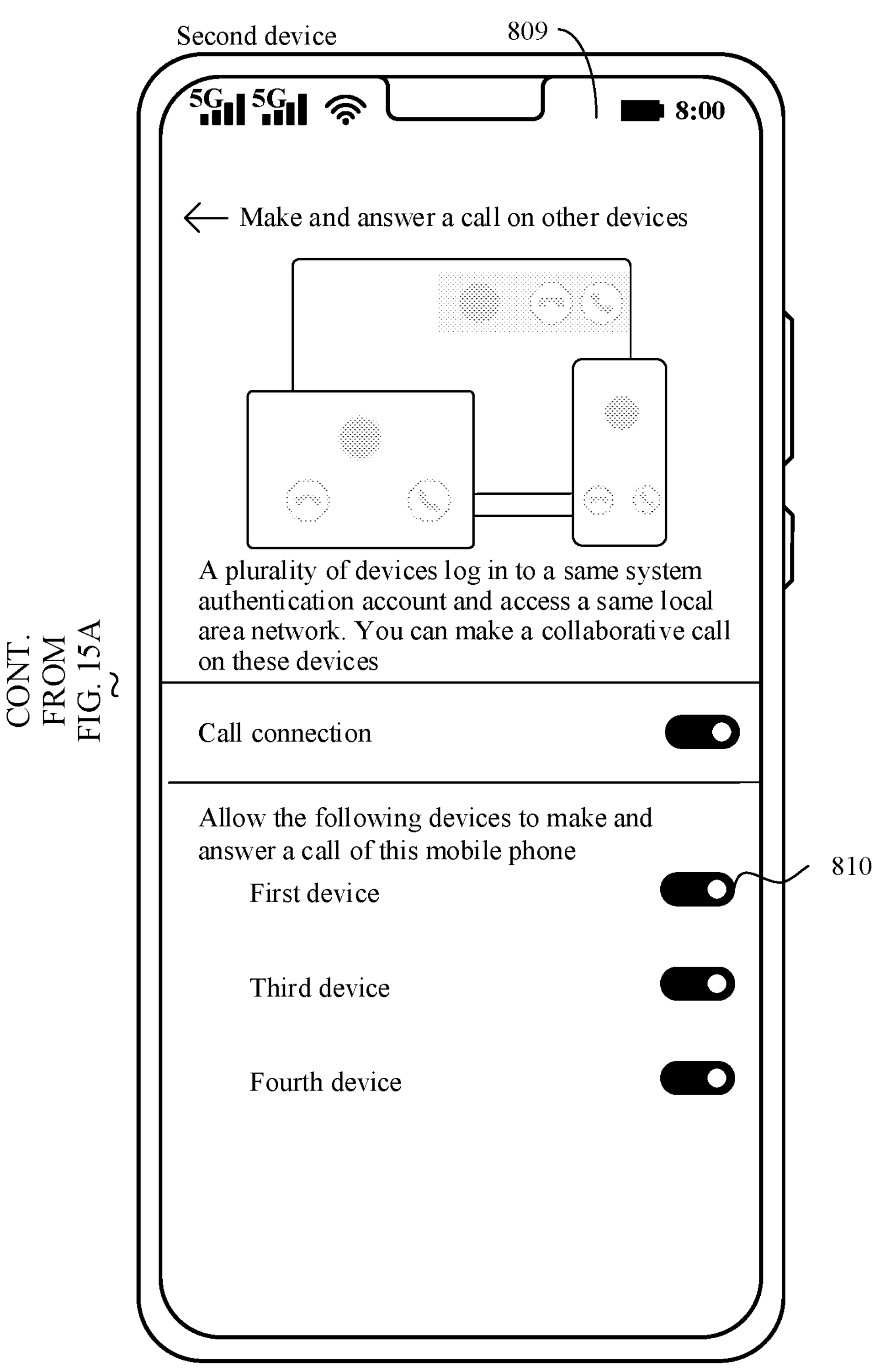

Generally, a permission restriction list in each device may be set by the user. For example, as shown in FIG. 15A, during display of a system settings interface 808, the second device may display, as shown in FIG. 15B, a first configuration interface 809 in response to an operation of tapping a HyperTerminal configuration item by the user in the system settings interface 808. The first configuration interface 809 includes a device identifier corresponding to a trusted device, for example, the first device, the third device, and the fifth device. In addition, in the first configuration interface 809, each device identifier corresponds to a selection control, for example, a first selection control 810 corresponding to the first device. When a selection control corresponding to a device identifier is in a selected state, a device indicated by the device identifier does not belong to a permission restriction list; otherwise, a device indicated by the device identifier belongs to a permission restriction list.

Figure 6B:
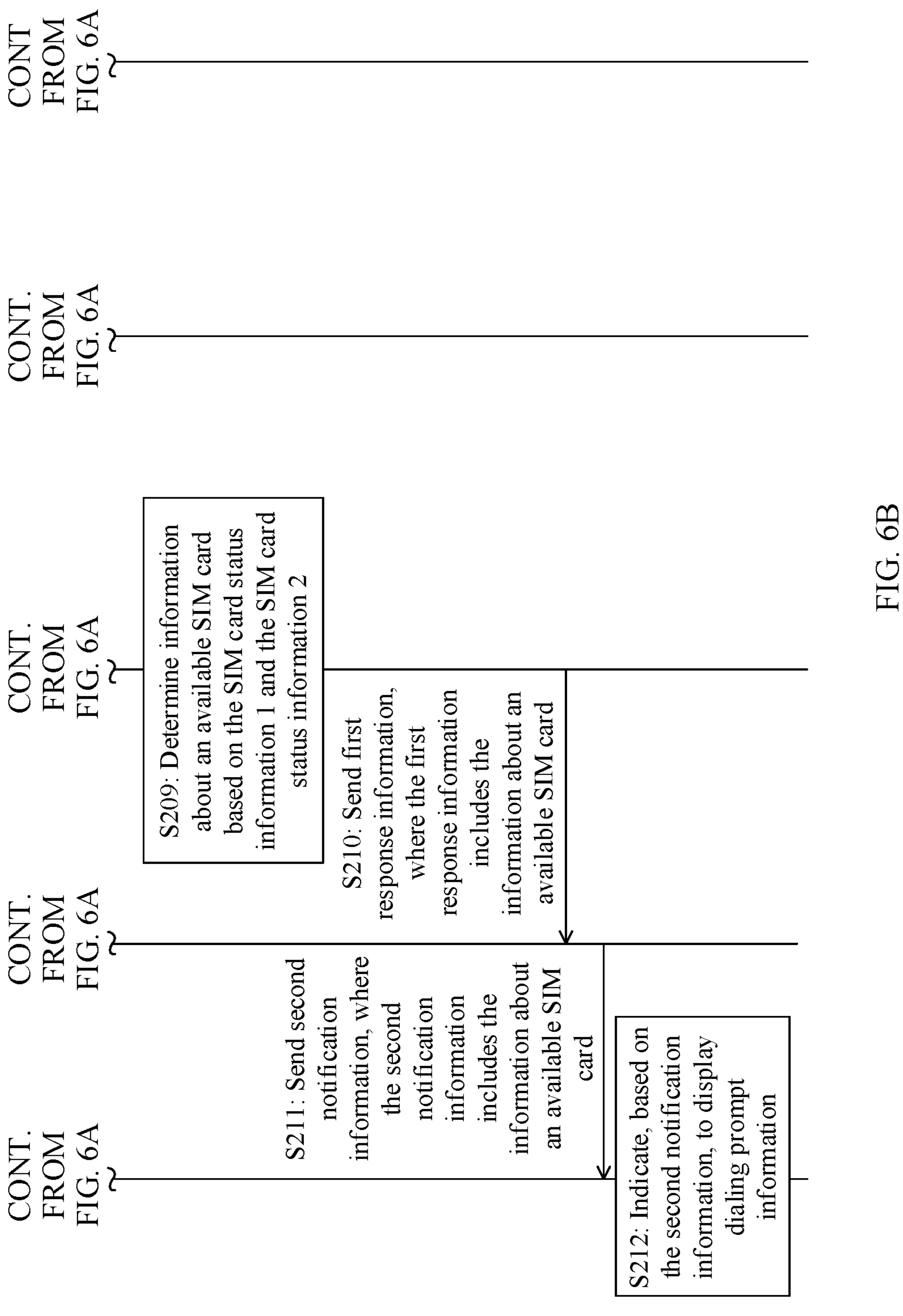

In some embodiments, for a manner in which the first device obtains the information about an available SIM card, refer to S205-S209 in FIG. 6A and FIG. 6B. For a specific implementation principle, refer to descriptions in subsequent embodiments. Details are not described herein.

In some embodiments, the first device receives different operations 1, and the dialing card selection window may be displayed at different locations.

Figure 8B:
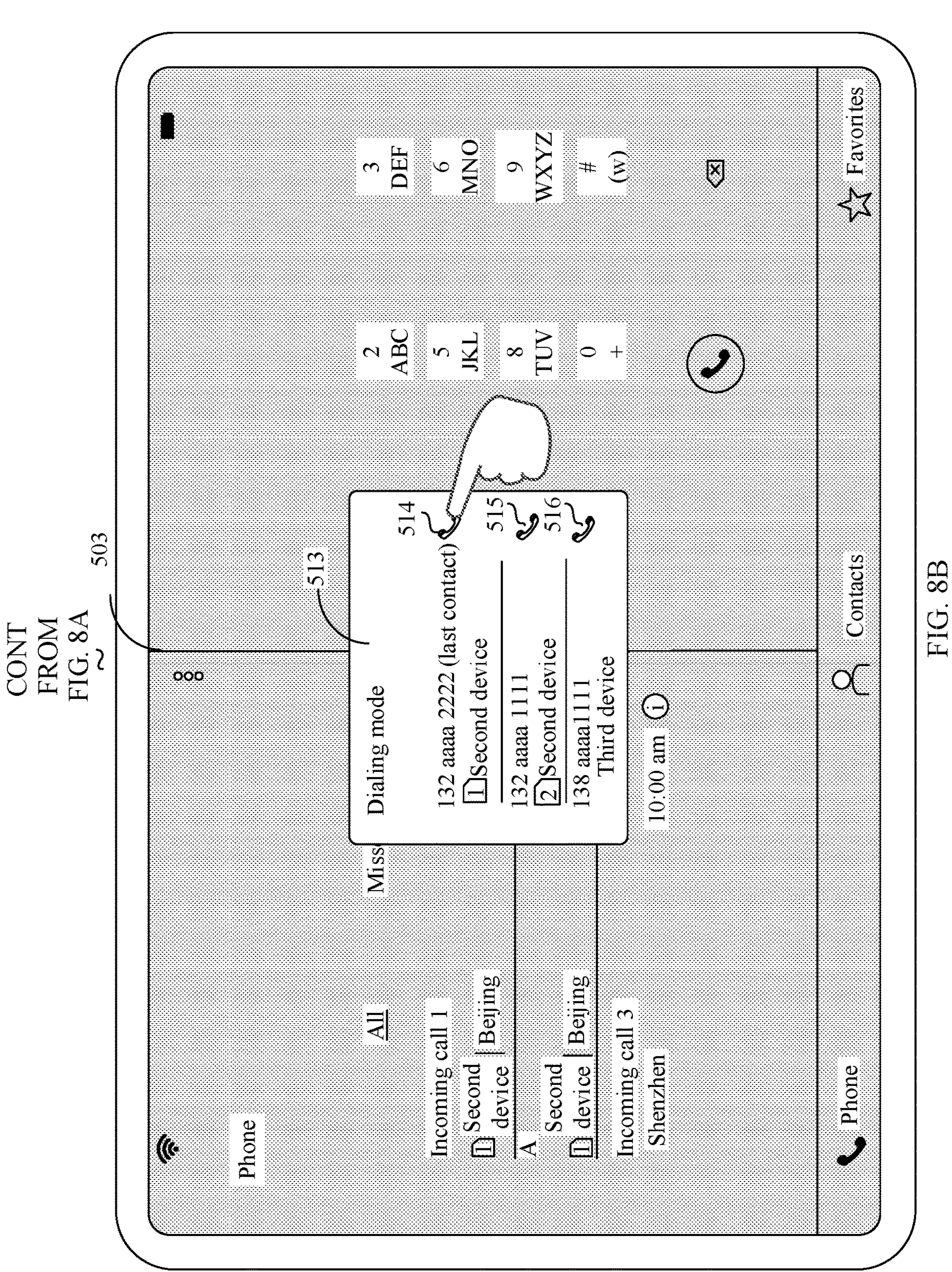

In some examples, the operation 1 is that the user taps, on the touchscreen, a display bar corresponding to a call record. For example, in response to that the user taps the first display bar 506 on the touchscreen, as shown in FIG. 8B, the first device may display a first card selection window 513, for example, referred to as a third window, in the phone application interface 503. In addition, the first device may further determine, in response to that the user taps the first display bar 506 on the touchscreen, an MDN number corresponding to the callback call record "incoming call 1", for example, the MDN number is referred to as a to-be-dialed number. For example, the first card selection window 513 may be displayed in the middle of the phone application interface 503. For another example, a display location of the first card selection window 513 may span the call record area 504 and the dialing area 505. In addition, the first card selection window 513 is used to display the information about an available SIM card, for example, a SIM card identifier included in the information about an available SIM card and an MDN number corresponding to the SIM card identifier.

In addition, when the information about an available SIM card includes a SIM card identifier a, a reminding identifier is displayed in the first card selection window 513 relative to the SIM card identifier a. The SIM card identifier a is used to indicate a SIM card a. The SIM card a is a latest SIM card in contact with a to-be-dialed number. The reminding identifier may be a text reminder, and is used to distinguish the SIM card identifier a from another SIM card identifier in SIM card information. For example, the reminding identifier is a text reminder "last contact".

In addition, a dialing control, for example, a fourth dialing control 514, a fifth dialing control 515, and a sixth dialing control 516, is displayed corresponding to each SIM card identifier in the first card selection window 513. The fourth dialing control 514 corresponds to the SIM card identifier "card 1 of the second device", the fifth dialing control 515 corresponds to the SIM card identifier "card 2 of the second device", and the sixth dialing control 516 corresponds to the SIM card identifier "SIM card of the device 3". In this scenario, in response to an operation that is of the user and that indicates to select a dialing control from the first card selection window 513, the first device may determine a SIM card (for example, referred to as a dialing card) used to perform dialing. For example, in response to an operation indicating to select the fourth dialing control 514, the first device determines to dial, by using the "card 1 of the second device", an MDN number corresponding to a call record. The MDN number that needs to be dialed is also referred to as a to-be-dialed number. In addition, the operation indicating to select the fourth dialing control 514 may be that the user taps the fourth dialing control 514 on the touchscreen.

In another possible embodiment, after the first device determines that the user taps the first display bar 506 on the touchscreen, if obtained information about an available SIM card includes the SIM card identifier a (for example, the card 2 of the second device), the first device does not need to display the first card selection window 513, and directly determines the SIM card a as a dialing card. The user does not need to perform selection, to implement one-click callback.

In an example scenario, the first device includes a first call record, and the first call record is a call record between the card 1 (for example, a first SIM card) of the second device and the SIM card (for example, the third SIM card) of the fourth device. When an available SIM card includes the first SIM card, in response to an operation on the first call record, the first device may directly display a call waiting interface, and send a dialing instruction to the second device, to indicate the second device to initiate a session request to the fourth device.

Figure 16A:
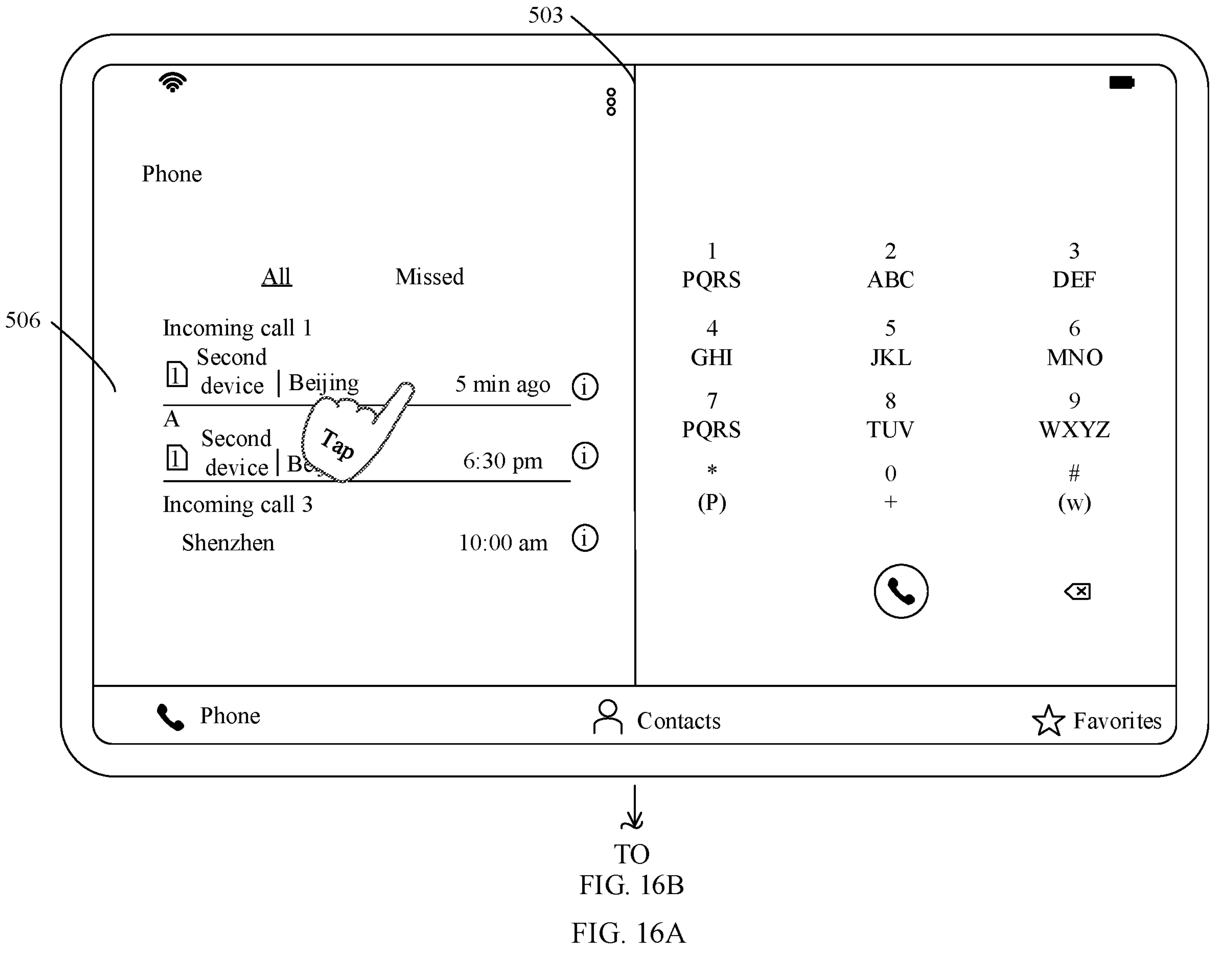
FIG. 16A and FIG. 16B are a tenth schematic diagram of interface display of a first device according to an embodiment of this application.
Figure 16B:
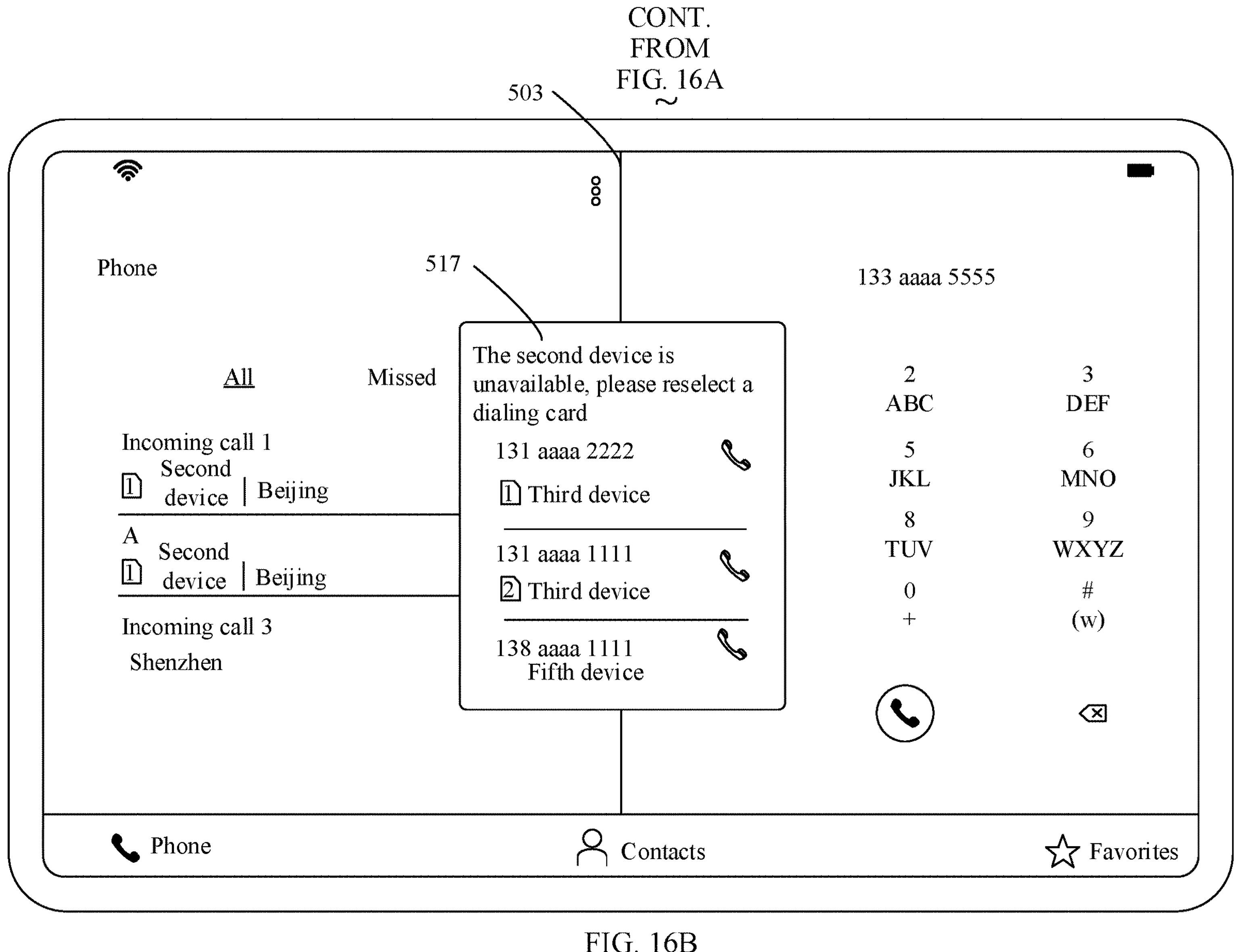

In another possible embodiment, as shown in FIG. 16B, after the user taps the first display bar 506 on the touchscreen, if obtained information about an available SIM card does not include the SIM card identifier a (for example, the SIM card a is configured in the second device, and the second device exits the trust system), the first device displays a third card selection window 517. For example, the third card selection window 517 may be displayed in the middle of the phone application interface 503. For another example, a display location of the third card selection window 517 may span the call record area 504 and the dialing area 505. In addition, the third card selection window 517 is also used to display the information about an available SIM card. The third card selection window 517 may prompt that a device configured with the SIM card a cannot perform a dialing task. For example, the SIM card a is configured in the second device. In a scenario in which the second device exits the trust system, the third card selection window 517 displays a text prompt "The second device is unavailable. Please reselect a dialing card". The third card selection window 517 is also referred to as a second window.

Figure 17A:
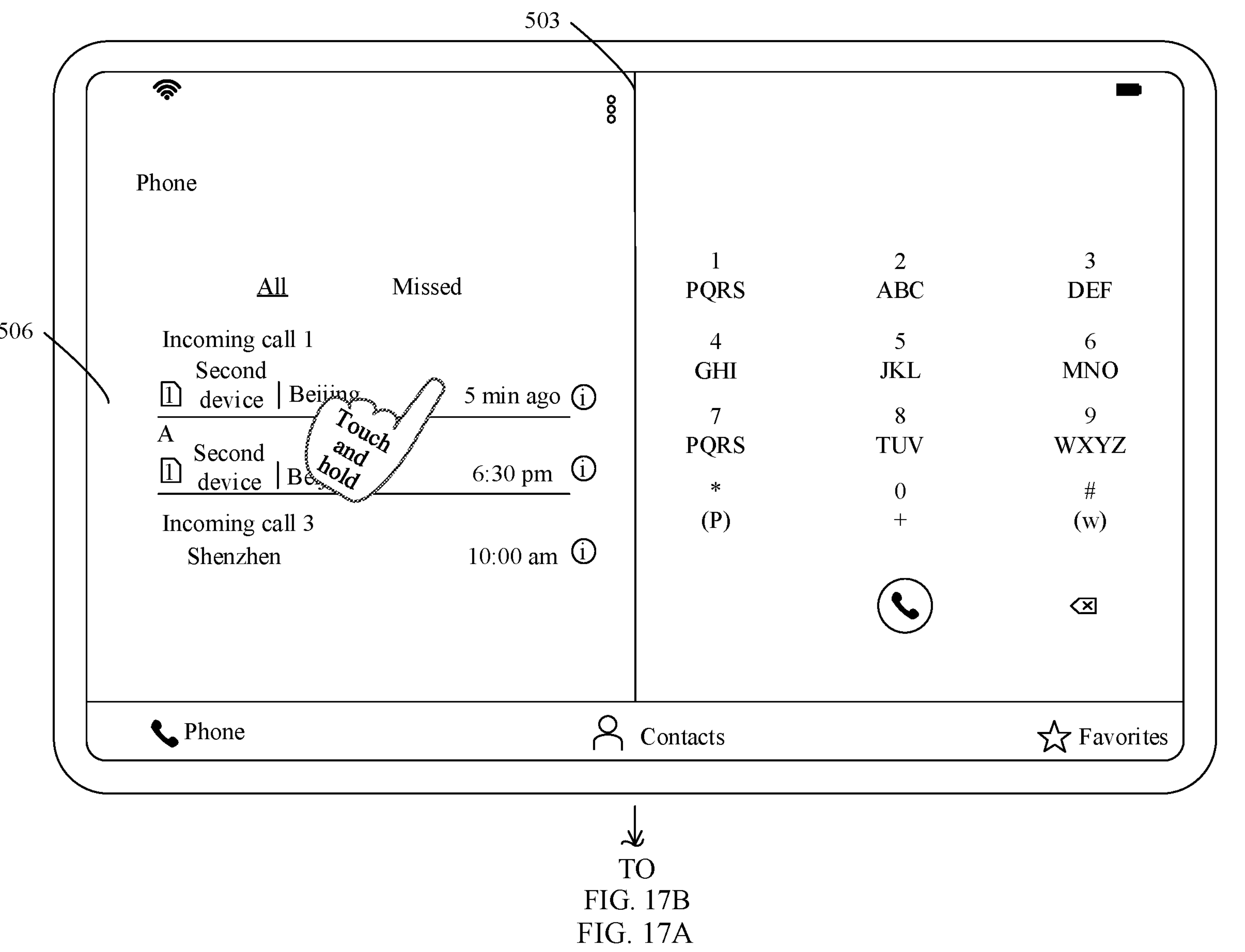
FIG. 17A and FIG. 17B are an eleventh schematic diagram of interface display of a first device according to an embodiment of this application.
Figure 17B:
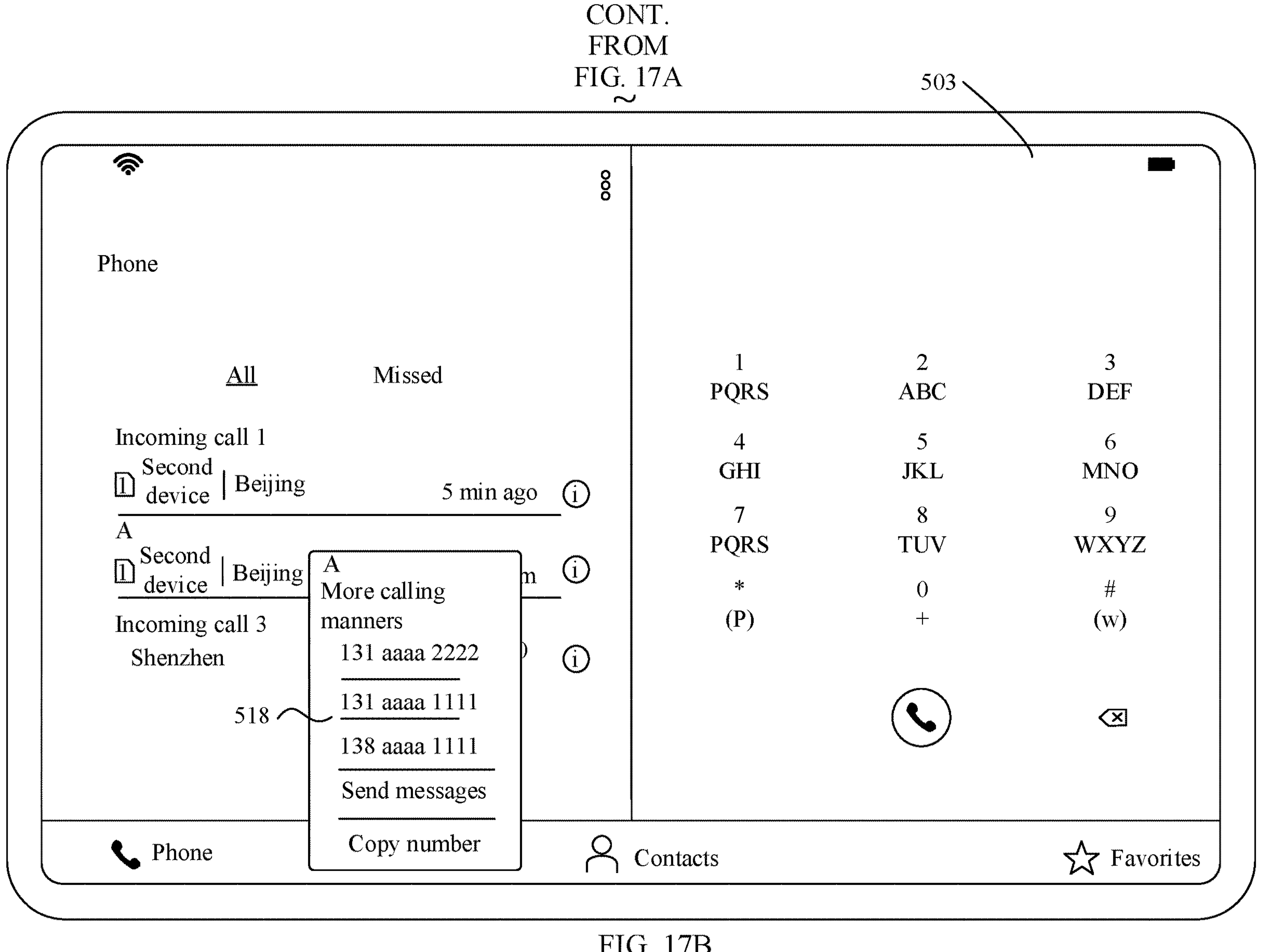

In addition, as shown in FIG. 17B, when the information about an available SIM card does not include the SIM card identifier a, the first device may display a fourth card selection window 518 in response to an operation of touching and holding the first display bar 506 by the user on the touchscreen. The fourth card selection window 518 is also used to display the information about an available SIM card. The fourth card selection window 518 may further display a function key indicating to send a message and a control indicating to copy an MDN number corresponding to a call record.

Figure 10:
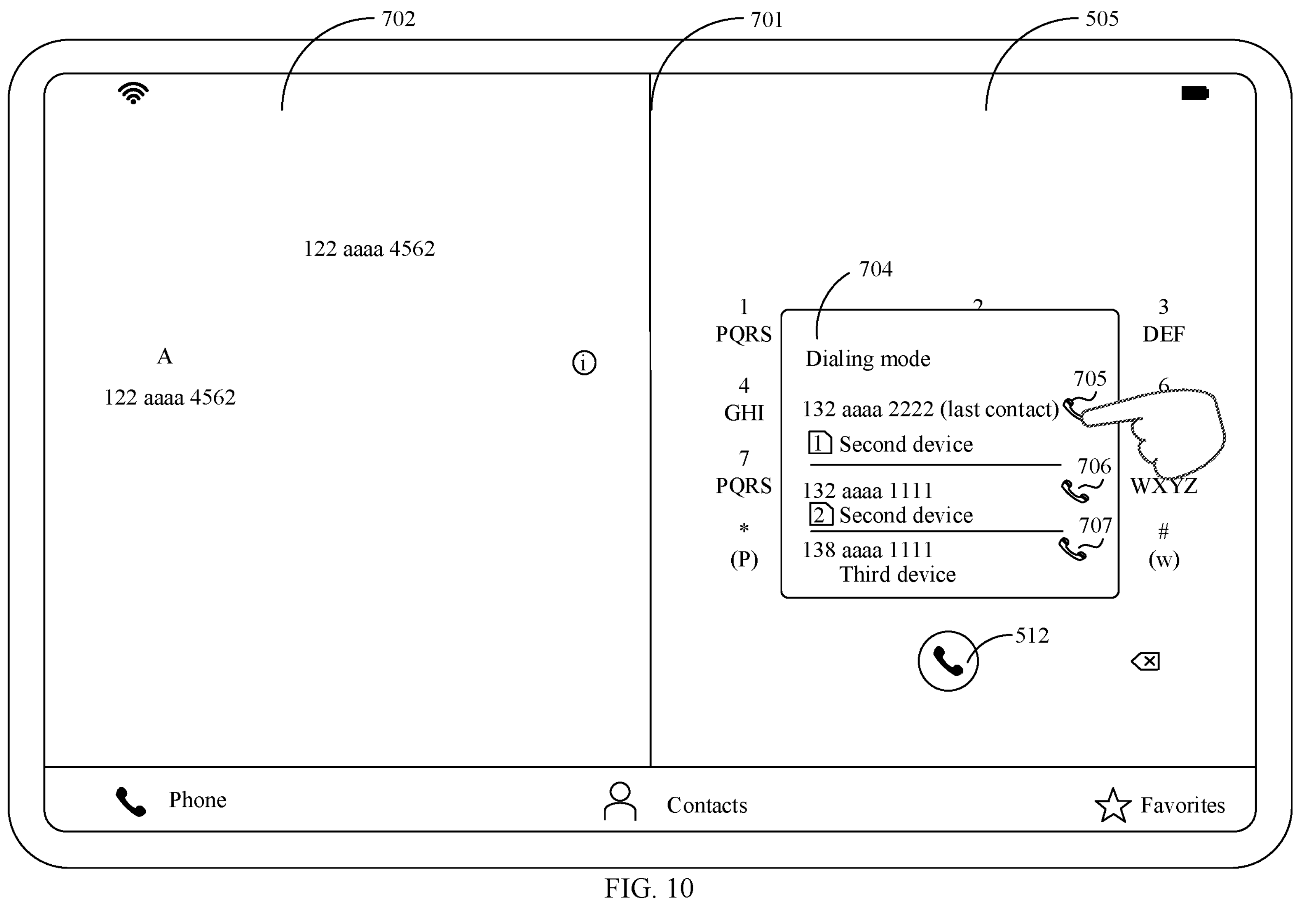
FIG. 10 is a fourth schematic diagram of interface display of a first device according to an embodiment of this application.

In some other instances, as shown in FIG. 9B, after the first device obtains the entered MDN number, the first device may display, as shown in FIG. 10, a second card selection window 704 in the digit dialing interface 701 in response to the operation of tapping the first dialing control 512 by the user on the touchscreen.

For example, the second card selection window 704 may be displayed in the dialing area 505 in the phone application interface 503. For example, the second card selection window 704 shown in FIG. 10 is displayed on an upper side of the first dialing control 512, so that it is convenient for the user to perform selection.

In addition, the second card selection window 704 is used to display the information about an available SIM card, for example, a SIM card identifier and an MDN number corresponding to the SIM card identifier. Similarly, when the information about an available SIM card includes the SIM card identifier a, a reminding identifier is displayed in the second card selection window 704 relative to the SIM card identifier a.

In addition, a dialing control, for example, a seventh dialing control 705, an eighth dialing control 706, and a ninth dialing control 707, is displayed corresponding to each SIM card identifier in the second card selection window 704. The seventh dialing control 705 corresponds to the SIM card identifier "card 1 of the second device", the eighth dialing control 706 corresponds to the SIM card identifier "card 2 of the second device", and the ninth dialing control 707 corresponds to the SIM card identifier "SIM card of the device 3".

In this scenario, in response to an operation indicating to select a dialing control from the second card selection window 704, the first device may determine a SIM card, also referred to as a dialing card, used to perform a dialing task. For example, in response to an operation of tapping the seventh dialing control 705 by the user on the touchscreen, the first device may determine to dial, by using the "card 1 of the second device", an MDN number entered by the user. The MDN number that needs to be dialed may also be referred to as a to-be-dialed number.

In some other instances, as shown in FIG. 11B, during display of the call details interface 801, the first device may display, as shown in FIG. 12, a fifth card selection window 803 in the call details interface 801 in response to an operation indicating to dial a mobile number "122 aaaa 4562". The operation indicating to dial the mobile number "122 aaaa 4562" may be that the user taps the second dialing control 804 on the touchscreen.

For example, the fifth card selection window 803 may be displayed in the details area 802 of the call details interface 801, for example, displayed on a lower side of the second dialing control 804. The fifth card selection window 803 is used to display the information about an available SIM card, for example, an identifier of an available SIM card and an MDN number corresponding to the SIM card identifier. In addition, when the information about an available SIM card includes the SIM card identifier a, a reminding identifier is displayed in the fifth card selection window 803 relative to the SIM card identifier a, for example, text "last contact" is displayed.

In addition, a dialing control, for example, a tenth dialing control 805, an eleventh dialing control 806, and a twelfth dialing control 807, is displayed corresponding to each SIM card identifier in the fifth card selection window 803. The tenth dialing control 805 corresponds to the SIM card identifier "card 1 of the second device", the eleventh dialing control 806 corresponds to the SIM card identifier "card 2 of the second device", and the twelfth dialing control 807 corresponds to the SIM card identifier "SIM card of the device 3". In this scenario, the user may tap a dialing control in the fifth card selection window 803 on the touchscreen, to indicate the first device to select a SIM card used to perform dialing. For example, as shown in FIG. 12, the user taps the tenth dialing control 805 on the touchscreen, and the first device may determine, in response to the operation, to dial a corresponding mobile number "122 aaaa 4562" of A by using the "card 1 of the second device". The MDN number that needs to be dialed may also be referred to as a to-be-dialed number.

In some other examples, as shown in FIG. 14B, when the first device displays the contacts interface 904, the first device may display a sixth card selection window 909 in the contacts interface 904 in response to an operation indicating to dial the mobile number "122 aaaa 4562". The operation indicating to dial the mobile number "122 aaaa 4562" may be that the user taps the third dialing control 908 on the touchscreen.

For example, the sixth card selection window 909 may be displayed in the contact details area 906, for example, displayed on a lower side of the third dialing control 908. The sixth card selection window 909 is used to display the information about an available SIM card, for example, an identifier of an available SIM card and an MDN number corresponding to the SIM card identifier.

In addition, a dialing control, for example, a thirteenth dialing control 910, a fourteenth dialing control 911, and a fifteenth dialing control 912, is displayed corresponding to each SIM card identifier in the sixth card selection window 909. The thirteenth dialing control 910 corresponds to the SIM card identifier "card 1 of the second device", the fourteenth dialing control 911 corresponds to the SIM card identifier "card 2 of the second device", and the fifteenth dialing control 912 corresponds to the SIM card identifier "SIM card of the device 3". In this scenario, the user may tap a dialing control in the sixth card selection window 909 on the touchscreen, to indicate the first device to select a SIM card used to perform dialing. For example, the user taps the thirteenth dialing control 910 on the touchscreen, and the first device may determine, in response to the operation, to dial the number "122 aaaa 4562" by using the "card 1 of the second device". The MDN number that needs to be dialed may also be referred to as a to-be-dialed number.

In subsequent embodiments, an example in which the to-be-dialed number is a first number is used for description. In addition, the first number may be an MDN number of the third SIM card, and the third SIM card is configured in the fourth device.

A104: After the user selects a dialing card, the first device displays a call waiting interface.

In some embodiments, after the user selects the dialing card, the first device may indicate the dialing card to dial a corresponding to-be-dialed number. If the dialing card selected by the user is in an idle state, for example, the user selects the "card 1 of the second device" as the dialing card, when the "card 1 of the second device" is not in a call, it is determined that the "card 1 of the second device" is idle. In this scenario, the first device displays the call waiting interface, for example, displays a first waiting interface 1001 (which is also referred to as a second interface) shown in FIG. 18, to prompt the user to wait for answering of a call. The first waiting interface 1001 may include the first number, an identifier of the first SIM card, information prompting to waiting for answering, and the like. In addition, the first device sends a dialing instruction to the second device, and the dialing instruction may indicate the second device to send a session request to the fourth device, that is, indicate the second device to dial the first number by using the "card 1 of the second device". Certainly, a sequence of displaying the first waiting interface 1001 and sending the dialing instruction to the second device is not limited in this embodiment of this application.

After the second device gets through, the second device may indicate the first device to perform switching to display a call-connected interface.

Figure 19:
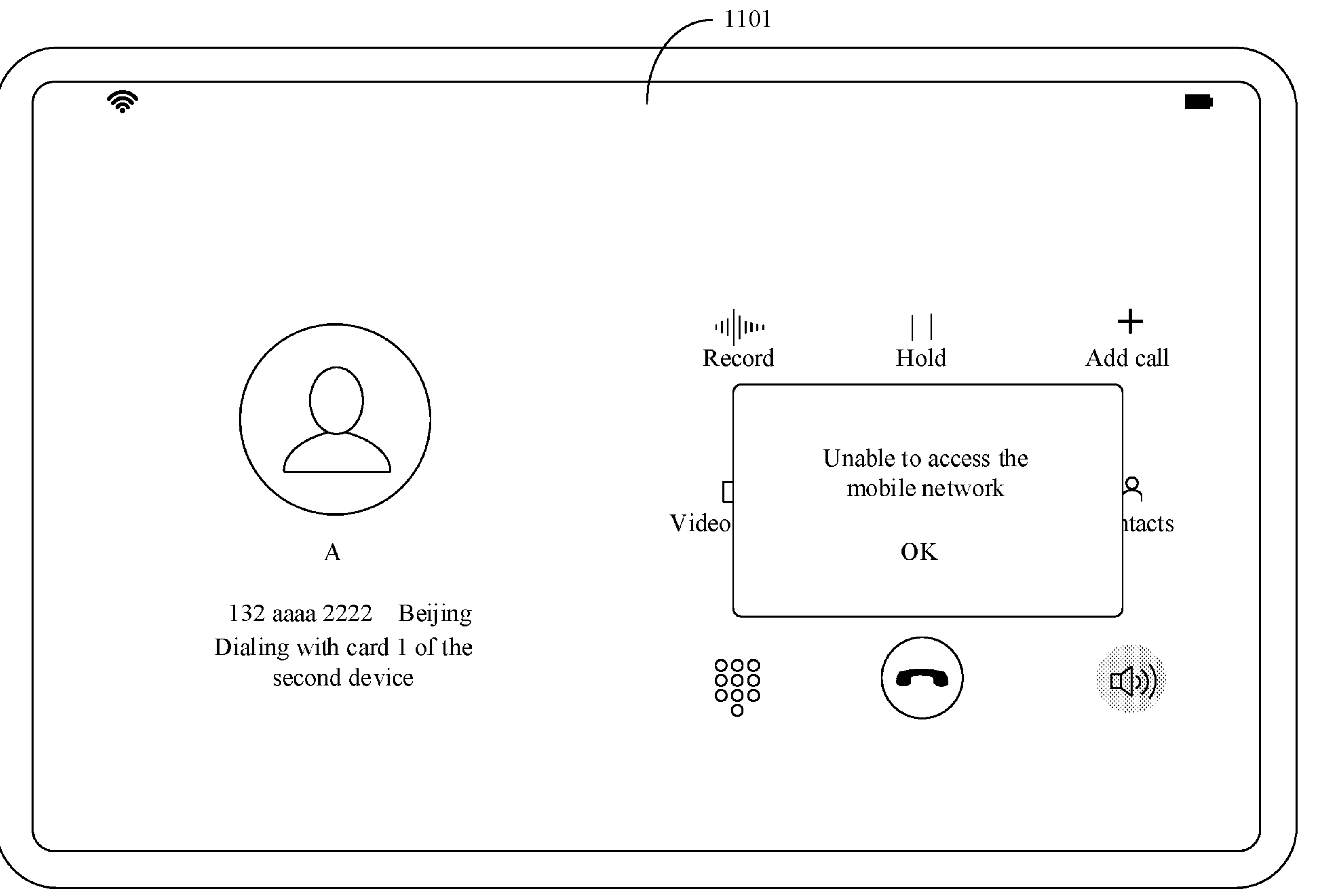
FIG. 19 is a thirteenth schematic diagram of interface display of a first device according to an embodiment of this application.

If the dialing card selected by the user is busy (for example, the card is being in a call), for example, when the user selects the "card 1 of the second device" as the dialing card, if the "card 1 of the second device" is being in a call, it is determined that the "card 1 of the second device" is busy. In this scenario, the first device displays a second waiting interface 1101 shown in FIG. 19, and prompts, by using a second pop-up box in the second waiting interface 1101, the user that dialing performed by the second device fails. A text reminder "The mobile network cannot be accessed" is displayed in the second pop-up box.

In another embodiment, when no SIM card is configured in the first device and there is no available SIM card in the trust system, for example, no SIM card is configured for another device in the trust system, or the first device has no permission to use a SIM card in the trust system, the first device may perform corresponding reminding.

A scenario in which no SIM card is configured in the first device and the first device does not join any trust system, and a scenario in which no SIM card is configured in the first device and there is no available SIM card in a corresponding trust system (for example, no SIM card is configured in another device in the trust system, or the first device has no permission to use a SIM card in the trust system) are collectively referred to as a first scenario below.

Figure 20:
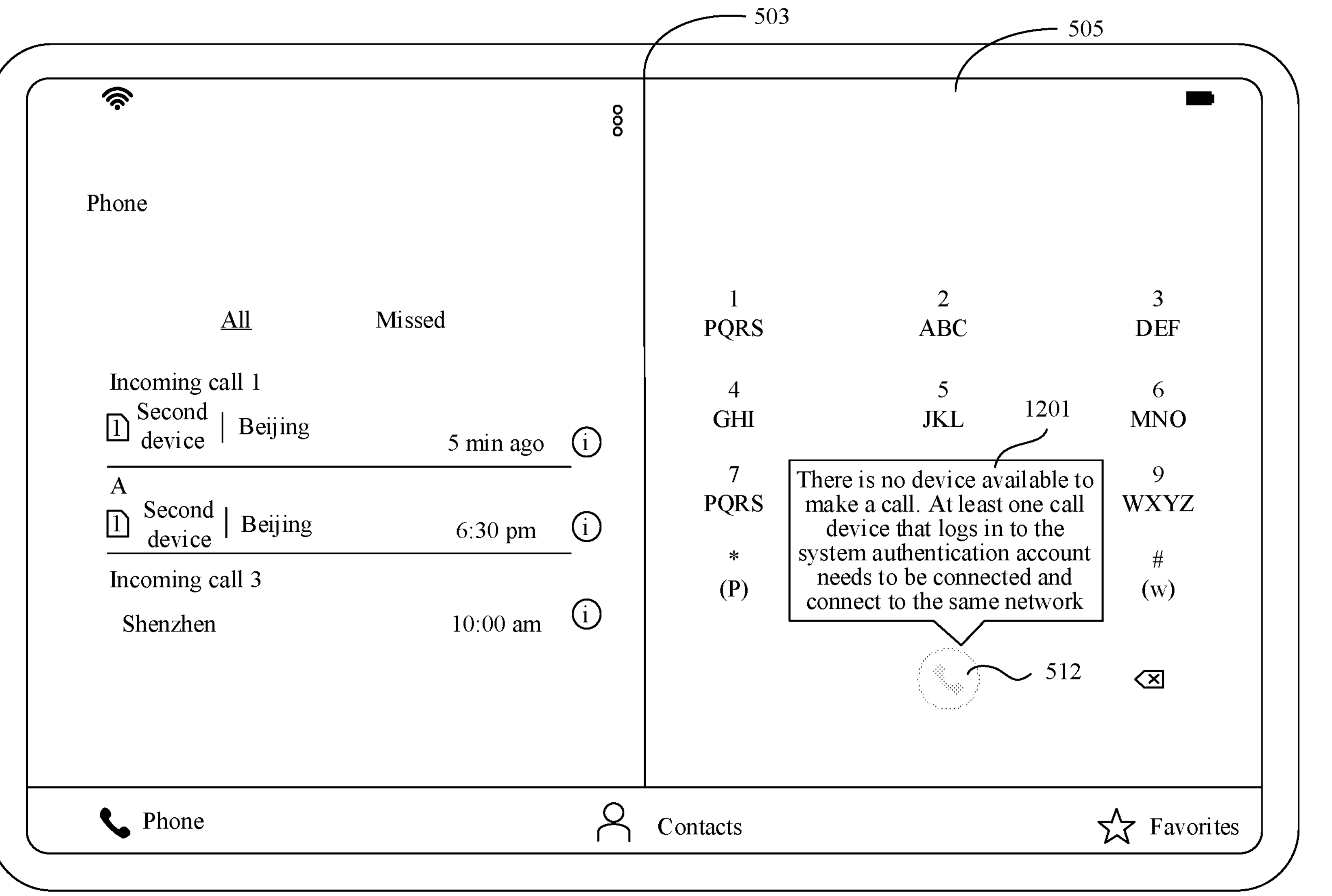
FIG. 20 is a fourteenth schematic diagram of interface display of a first device according to an embodiment of this application.

In the first scenario, the first device displays a home screen in response to a third operation. During display of the home screen, in response to an operation (for example, referred to as a fourth operation) indicating to enable the phone application, the first device displays the phone application interface 503, for example, referred to as a fourth interface, shown in FIG. 20. In the phone application interface 503, the first dialing control 512 is in a state in which the first dialing control cannot be selected. In addition, a prompt window (for example, referred to as a first pop-up box) may be displayed corresponding to the first dialing control 512, to remind the user that dialing cannot be performed currently. For example, a first prompt window 1201 is displayed. The first prompt window 1201 may be displayed in the dialing area 505, for example, displayed on the upper side of the first dialing control 512.

After the first device displays the first prompt window 1201, in response to a touch operation performed by the user at any location on the touchscreen, the first device may further cancel display of the first prompt window 1201. Then, in the first scenario, the first device may further display the first prompt window 1201 again in response to an operation indicating to run the phone application.

In some embodiments, the first device may further limit a quantity of times of displaying the first prompt window 1201, for example, limit the quantity of times of displaying the first prompt window 1201 to 3. In this way, after the first device activates the system and on the premise that the first device determines that the first device is in the first scenario, the first device may display the first prompt window 1201 during first three times of performing switching to display the phone application interface 503. After the first prompt window 1201 is displayed more than three times, the first prompt window 1201 is no longer displayed.

Figure 21:
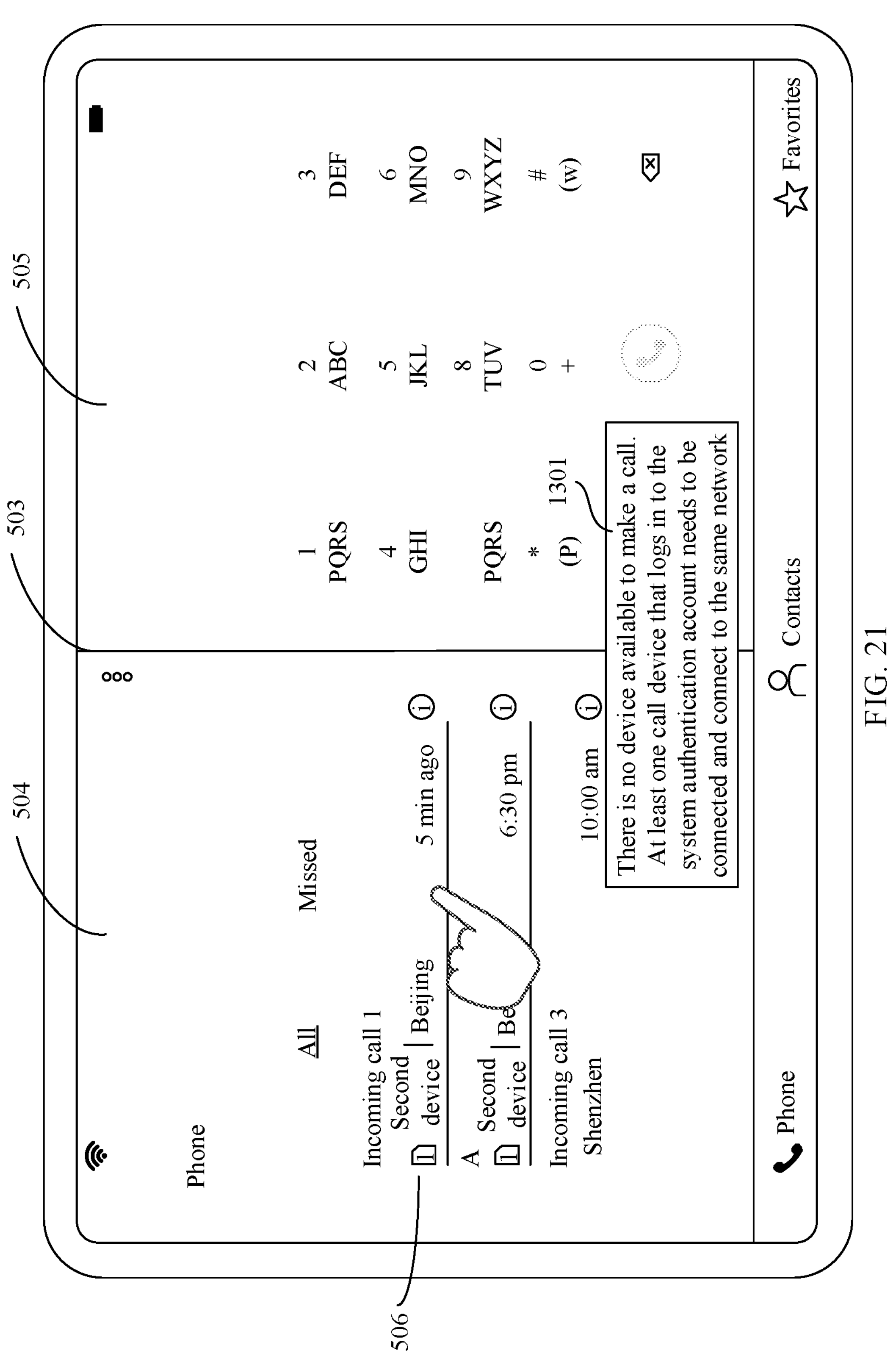
FIG. 21 is a fifteenth schematic diagram of interface display of a first device according to an embodiment of this application.

For example, as shown in FIG. 21, in the first scenario, the first device displays a second prompt window 1301 in response to an operation of tapping the first display bar 506 by the user on the touchscreen, to remind the user again that a call cannot be made by using the first device. For example, a display location of the second prompt window 1301 may span the call record area 504 and the dialing area 505.

Figure 22:
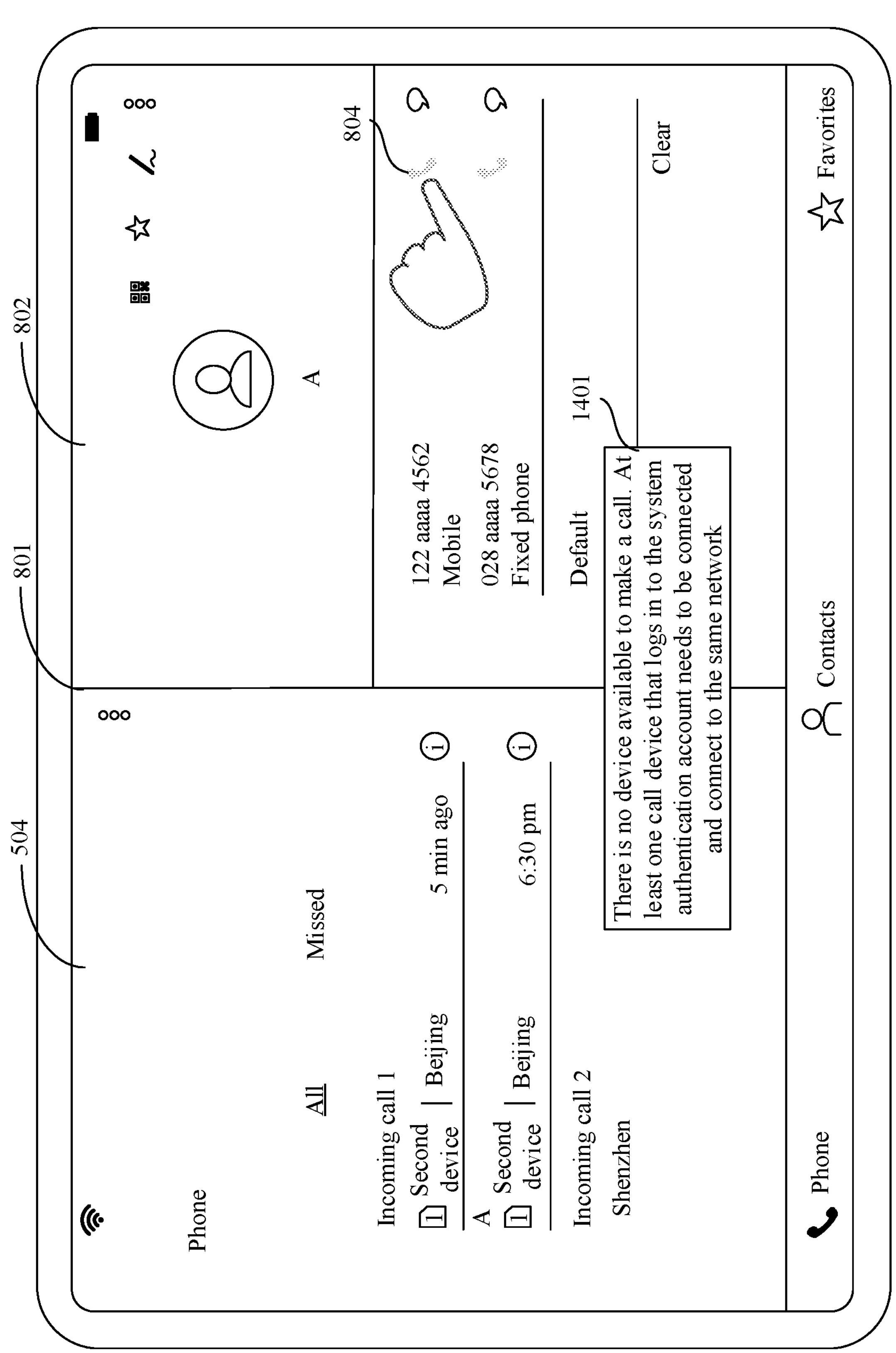
FIG. 22 is a sixteenth schematic diagram of interface display of a first device according to an embodiment of this application.

For another example, as shown in FIG. 22, in the first scenario, when the first device displays the call details interface 801, the first device may display a third prompt window 1401 in response to an operation of tapping the second dialing control 804 by the user on the touchscreen, to remind the user again that a call cannot be made by using the first device. For example, a display location of the third prompt window 1401 may span the call record area 504 and the details area 802.

Figure 23:
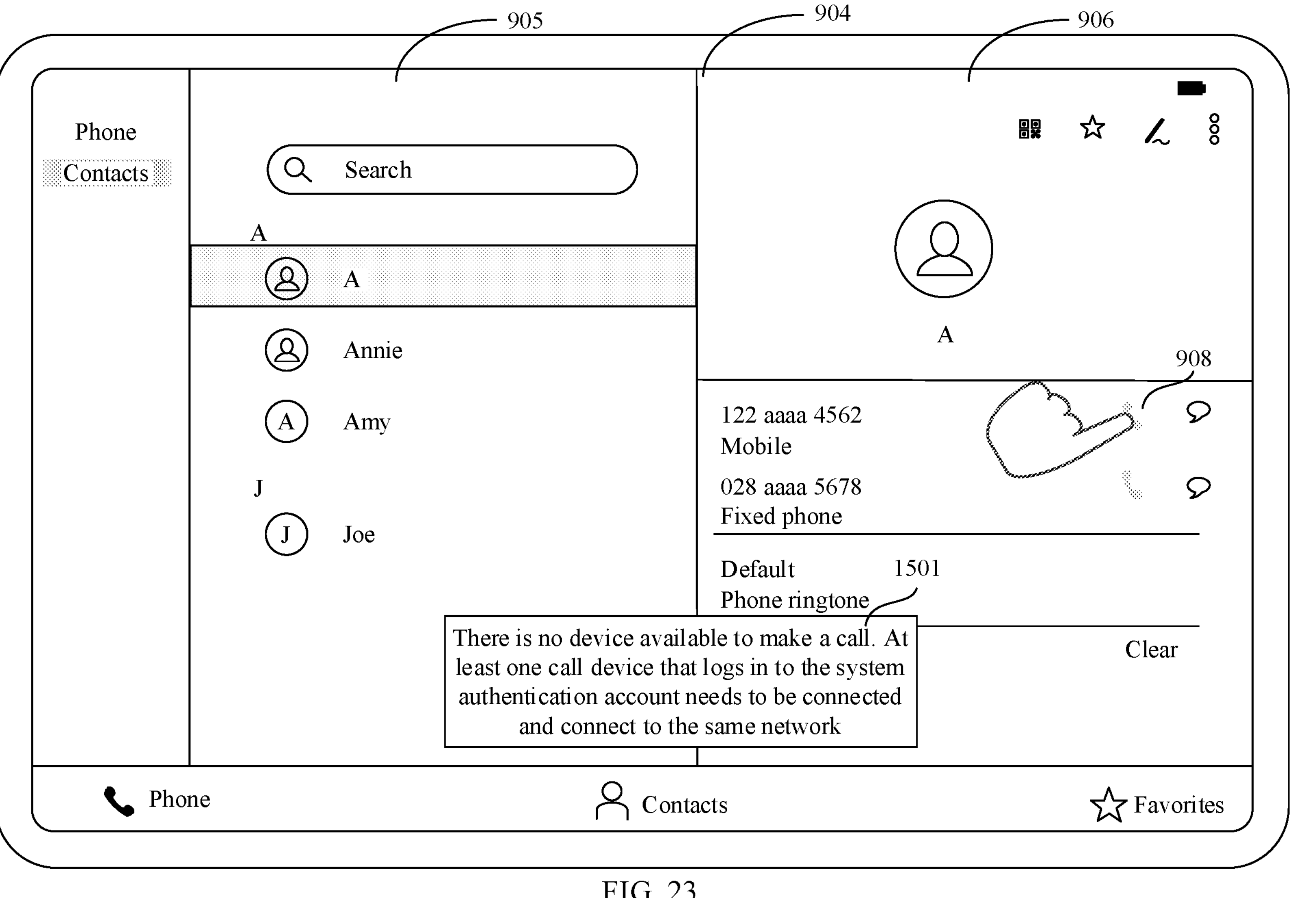
FIG. 23 is a seventeenth schematic diagram of interface display of a first device according to an embodiment of this application.

For another example, as shown in FIG. 23, in the first scenario, when the first device displays the contacts interface 904, the first device may display a fourth prompt window 1501 in response to an operation of tapping the third dialing control 908 by the user on the touchscreen, to remind the user again that a call cannot be made by using the first device. For example, a display location of the fourth prompt window 1501 may span the contacts list area 905 and the contact details area 906.

A scenario in which no SIM card is configured in the first device and a SIM card exists in a corresponding trust system is referred to as a second scenario below.

Figure 24:
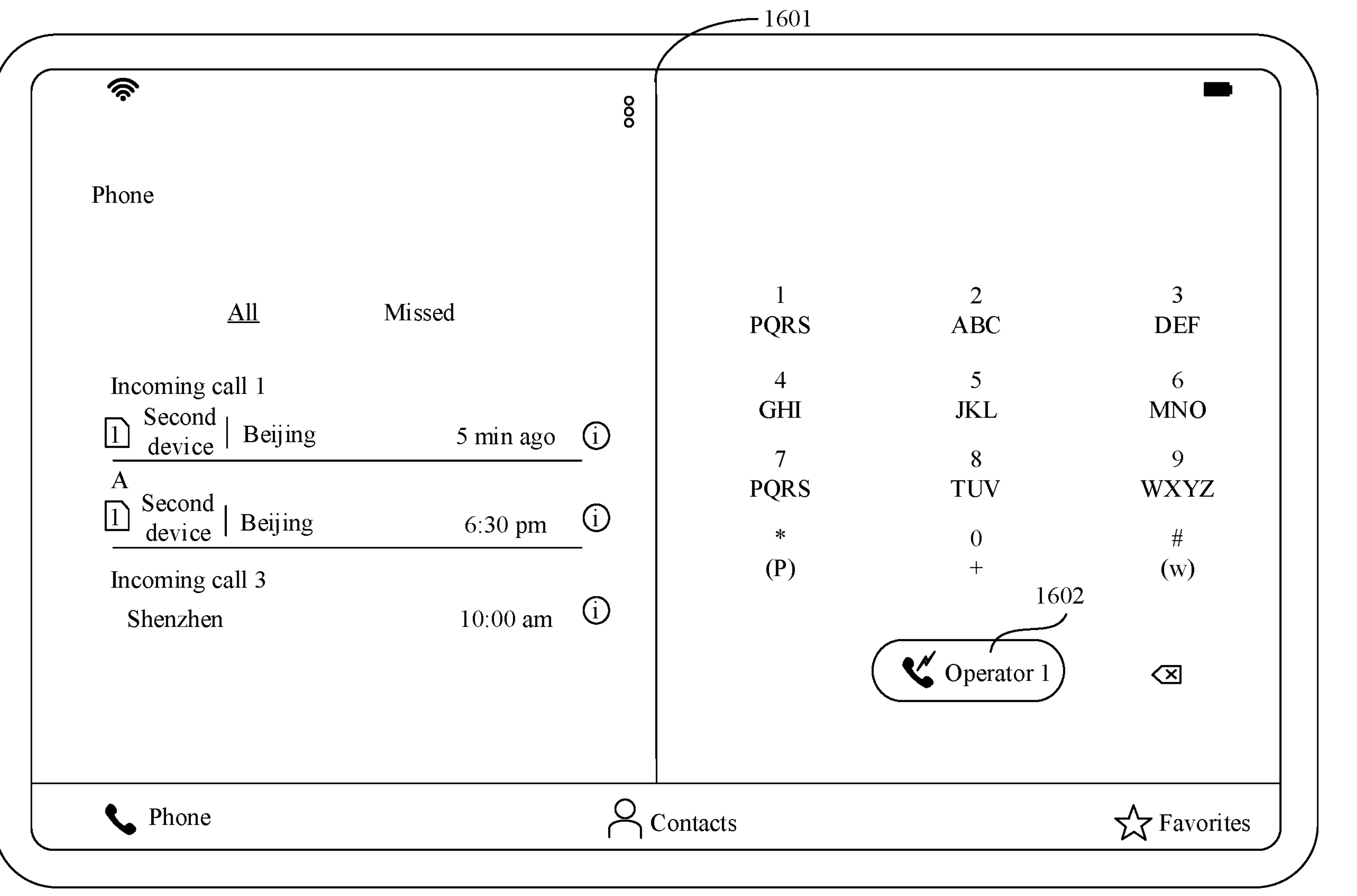
FIG. 24 is an eighteenth schematic diagram of interface display of a first device according to an embodiment of this application.

In the second scenario, when the first device determines that an available SIM card exists in the trust system, for example, when a SIM card 1 (which is also referred to as a first SIM card) is configured in only the second device in the trust system, the first device displays, in response to an operation indicating to enable the phone application, a first phone interface 1601 shown in FIG. 24. The first phone interface 1601 includes a sixteenth dialing control 1602. The sixteenth dialing control 1602 corresponds to the SIM card 1 in the second device. During display of the first phone interface 1601, the user may tap the sixteenth dialing control 1602 on the touchscreen, to indicate the first device to perform dialing by using the SIM card 1 in the second device.

Figure 25:
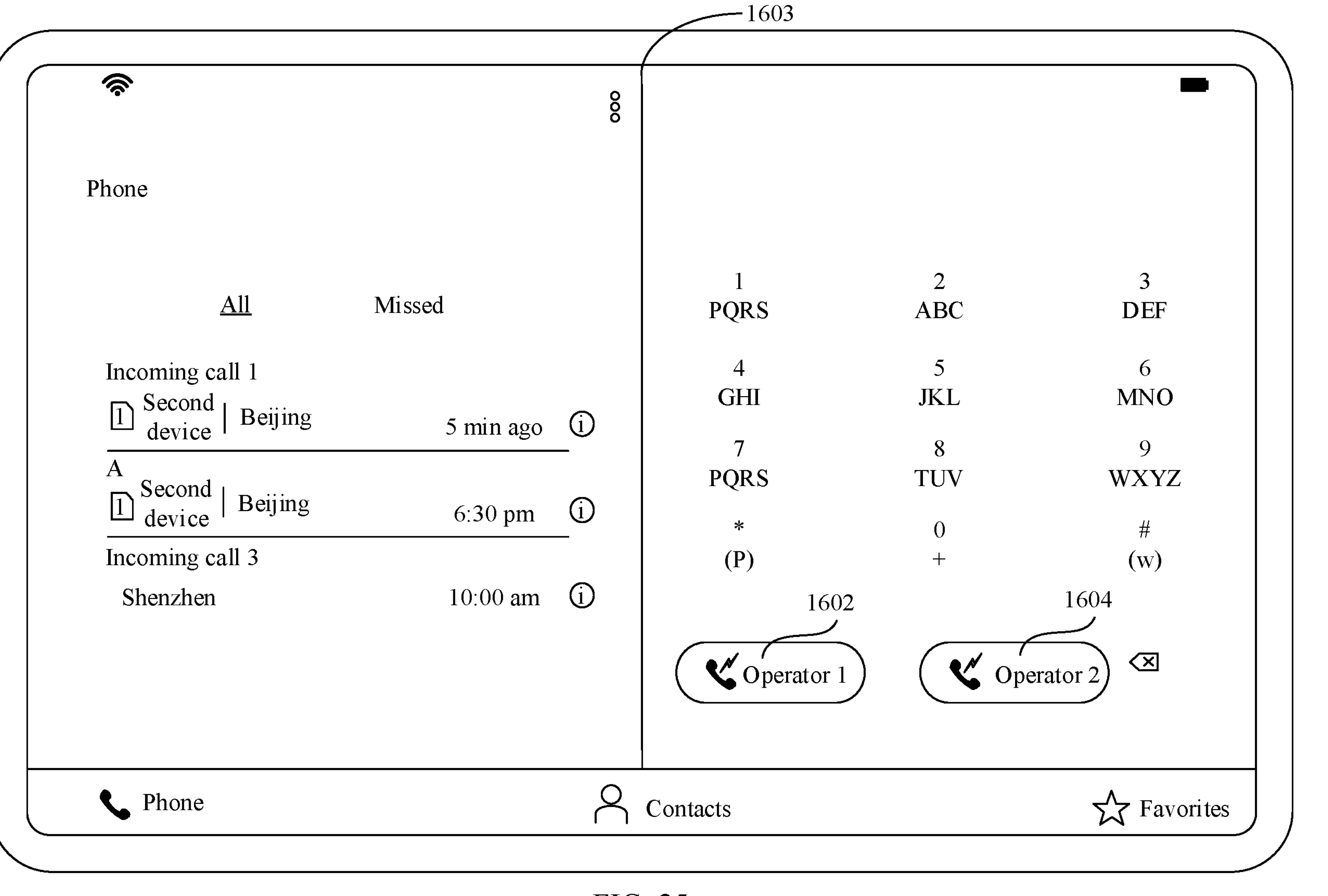
FIG. 25 is a nineteenth schematic diagram of interface display of a first device according to an embodiment of this application.

In the second scenario, when the first device determines that two SIM cards exist in the trust system, for example, when a SIM card 1 and a SIM card 2 are configured in the second device in the trust system, the first device displays, in response to an operation indicating to enable the phone application, a second phone interface 1603, which may also be referred to as a first interface, shown in FIG. 25. The second phone interface 1603 includes a sixteenth dialing control 1602 and a seventeenth dialing control 1604. The sixteenth dialing control 1602 corresponds to the SIM card 1 of the second device, and the seventeenth dialing control 1604 corresponds to the SIM card 2 of the second device. During display of the second phone interface 1603, the user taps the sixteenth dialing control 1602 on the touchscreen, to indicate the first device to perform dialing by using the SIM card 1 in the second device. When receiving an operation performed by the user on the seventeenth dialing control 1604, the first device indicates the first device to perform dialing by using the SIM card 2 in the second device.

Figure 26:
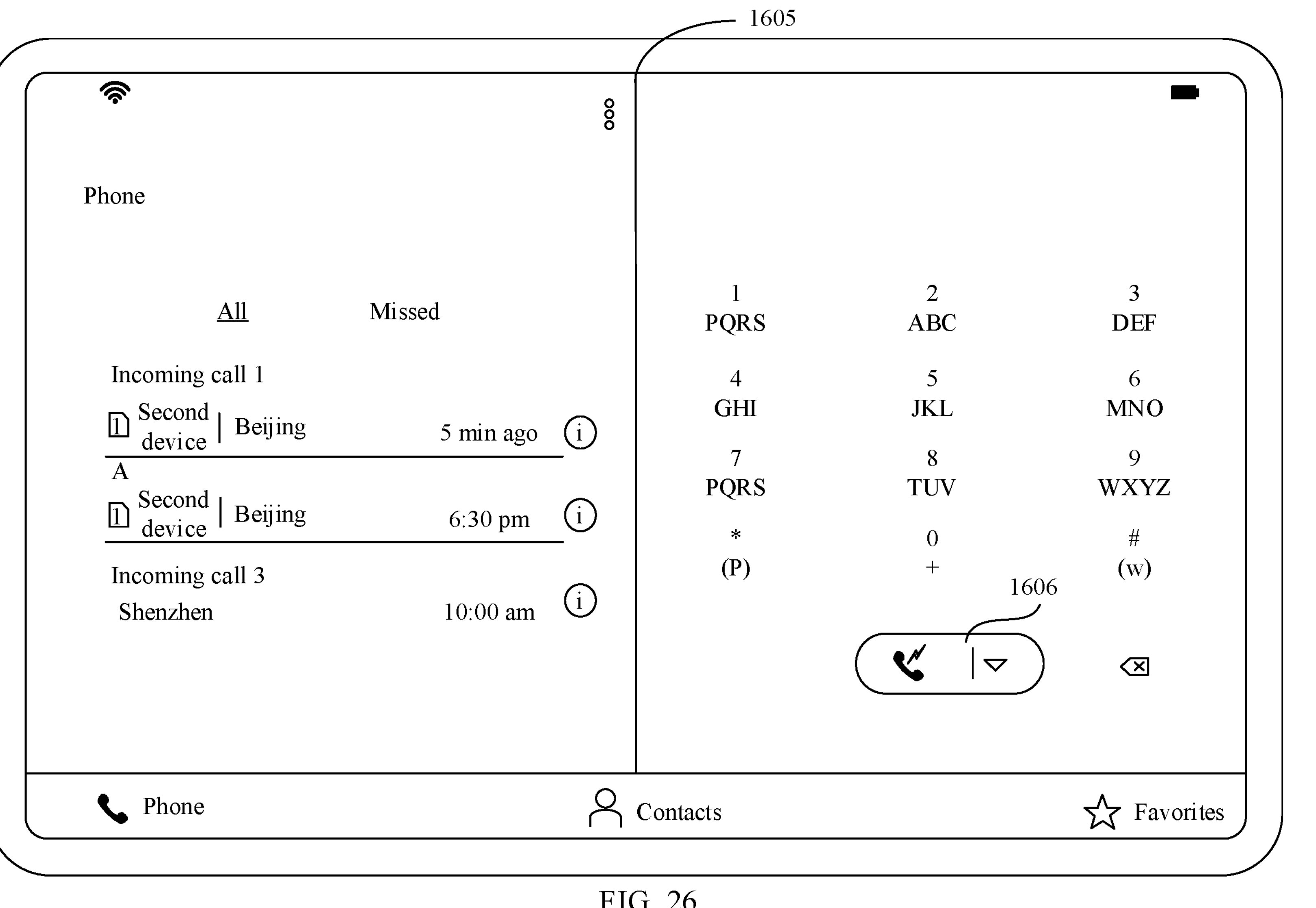
FIG. 26 is a twentieth schematic diagram of interface display of a first device according to an embodiment of this application.
Figure 27:
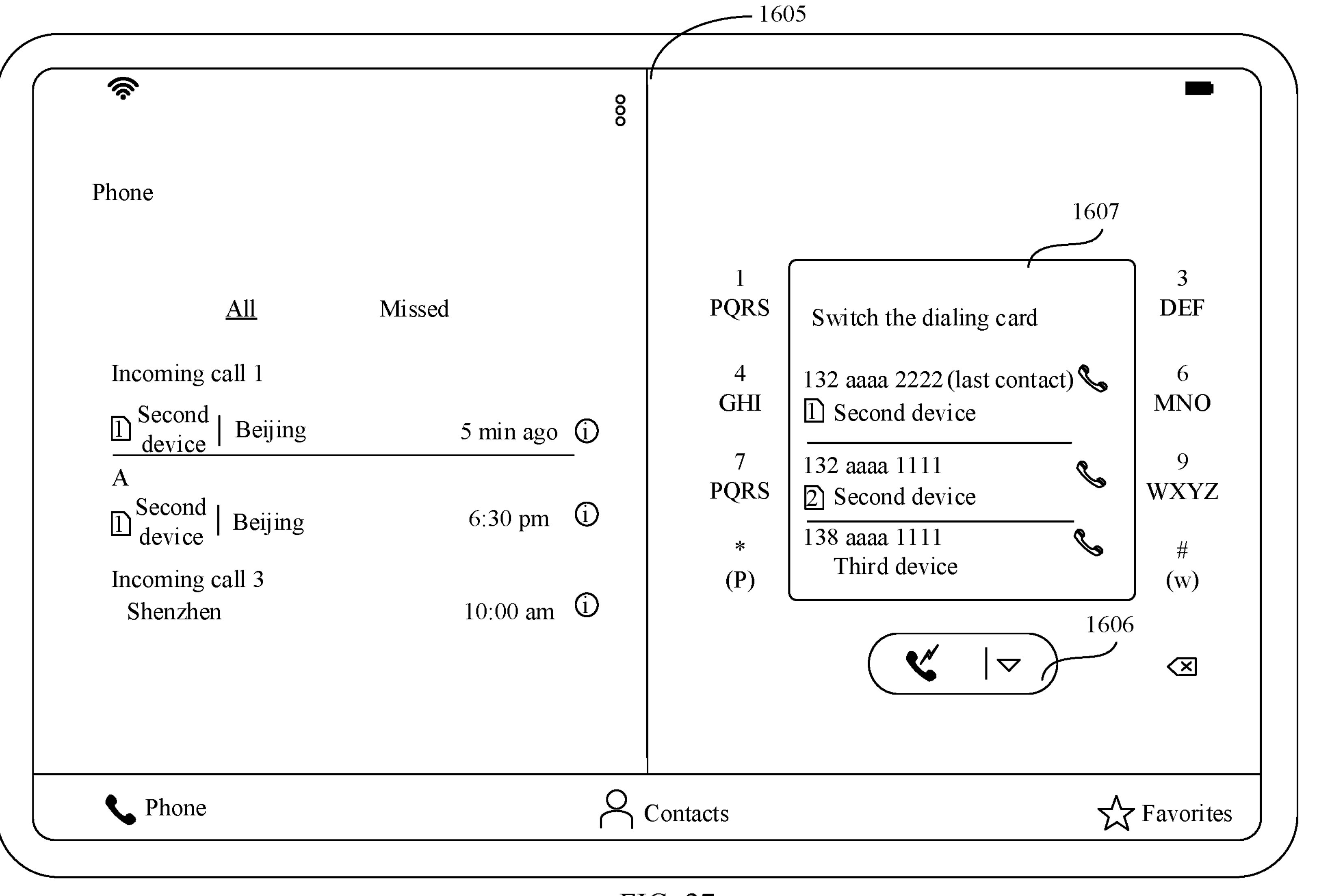
FIG. 27 is a twenty-first schematic diagram of interface display of a first device according to an embodiment of this application.

In the second scenario, when the first device determines that at least three available SIM cards exist in the trust system, for example, when a SIM card 1 and a SIM card 2 are configured in the second device in the trust system, and a SIM card (for example, referred to as a second SIM card) is also configured in the third device, the first device displays, in response to an operation of enabling the phone application, a third phone interface 1605 shown in FIG. 26. The third phone interface 1605 includes an eighteenth dialing control 1606. During the third phone interface 1605, the user may tap the eighteenth dialing control 1606 on the touchscreen, to indicate the first device to display a number selection window 1607 in the third phone interface 1605, as shown in FIG. 27. The user may perform, on the touchscreen, an operation indicating to select a SIM card from the number selection window 1607. The first device may also determine, in response to the operation, a SIM card, that is, a dialing card, selected by the user to perform dialing.

In another possible embodiment, a default card may be further configured in the first device in advance. In this way, when the first device receives the operation 1 that is of the user and that indicates to perform dialing, and the information about an available SIM card includes the default card, the default card may be directly used as the dialing card.

Figure 28:
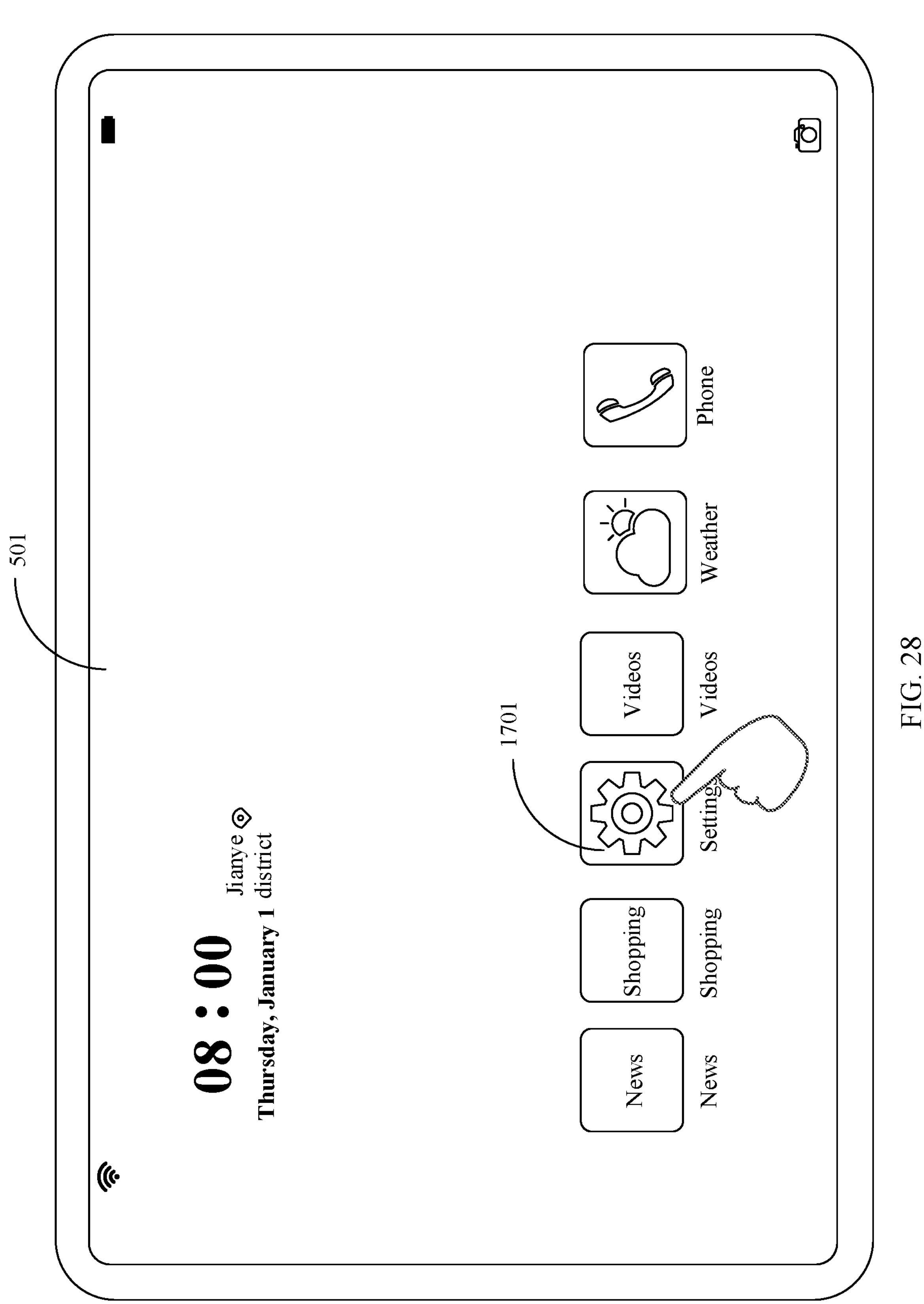
FIG. 28 is a twenty-second schematic diagram of interface display of a first device according to an embodiment of this application.
Figure 29:
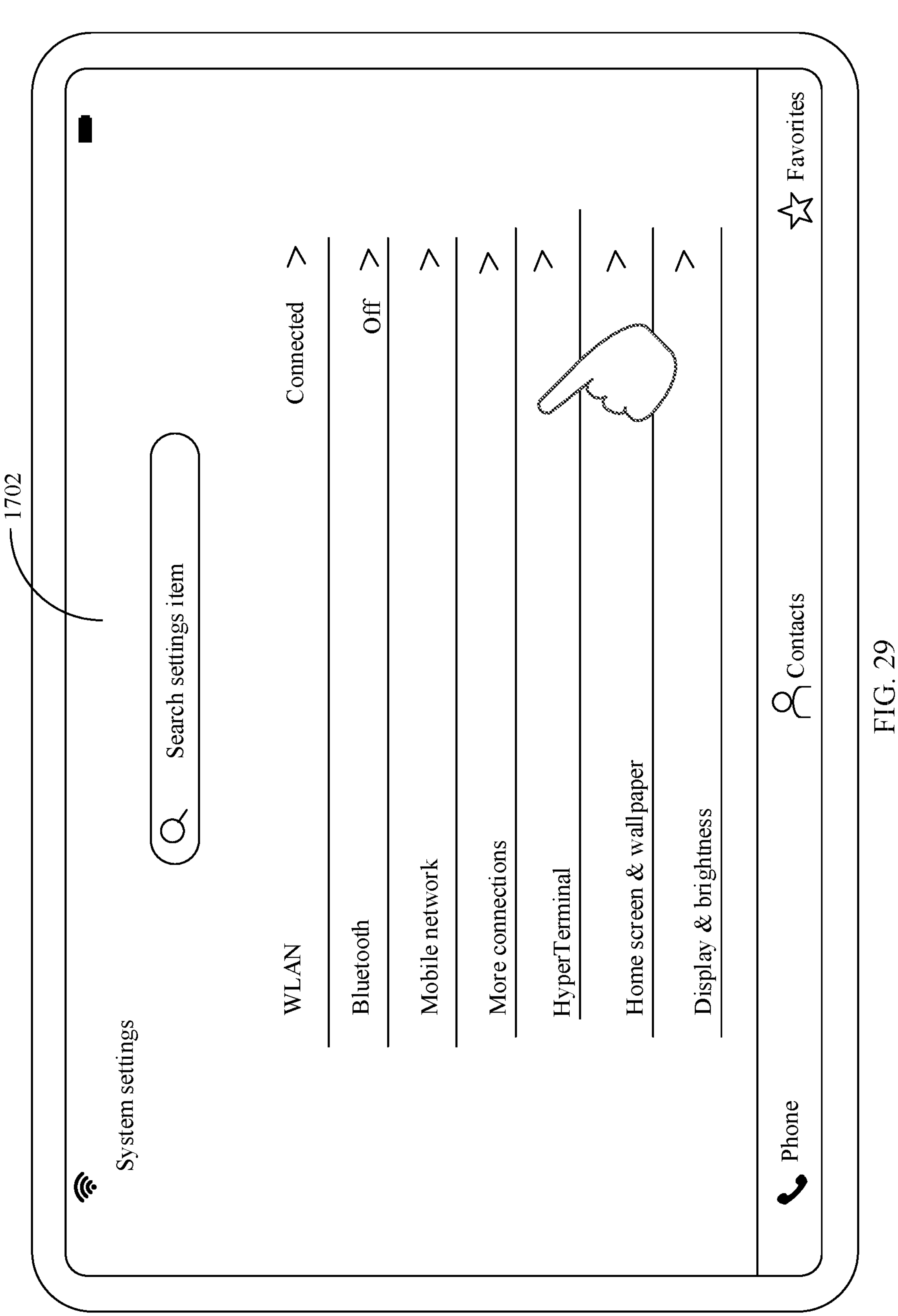
FIG. 29 is a twenty-third schematic diagram of interface display of a first device according to an embodiment of this application.
Figure 30:
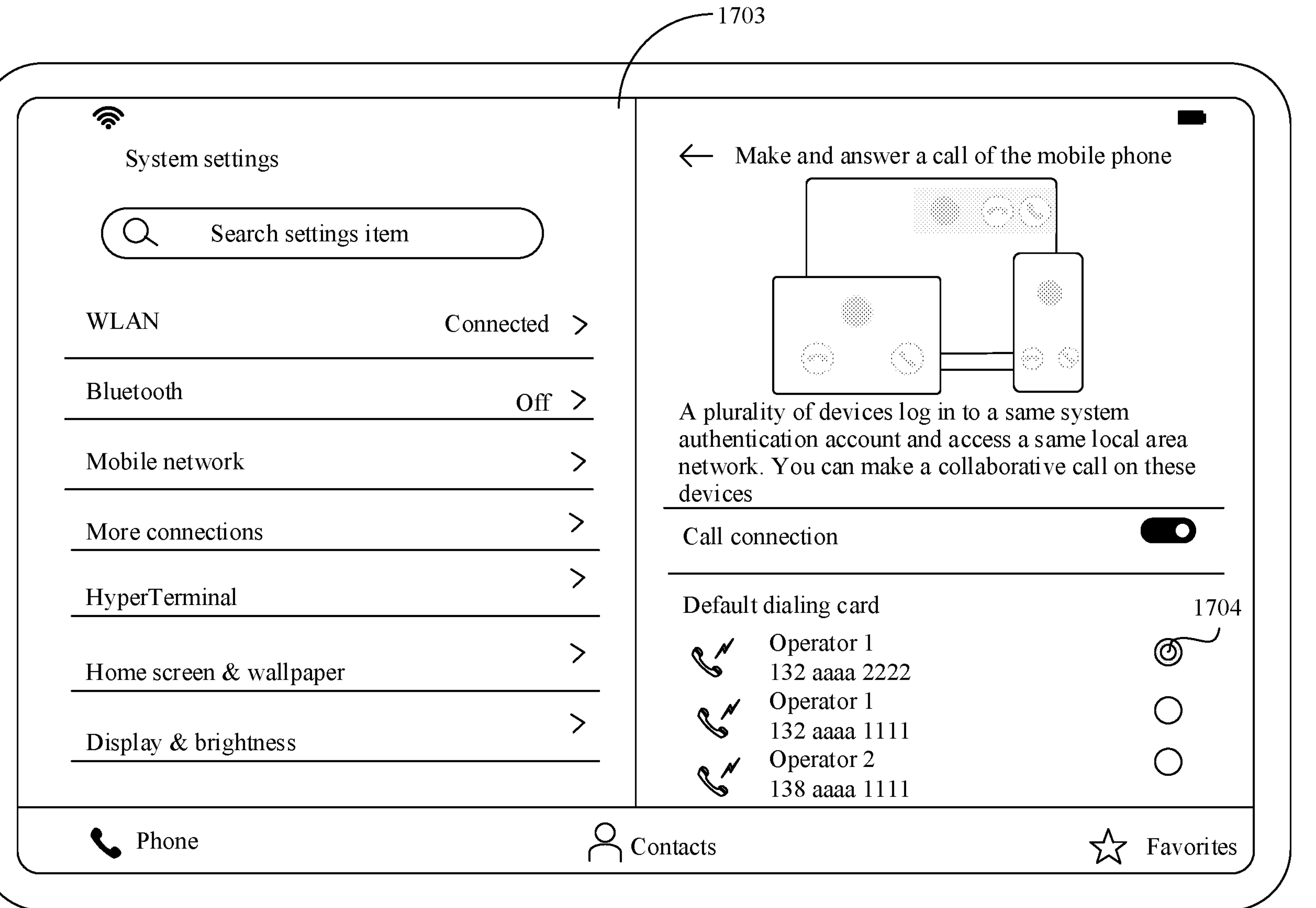
FIG. 30 is a twenty-fourth schematic diagram of interface display of a first device according to an embodiment of this application.

For example, as shown in FIG. 28, the first device includes a system icon 1701. When the first device displays the home screen 501, the user may tap the system icon 1701 on the touchscreen, to indicate the first device to display a system settings interface 1702 shown in FIG. 29. The system settings interface 1702 includes a HyperTerminal configuration item. During display of the system settings interface 1702, the first device displays, in response to an operation of tapping the HyperTerminal configuration item by the user on the touchscreen, a second configuration interface 1703 shown in FIG. 30. The second configuration interface 1703 displays the information about an available SIM card, for example, displays an MDN number in SIM card information. In addition, in the second configuration interface 1703, one selection control is displayed corresponding to each MDN number, for example, a second selection control 1704 is displayed corresponding to an MDN number "132 aaaa 2222". When a selection control corresponding to an MDN number is in a selected state, a SIM card corresponding to the MDN number is the default card. Certainly, during display of the second configuration interface 1703, the user may tap, on the touchscreen, a selection control corresponding to an MDN number, to indicate the first device to use a SIM card corresponding to the selected MDN number through tapping as the default card. In other words, during display of the second configuration interface 1703, the first device may set the default card in response to an operation of the user. In another embodiment, when a SIM card is configured in the first device, the SIM card configured in the first device may be referred to as a local card. In this scenario, if the user does not manually configure the default card, the first device may use the local card as an initial default card.

It may be understood that implementation of steps A102-A104 needs to be implemented through data exchange between the first device and another device in the trust system. For example, the another device is the second device. As shown in FIG. 6A and FIG. 6B, a process of interaction between the first device and the second device is as follows:

S205: The phone application of the first device sends first notification information to the first call service module in response to the operation 1 indicating to make a call.

In some embodiments, the first notification information is used to indicate the first call service module to start to query a SIM card that can be currently used by the first device.

S206: In response to receiving the first notification information, the first call service module sends first query information to the first Device Profile module, to indicate to query an available SIM card.

It may be understood that the first Device Profile module may access the specified storage area that stores the SIM card status information 1. In this way, the first call service module may send the first query information to the first Device Profile module to indicate the first Device Profile module to access the specified storage area, to obtain the SIM card status information 1 of the first device. In addition, the first Device Profile module may further exchange data with a Device Profile module (for example, the second Device Profile module) of another device (for example, the second device), to obtain SIM card status information of the another device. A SIM card that can be currently used by the first device may be obtained by using the SIM card status information of the first device and the SIM card status information of the another device.

S207: The first Device Profile module sends profile query information to the second Device Profile module of the second device.

In some embodiments, the first Device Profile module may send the profile query information to a communication interface of the second device through a communication interface of the first device, and then forward the profile query information to the second Device Profile module through the communication interface of the second device, to query device capability information of the second device in the trust system. The queried device capability information may include SIM card status information corresponding to each device. After the second Device Profile module of the second device receives the profile query information, the second Device Profile module may also feed back corresponding response information to the first Device Profile module. In addition, the first Device Profile module may further send the profile query information to a Device Profile module of the third device to query device capability information of the third device, and send the profile query information to a Device Profile module of the fifth device to query device capability information of the fifth device. Details are not described herein again.

In some other embodiments, the profile query information may be a query instruction that specifies a queried SIM card. In this way, when there is no SIM card in the second device or the first device belongs to the permission restriction list of the second device, the first device has no permission to use a SIM card in the second device. Therefore, the second device may not respond to the received profile query information, and does not need to feed back corresponding response information to the first device. The following description is still provided by using an example in which a SIM card is configured in the second device and the first device does not belong to the permission restriction list of the second device.

S208: The second Device Profile module sends profile response information to the first Device Profile module, where the profile response information includes the SIM card status information 2.

In some embodiments, the second Device Profile module may send the profile response information by using a local area network between the first device and the second device, so that the first Device Profile module of the first device can receive the profile response information fed back by the second device.

Through S205-S208, after receiving the operation 1, the first device may query SIM card status information of another device in the trust system. Certainly, in another embodiment, before receiving the operation 1, the first device may also query SIM card status information of another device in the trust system, and store the found SIM card status information. For a detailed implementation process, refer to descriptions in subsequent embodiments.

S209: The first Device Profile module determines information about an available SIM card based on the SIM card status information 1 and the SIM card status information 2.

In some embodiments, the first Device Profile module may parse the SIM card status information 1 and the SIM card status information 2, and gather information such as SIM card identifiers and corresponding numbers and operators included in the SIM card status information 1 and the SIM card status information 2, to obtain information about a SIM card that can be currently used by the first device, which is also referred to as the information about an available SIM card.

For example, the SIM card status information 1 has only the identifier b and does not carry any SIM card identifier, which indicates that no SIM card is configured in the first device. The SIM card identifier in the SIM card status information 2 includes a card 1 of the second device and a card 2 of the second device. In addition, the SIM card status information 2 indicates that the card 1 of the second device corresponds to a number "132 aaaa 2222" and the card 2 of the second device corresponds to a number "132 aaaa 11n". In this way, the obtained information about an available SIM card is shown in the foregoing Table 1.

For another example, the SIM card status information 1 includes the identifier m and a SIM card identifier (for example, a SIM card of the first device), which indicates that a SIM card is configured in the first device. Moreover, the SIM card of the first device corresponds to a number "136 aaaa 2222". In addition, the SIM card status information 2 includes the identifier c and two SIM card identifiers (for example, a card 1 of the second device and a card 2 of the second device), which indicates that two SIM cards are configured in the second device. In this way, the obtained information about an available SIM card is shown in the foregoing Table 2.

It may be understood that in S209, the information about an available SIM card may be determined based on SIM card status information fed back by all devices in the trust system. To be specific, in addition to the SIM card status information 1 and the SIM card status information 2, SIM card status information fed back by the third device and the fifth device may be further parsed, to ensure that the first device can obtain all available SIM cards in the trust system. Following the foregoing example, the SIM card status information of the third device indicates that a SIM card of the third device corresponds to a number "138 aaaa 1111", and the information that is about an available SIM card and that is obtained after the first device receives the SIM card status information sent by the second device and the third device is shown in the foregoing Table 3.

Certainly, when no SIM card is included in the first device and there is no SIM card available for the first device in the trust system, for example, when the first device does not receive the SIM card status information from the second device, the third device, and the fifth device, the information that is about an available SIM card and that is obtained in S209 is empty, that is, the information about an available SIM card includes no SIM card identifier or MDN number. Alternatively, in another embodiment, when no SIM card is included in the first device and there is no SIM card available for the first device in the trust system, there is no need to determine the information about a SIM card based on the SIM card status information 1 and the SIM card status information 2. In addition, the first Device Profile module notifies, by using the first call service module, the phone application that there is no available SIM card currently.

S210: The first Device Profile module sends first response information to the first call service module, where the first response information includes the information about an available SIM card.

S211: The first call service module sends second notification information to the phone application, where the second notification information includes the information about an available SIM card.

In some embodiments, the second notification information includes SIM card information obtained by the first call service module.

S212: The phone application displays dialing prompt information based on the second notification information.

The dialing reminding information is used to notify the user of a SIM card that can be currently used for dialing, to facilitate selection by the user.

In some embodiments, after obtaining the prompt information, the phone application may invoke a view system at the application framework layer to display the dialing reminding information, for example, display a dialing card selection window.

After the user selects a dialing card from a SIM card displayed in the dialing card selection window, the first device sends a collaborative dialing request to a device (for example, referred to as a dialing execution device) configured with the dialing card. For example, when determining that the dialing card is the "card 1 of the second device" and the dialing execution device is the second device, the first device may send the collaborative dialing request to the second device, to indicate the second device to perform a dialing task. The collaborative dialing request includes a SIM card identifier and a to-be-dialed number. For example, the collaborative dialing request includes the "card 1 of the second device" and the to-be-dialed number. After receiving the collaborative dialing request, the second device may dial the corresponding to-be-dialed number by using a SIM card whose identifier is the "card 1 of the second device".

In some embodiments, if the dialing card is idle and the dialing execution device completes the dialing task indicated by the first device, the dialing execution device may send collaboration response information 1 to the first device, where the collaboration response information 1 is used to notify the first device that a call has been made. For example, when the second device is the dialing execution device, after the second device determines that the SIM card whose identifier is the "card 1 of the second device" is idle and performs the dialing task indicated by the first device, the second device may send the collaboration response information 1 to the first device.

If the dialing card is busy (for example, the card is being in a call) and cannot be used to perform a dialing task, the dialing execution device may send collaboration response information 2 to the first device, to notify the first device that dialing cannot be performed currently. For example, when the second device is the dialing execution device, and the second device determines that the SIM card whose identifier is the "card 1 of the second device" is busy, the second device may send the collaboration response information 2 to the first device.

Figure 18:
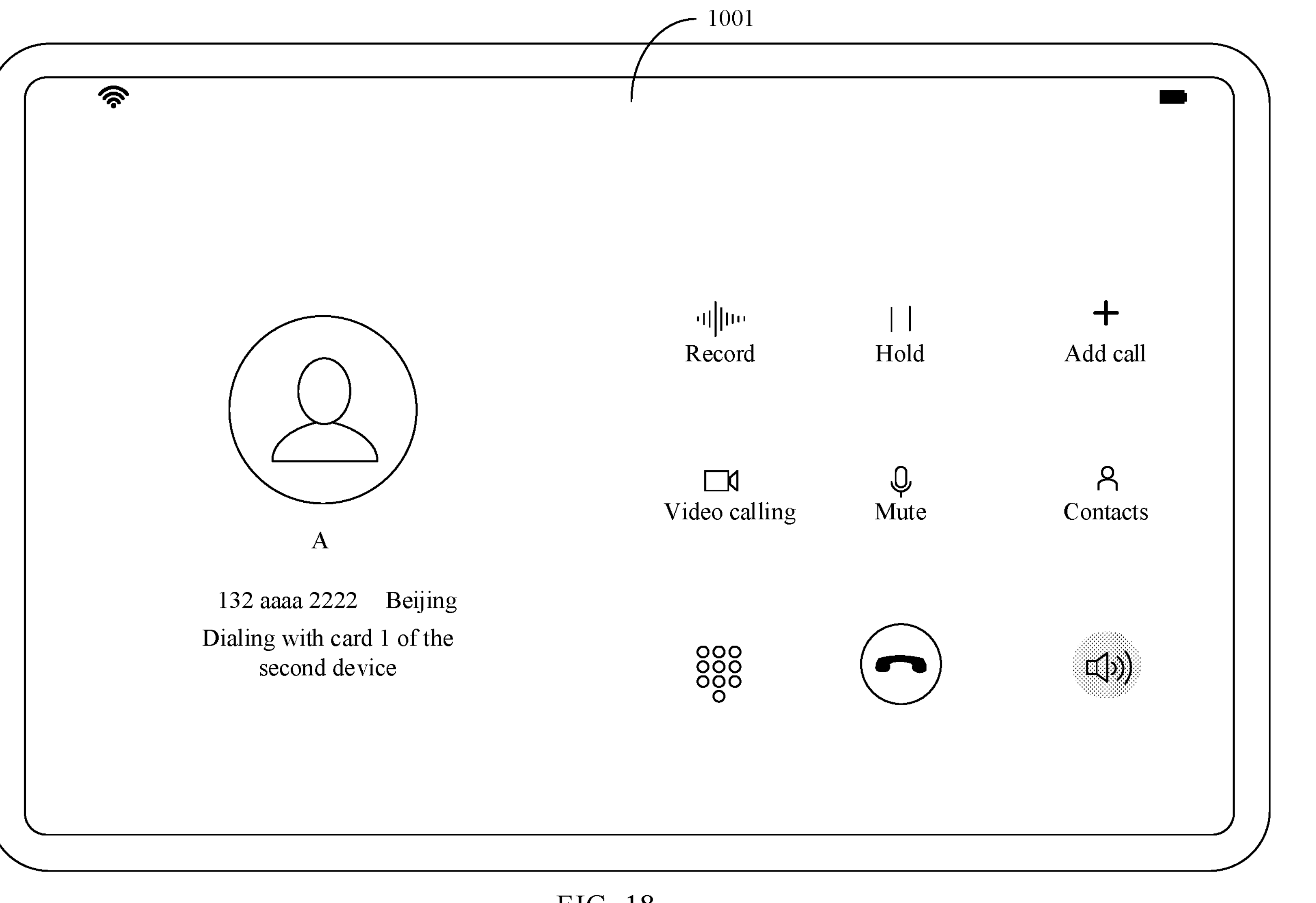
FIG. 18 is a twelfth schematic diagram of interface display of a first device according to an embodiment of this application.

When the first device receives the collaboration response information 1, the first device displays a first waiting interface 1001 shown in FIG. 18, where the first waiting interface 1001 is a call waiting interface and is used to prompt the user to wait for answering of a call. After the second device gets through, the second device may indicate the first device to perform switching to display an interface, for example, referred to as a seventh interface, indicating that a call is connected. In some embodiments, the second device may decode received call data 1 into audio data 1, and then send the decoded audio data 1 to the first device. In this way, the first device can play the audio data 1. In some other embodiments, the second device may alternatively forward, to the first device, call data 1 sent by the fourth device. In this way, the first device can decode the call data 1 into audio data 1, and play the audio data 1. In addition, the call data 1 may be first call data, and the audio data 1 may be voice data corresponding to the first call data.

In addition, the first device may further collect audio data 2, and send the audio data 2 to the second device. After the second device receives the audio data 2, the second device encodes the audio data 2 into call data 2, and sends the call data 2 by using the mobile communication network, to implement a call. The call data 2 may be second call data.

In conclusion, in the foregoing embodiment, phone interfaces that have a dialing key (for example, the first dialing control 512, the second dialing control 804, or the third dialing control 908) may be collectively referred to as a third interface. For example, the third interface may be the contacts interface, the digit dialing interface, or the call details interface. When the first device displays the third interface, the first device may display, in response to a second operation (for example, a tap operation) on the dialing key, an interface that includes a dialing card selection window (for example, referred to as the first window), for example, display the phone application interface 503 shown in FIG. 8A, the digit dialing interface 701 shown in FIG. 10, the call details interface 801 shown in FIG. 12, or the contacts interface 904 shown in FIG. 14A. In this embodiment, interfaces that include a dialing card selection window may be collectively referred to as the first interface. In addition, the dialing card selection window includes a dialing option corresponding to at least one SIM card, for example, an option of a first SIM card or an option of a second SIM card. The dialing option may trigger the first device to perform dialing by using a corresponding SIM card. For example, the first device may display a second interface in response to a first operation (for example, a tap operation) on the option of the first SIM card. For another example, the first device may display a fifth interface in response to an operation (for example, a tap operation) on the option of the second SIM card, and the fifth interface is also a call waiting interface. The fifth interface includes the first number, an identifier of the second SIM card, information prompting to waiting for answering, and the like. For the fifth interface, refer to the first waiting interface 1001. When displaying the fifth interface, the first device may send a dialing instruction to the third device to trigger the third device to send a session request to the fourth device.

In addition, a display form of an option of a SIM card may include at least one of the following: an identifier of the SIM card, an identifier of an operator to which the SIM card belongs, a name of a device configured with the SIM card, an MDN number and a dialing control that correspond to the SIM card, and the like.

In addition, the first interface further includes the first number, and the first number may be a to-be-dialed number. A display form of the first number may be a digit sequence corresponding to an MDN number, a contact name corresponding to the MDN number, or the like.

Figure 31A:
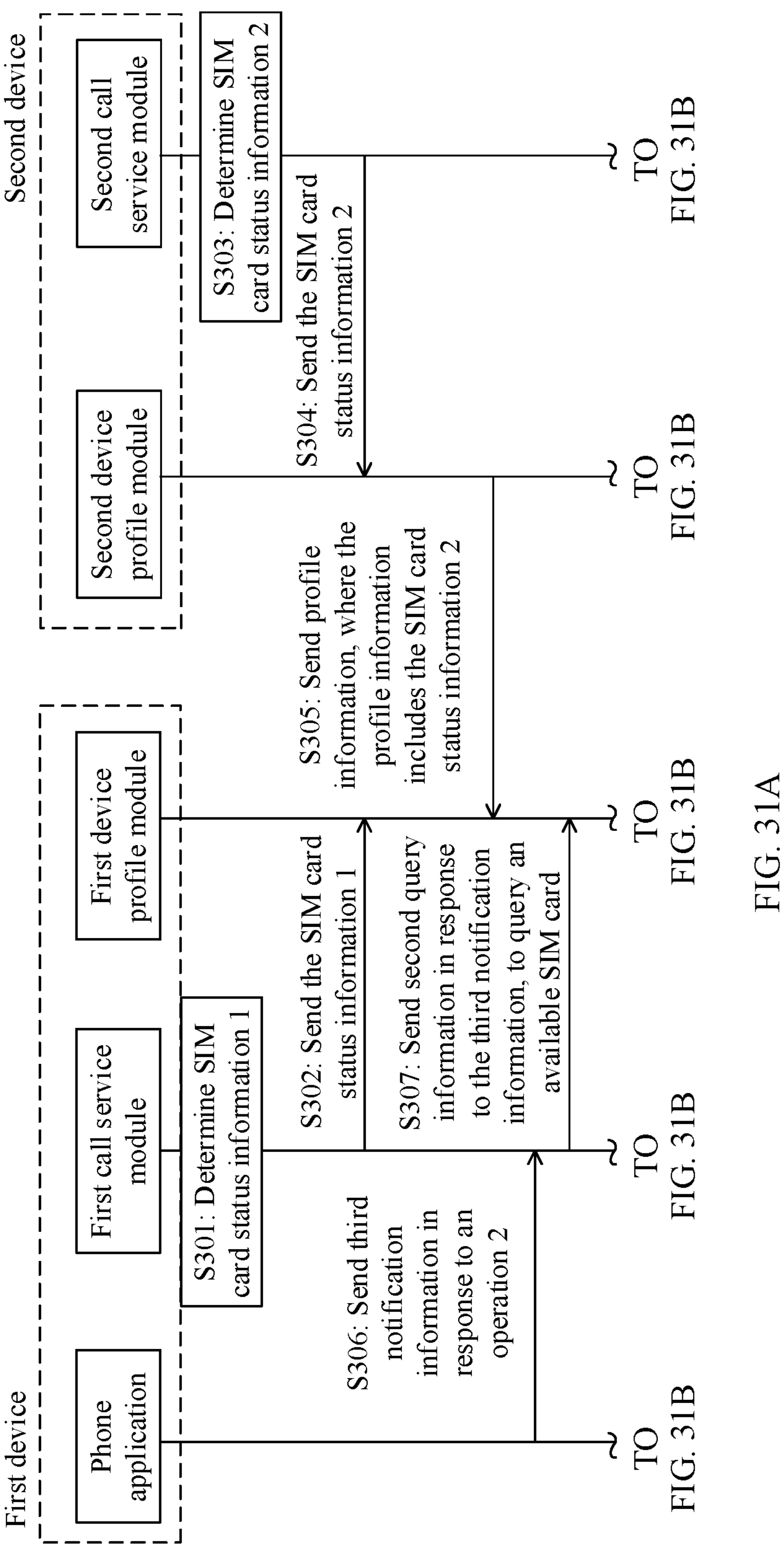
FIG. 31A and FIG. 31B are a fourth diagram of a step procedure of a communication method according to an embodiment of this application.
Figure 31B:
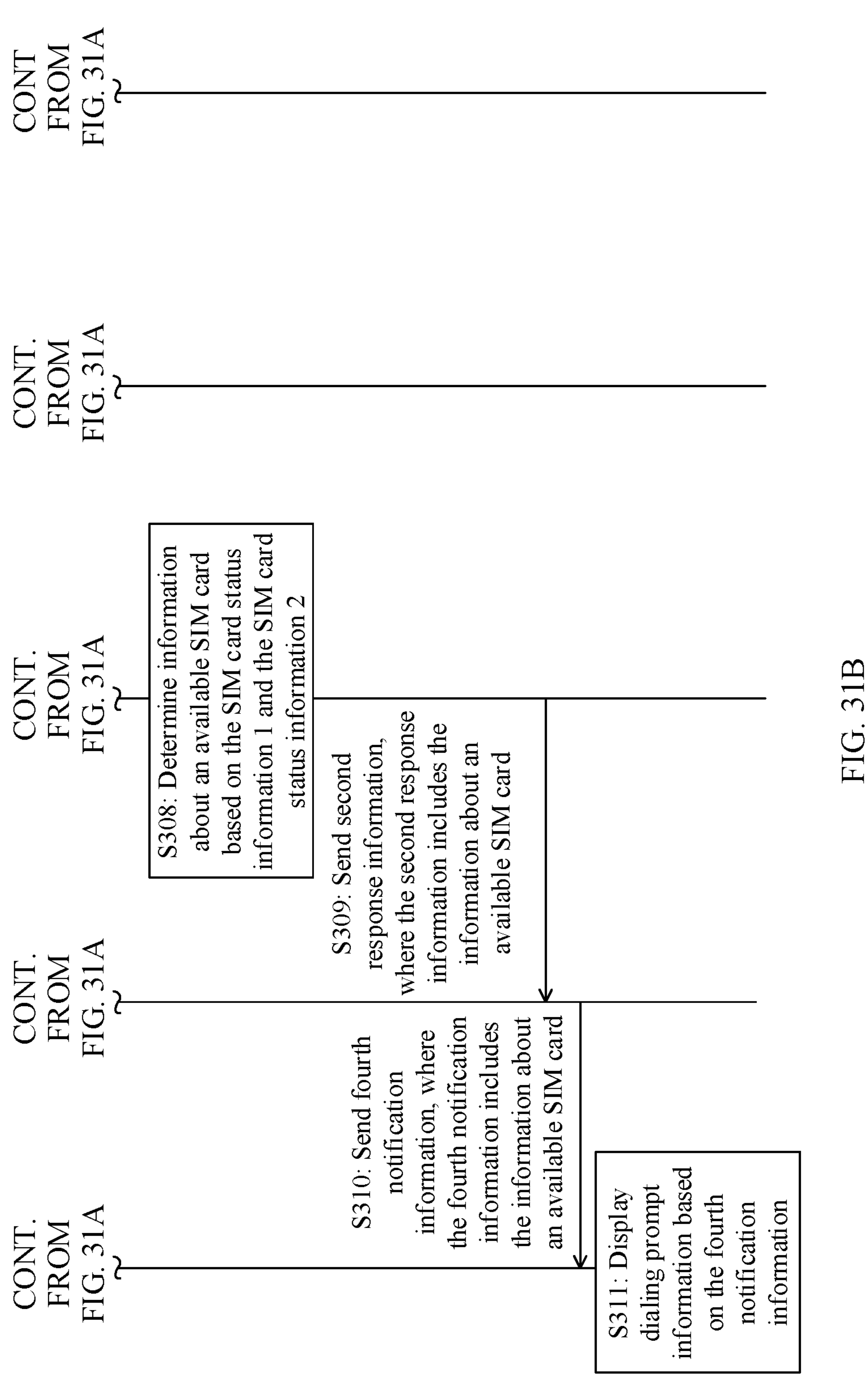

In another embodiment, as shown in FIG. 31A and FIG. 31B, a process of data exchange between the first device and another device (for example, the second device) may alternatively be as follows:

S301: The first call service module of the first device determines the SIM card status information 1.

S302: The first call service module sends the SIM card status information 1 to the first Device Profile module.

S303: The second call service module of the second device determines the SIM card status information 2.

S304: The second call service module sends the SIM card status information 2 to the second Device Profile module.

In some embodiments, an implementation principle of S301-S304 is the same as that of S201-S204, and details are not described herein again.

S305: The second Device Profile module sends profile information to the first device, where the profile information includes the SIM card status information 2.

In some embodiments, the second Device Profile module may send the profile information by using a local area network between the first device and the second device. For example, the second Device Profile module may periodically send the profile information to the first device.

It may be understood that all devices in the trust system can send the profile information to the first device, and the second device is merely an example.

In another embodiment, when the first device belongs to the permission restriction list of the second device, the profile information sent by the second device to the first device may not carry the SIM card status information 2, or S305 is not performed in the procedure. This is similar for another device in the trust system, and details are not described herein again.

After receiving SIM card status information sent by another device (for example, the SIM card status information 2 sent by the second device), the first Device Profile module may store the SIM card status information 2 into specified storage space of the first device, so that the first Device Profile module can read the SIM card status information 2 at anytime.

S306: The phone application sends third notification information to the first call service module in response to an operation 2.

In some embodiments, the operation 2 is an operation that is of the user and that indicates to run the phone application. The third notification information indicates the first call service module to query an available SIM card.

S307: The first call service module sends second query information to the first Device Profile module in response to the third notification information, to query an available SIM card.

In some embodiments, the first Device Profile module may access the specified storage space of the first device in response to the second query information, to obtain stored SIM card status information, for example, the SIM card status information 1 corresponding to the first device and the SIM card status information 2 corresponding to the second device.

S308: The first Device Profile module determines information about an available SIM card based on the SIM card status information 1 and the SIM card status information 2.

S309: The first Device Profile module sends second response information to the first call service module, where the second response information includes the information about an available SIM card.

S310: The first call service module sends fourth notification information to the phone application, where the fourth notification information includes the information about an available SIM card.

In some embodiments, for implementation details of S306-S310, refer to S205, S206, S209, S210, and S211 in the foregoing embodiment. Details are not described herein again.

S311: The phone application displays dialing prompt information based on the fourth notification information.

Figure 32:
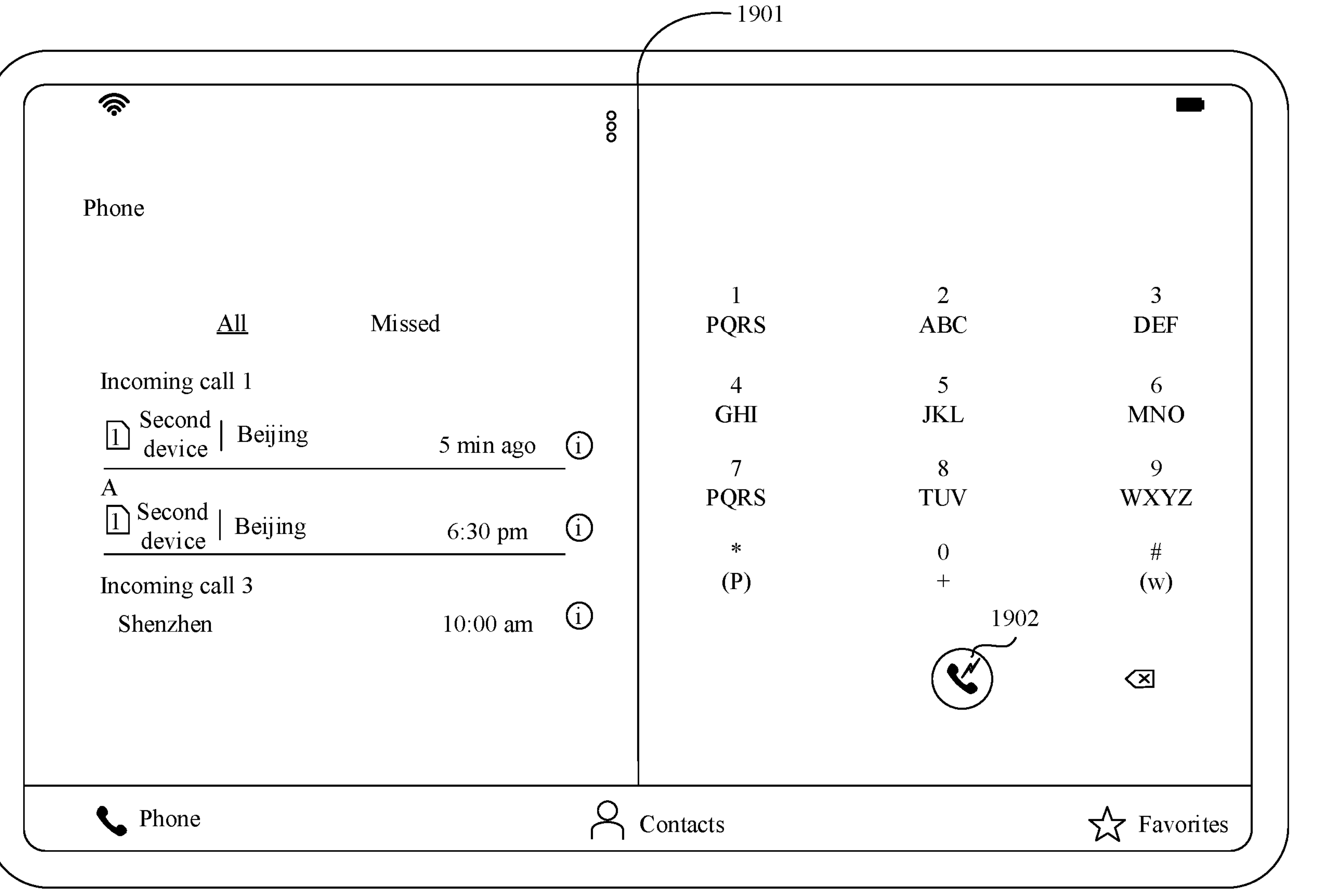
FIG. 32 is a twenty-fifth schematic diagram of interface display of a first device according to an embodiment of this application.

For example, in a scenario in which no SIM card is configured in the first device and the information about an available SIM card indicates that a SIM card exists, the first device displays, in response to the operation 2, a fourth phone interface 1901 shown in FIG. 32. The fourth phone interface 1901 includes a nineteenth dialing control 1902, and the nineteenth dialing control 1902 corresponds to the SIM card indicated by the information about an available SIM card. When the first device displays the fourth phone interface 1901, in response to an operation of tapping the nineteenth dialing control 1902 by the user on the touchscreen, the first device determines to perform dialing by using the SIM indicated by the information about an available SIM card. In addition, the nineteenth dialing control 1902 displays an identifier marking a super incoming call.

Figure 33:
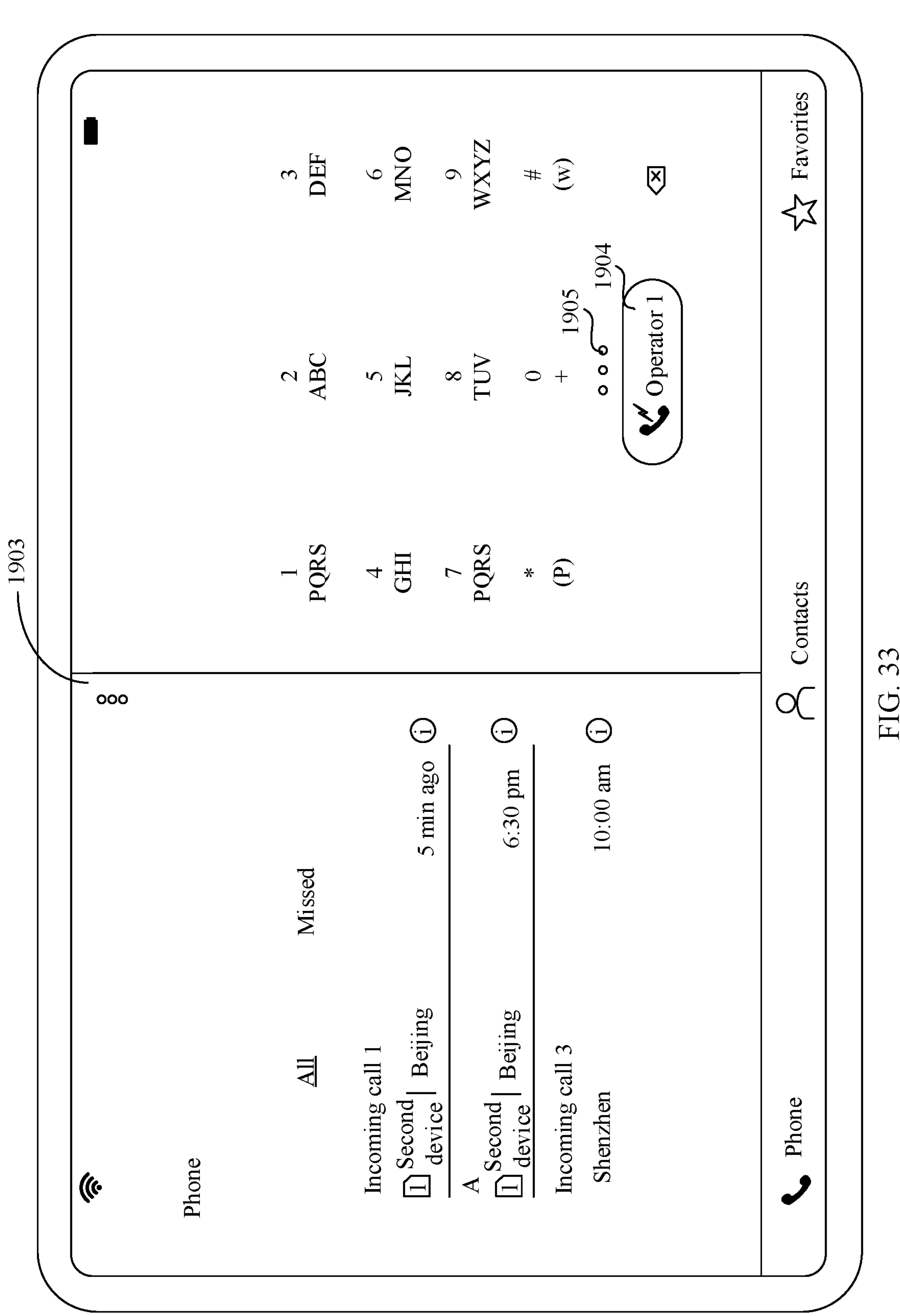
FIG. 33 is a twenty-sixth schematic diagram of interface display of a first device according to an embodiment of this application.

For another example, in a scenario in which the information about an available SIM card indicates that a plurality of SIM cards exist, the first device displays, in response to the operation 2, a fifth phone interface 1903, also referred to as a sixth interface, shown in FIG. 33. The fifth phone interface 1903 includes a twentieth dialing control 1904 (for example, referred to as a third option) and a first navigation bar 1905 (for example, referred to as a navigation bar). The twentieth dialing control 1904 displays an identifier marking a super incoming call. For example, the first navigation bar 1905 is located on an upper side of the twentieth dialing control 1904.

When the information about an available SIM card includes a SIM card identifier of a default card, the twentieth dialing control 1904 corresponds to the default card (also referred to as a default dialing card), and the twentieth dialing control 1904 displays an operator identifier corresponding to the default card. During display of the fifth phone interface 1903, in response to an operation of tapping the twentieth dialing control 1904 by the user on the touchscreen, the first device may determine to perform dialing by using the default card. When the first SIM card is the default dialing card and the first SIM card is configured in the second device, in response to a sixth operation (for example, a tap operation) on the third option, the first device may display a second interface, and send a dialing instruction to the second device to trigger the second device to send a session request to the fourth device.

Figure 34:
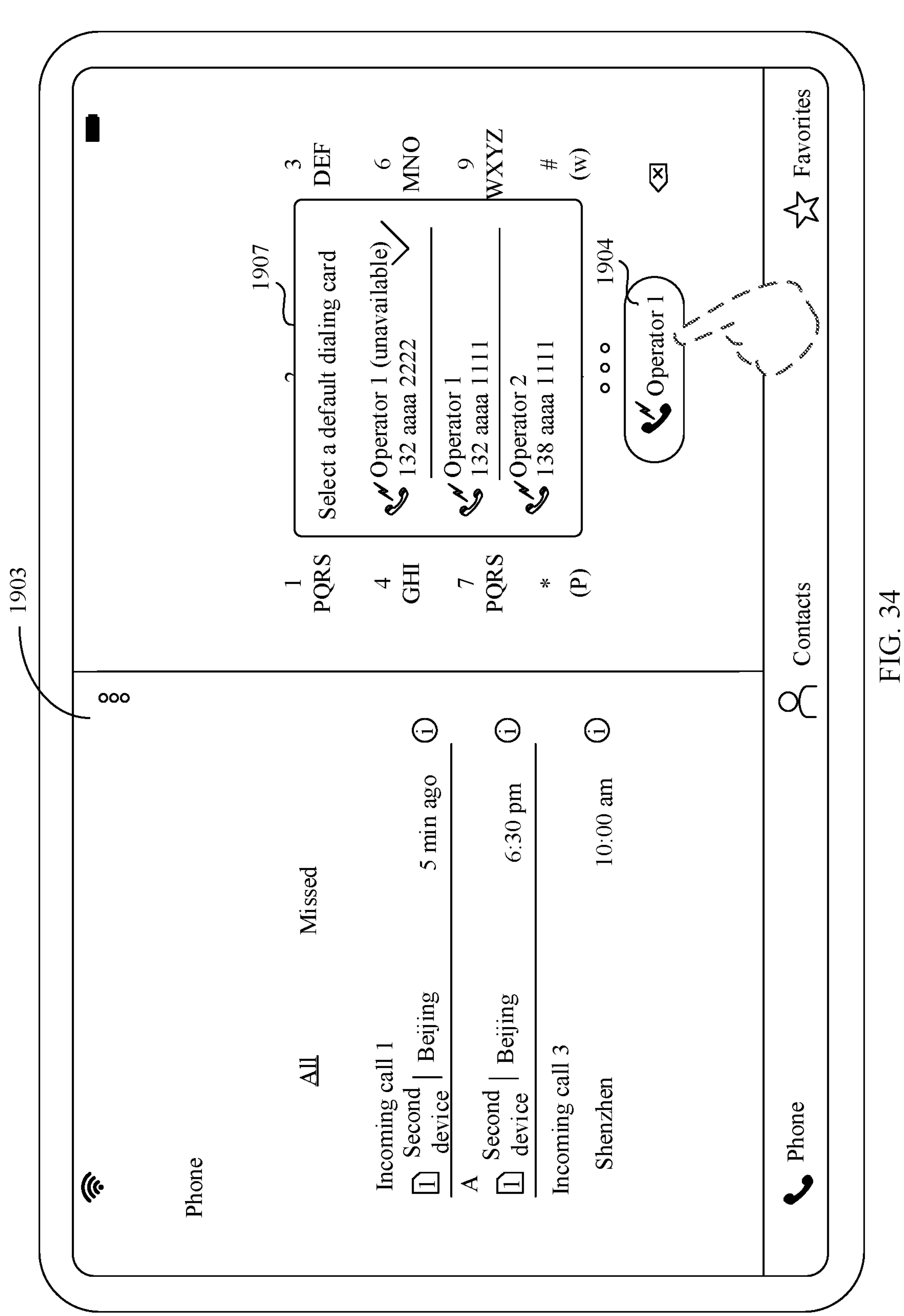
FIG. 34 is a twenty-seventh schematic diagram of interface display of a first device according to an embodiment of this application.

In a scenario in which the information about an available SIM card does not include a SIM card identifier of a default card, in response to an operation of tapping the twentieth dialing control 1904 by the user on the touchscreen, the first device may display a fifth phone interface 1903 shown in FIG. 34. The fifth phone interface 1903 includes a seventh card selection window 1907. The seventh card selection window 1907 is used to display information about a default card and an available SIM card, for example, display a SIM card identifier of the default card and an identifier of the available SIM card. In addition, the seventh card selection window 1907 may further prompt that a current default card is unavailable. In this way, the user may perform an operation on the touchscreen to indicate the first device to determine a new default card from available SIM cards displayed in the seventh card selection window 1907.

Figure 35:
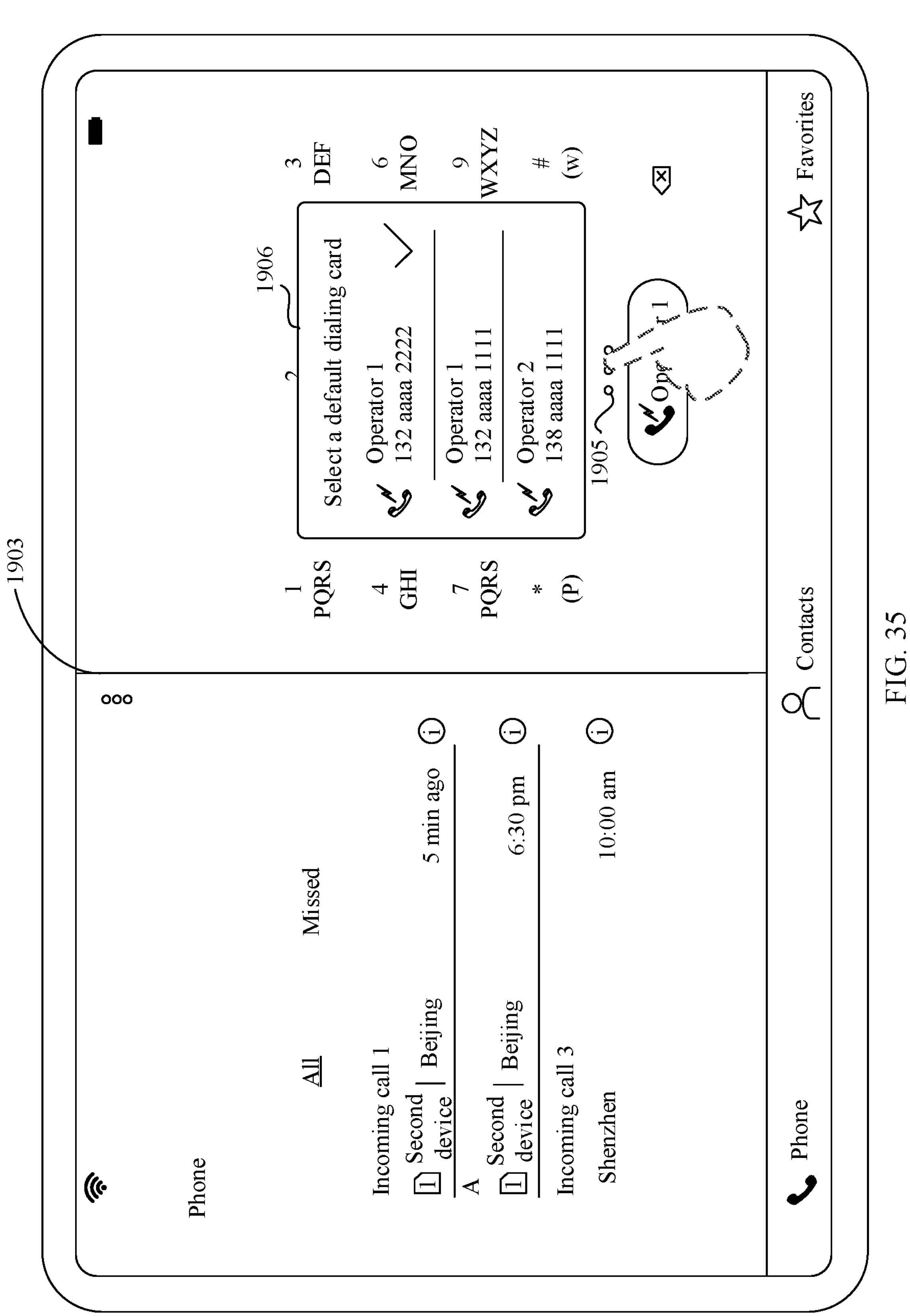
FIG. 35 is a twenty-eighth schematic diagram of interface display of a first device according to an embodiment of this application.

In some other embodiments, in response to an operation of tapping the first navigation bar 1905 by the user on the touchscreen, as shown in FIG. 35, the first device may display an eighth card selection window 1906 (for example, referred to as a fifth window) in the fifth phone interface 1903. The eighth card selection window 1906 is used to display the information about an available SIM card, for example, display an identifier of an available SIM card. In this way, the user may perform an operation on the touchscreen to indicate the first device to determine a default card from available SIM cards displayed in the eighth card selection window 1906.

Figure 36:
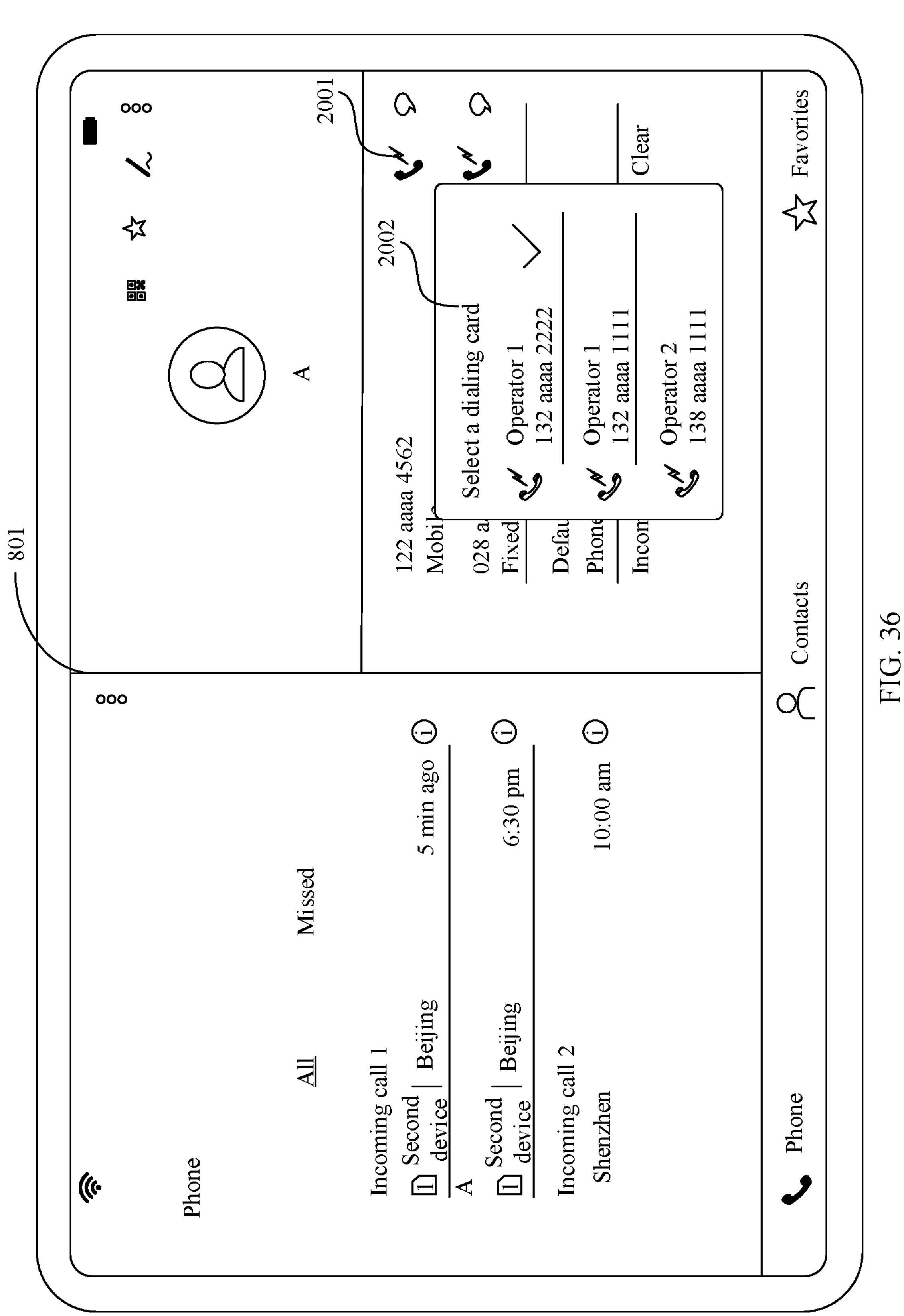
FIG. 36 is a twenty-ninth schematic diagram of interface display of a first device according to an embodiment of this application.

In addition, as shown in FIG. 36, when the first device displays the call details interface 801, each MDN number displayed in the call details interface 801 corresponds to one dialing control, for example, a twenty-first dialing control 2001. The dialing control corresponds to a default card. When the first device determines that an available SIM card includes the default card, in response to an operation of tapping the twenty-first dialing control 2001 by the user on the touchscreen, the first device may determine to perform dialing by using the default card. When the first device determines that the available SIM card does not include the default card, the first device may display a ninth card selection window 2002 in the call details interface 801 in response to the operation of tapping the twenty-first dialing control 2001 by the user on the touchscreen. The ninth card selection window 2002 is used to display an available SIM card. The first device may redetermine, based on an operation performed by the user on the ninth card selection window 2002, a SIM card used as the default card.

Figure 37:
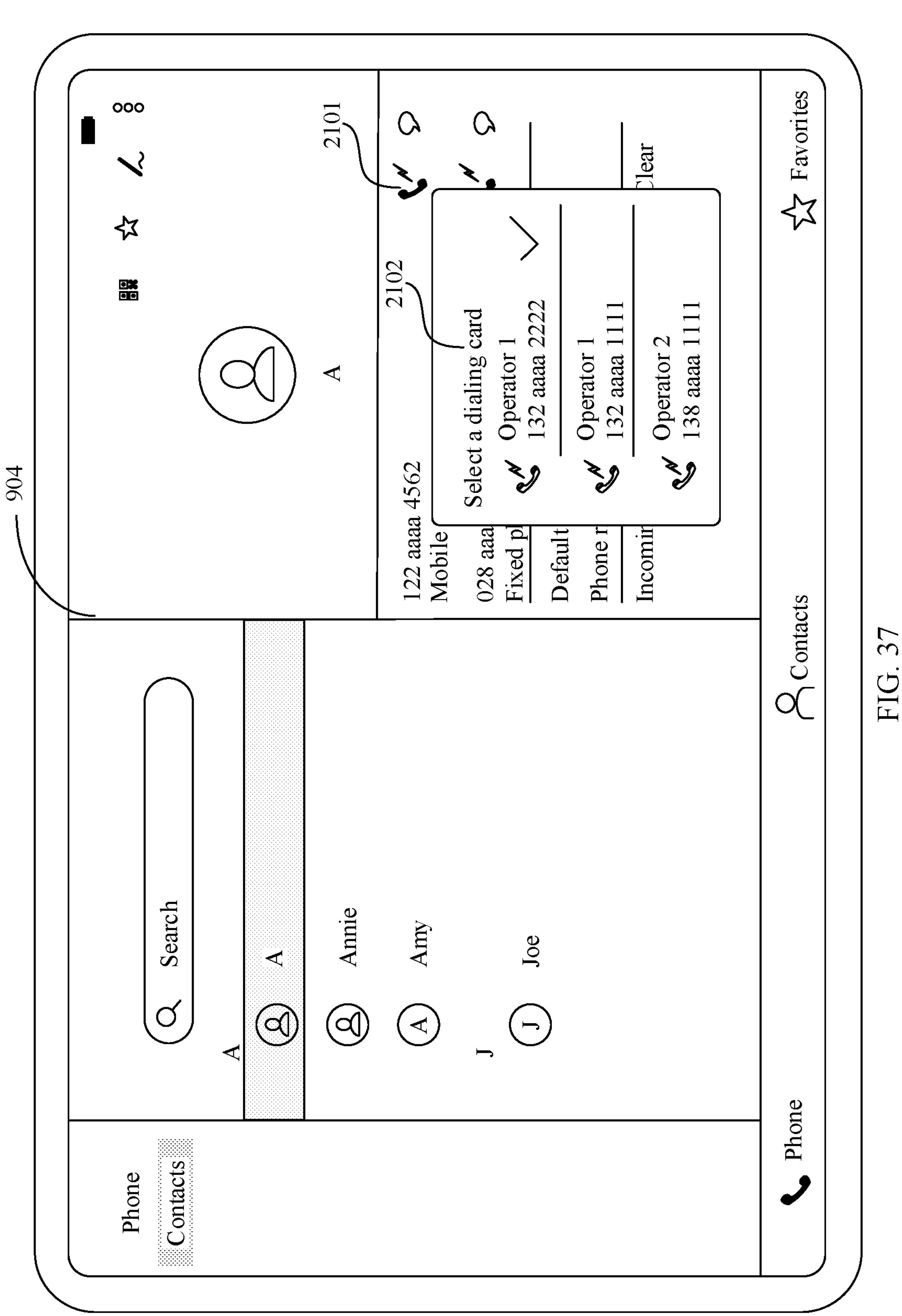
FIG. 37 is a thirtieth schematic diagram of interface display of a first device according to an embodiment of this application.

As shown in FIG. 37, when the first device displays the contacts interface 904, each MDN number displayed in the contacts interface 904 corresponds to one dialing control, for example, a twenty-second dialing control 2101. The twenty-second dialing control 2101 corresponds to a default card. When the first device determines that an available SIM card includes the default card, in response to an operation of tapping the twenty-second dialing control 2101 by the user on the touchscreen, the first device may determine to perform dialing by using the default card. When the first device determines that the available SIM card does not include the default card, the first device may display a tenth card selection window 2102 in the contacts interface 904 in response to the operation of tapping the twenty-second dialing control 2101 by the user on the touchscreen. The tenth card selection window 2102 is used to display an available SIM card. The first device may redetermine, based on an operation performed by the user on the tenth card selection window 2102, a SIM card used as the default card.

Figure 38:
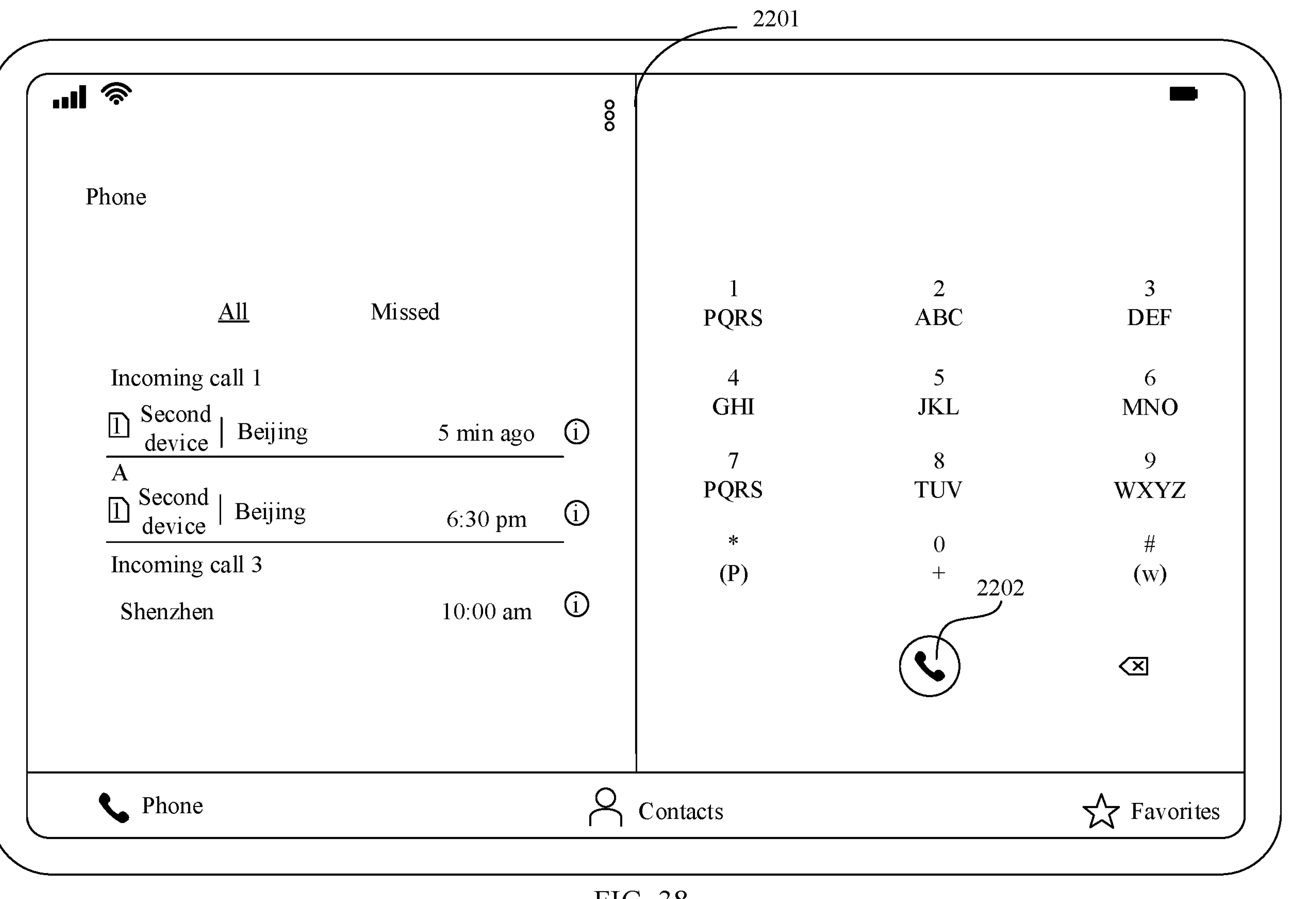
FIG. 38 is a thirty-first schematic diagram of interface display of a first device according to an embodiment of this application.

In some other possible embodiments, a SIM card, for example, referred to as a local card, may also be configured in the first device. When the first device does not join the trust system or no other device in the trust system can provide an available SIM card, the first device may display, in response to an operation indicating to run the phone application, a sixth phone interface 2201 shown in FIG. 38. The sixth phone interface 2201 includes a twenty-third dialing control 2202, and the twenty-third dialing control 2202 corresponds to the local card. To be specific, when receiving an operation performed by the user on the twenty-third dialing control 2202, the first device may determine to perform dialing by using the local card.

Figure 39:
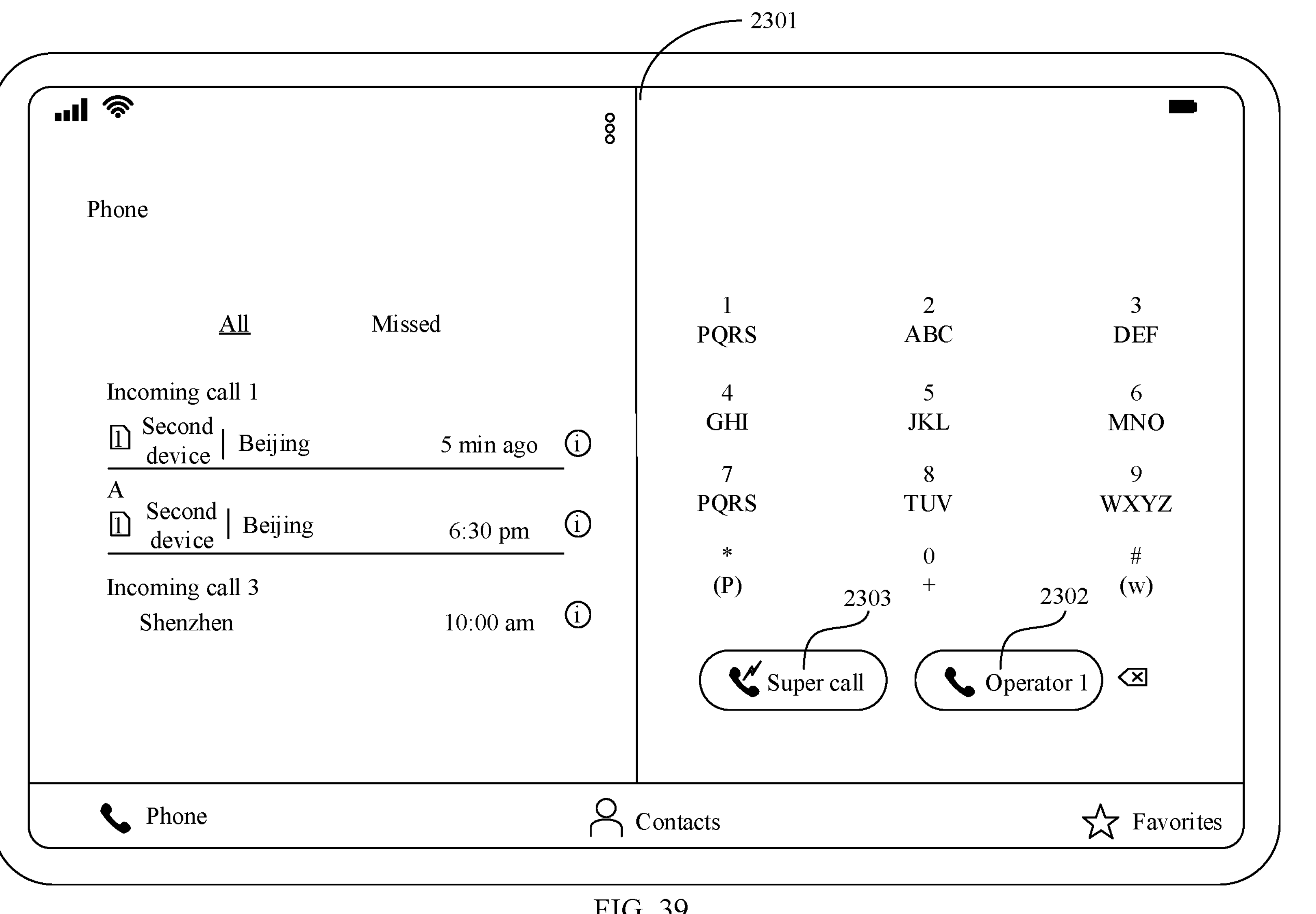
FIG. 39 is a thirty-second schematic diagram of interface display of a first device according to an embodiment of this application.

In addition, in a scenario in which a SIM card is configured in the first device and the first device has joined the trust system, if another device (for example, the second device, the third device, or the fifth device) in the trust system can provide an available SIM card, after receiving an operation indicating to run the phone application, the first device may display a seventh phone interface 2301 shown in FIG. 39. The seventh phone interface 2301 includes a twenty-fourth dialing control 2302 and a twenty-fifth dialing control 2303. For example, the twenty-fourth dialing control 2302 and the twenty-fifth dialing control 2303 may be horizontally arranged. The twenty-fourth dialing control 2302 corresponds to the local card, and the twenty-fourth dialing control 2302 displays an operator identifier corresponding to the local card. The twenty-fifth dialing control 2303 corresponds to a SIM card provided by another device, and the twenty-fifth dialing control 2303 displays a super call identifier. In this way, the user can visually distinguish between the dialing control corresponding to the local card and that corresponding to the another device, to facilitate selection by the user. To be specific, in response to an operation of tapping the twenty-fourth dialing control 2302 by the user on the touchscreen, the first device may determine to perform dialing by using the local card. In response to an operation of tapping the twenty-fifth dialing control 2303 by the user on the touchscreen, the first device may further determine to perform dialing by using the available SIM card provided by the another device.

Figure 40:
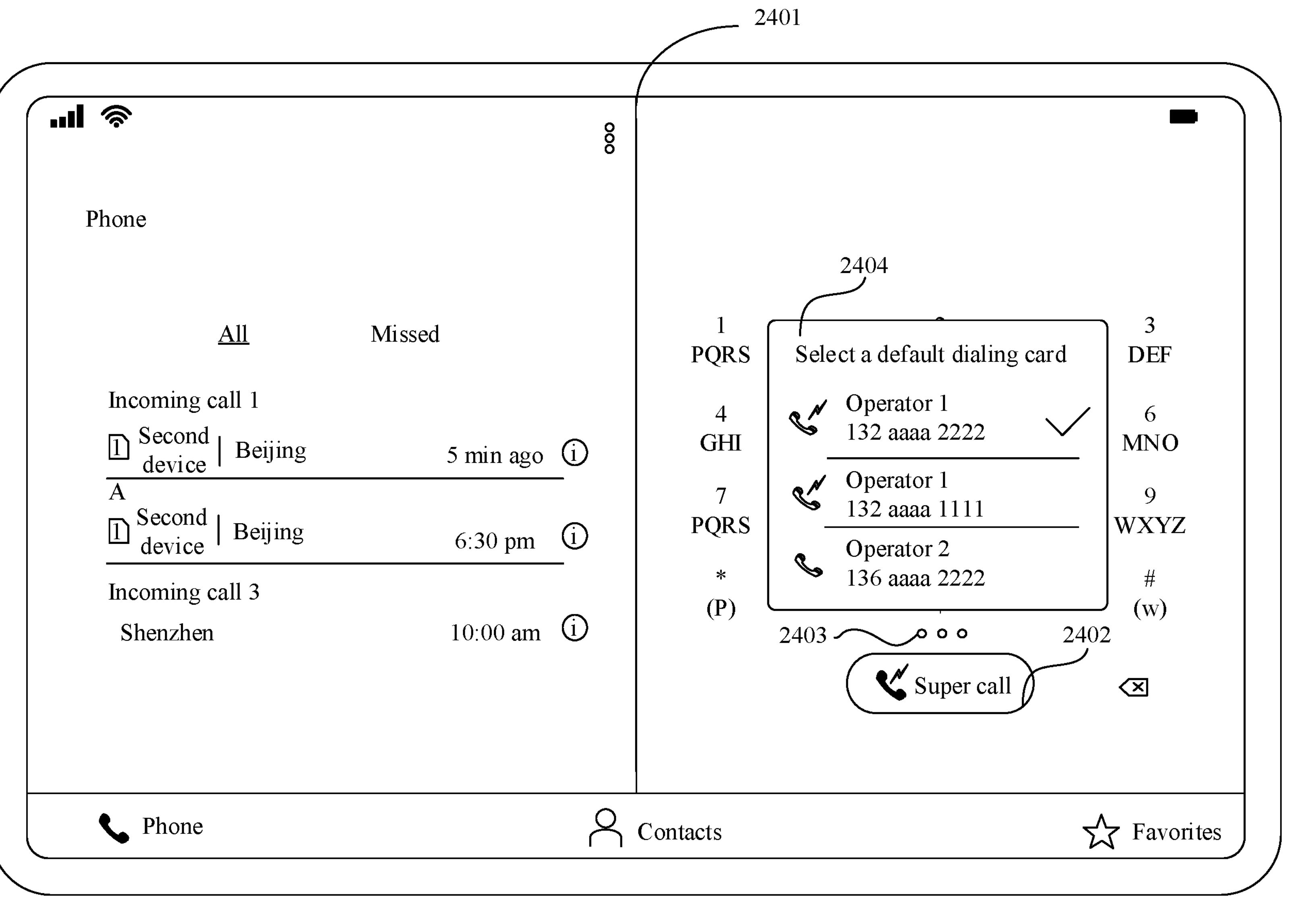
FIG. 40 is a thirty-third schematic diagram of interface display of a first device according to an embodiment of this application.

In addition, in a scenario in which a SIM card (for example, referred to as a fourth SIM card) is configured in the first device and the first device has joined the trust system, if another device (for example, the second device, the third device, or the fifth device) in the trust system can provide a plurality of available SIM cards, after receiving an operation indicating to run the phone application, the first device may display an eighth phone interface 2401 shown in FIG. 40. The eighth phone interface 2401 includes a twenty-sixth dialing control 2402 and a second navigation bar 2403. The twenty-sixth dialing control 2402 displays an identifier indicating a super call. When the local card is a default card or when the available SIM cards provided by the another device include the default card, in response to an operation of tapping the twenty-sixth dialing control 2402 by the user on the touchscreen, the first device determines to perform dialing by using the default card. When the local card is not the default card and the available SIM card provided by the another device do not include the default card, in response to an operation of tapping the twenty-sixth dialing control 2402 by the user on the touchscreen, the first device determines to perform dialing by using the local card.

In addition, the first device may display an eleventh card selection window 2404 in the eighth phone interface 2401 in response to an operation of tapping the second navigation bar 2403 by the user on the touchscreen. The eleventh card selection window 2404 includes a SIM card identifier of the local card and an identifier of the available SIM card provided by the another device. The first device may determine, based on an operation performed by the user on the eleventh card selection window 2404, a default card specified by the user.

In conclusion, when a SIM card is configured in the first device, the first device may choose to make a call by using the SIM card in the first device, or may choose to make a call by using a SIM card that is configured in another device and that is available to the first device. In another embodiment, the first device may alternatively choose to send a message by using a SIM card in the first device, or may choose to send a message by using a SIM card that is configured in another device and that is available to the first device. For an implementation principle, refer to making a call. Details are not described herein again.

An embodiment of this application further provides an electronic device. The electronic device may include a memory and one or more processors. The memory is coupled to the processor. The memory is configured to store computer program code, and the computer program code includes computer instructions. When the processor executes the computer instructions, the electronic device is enabled to perform the steps performed by the mobile phone in the foregoing embodiments. Certainly, the electronic device includes but is not limited to the memory and the one or more processors.

Figure 41:
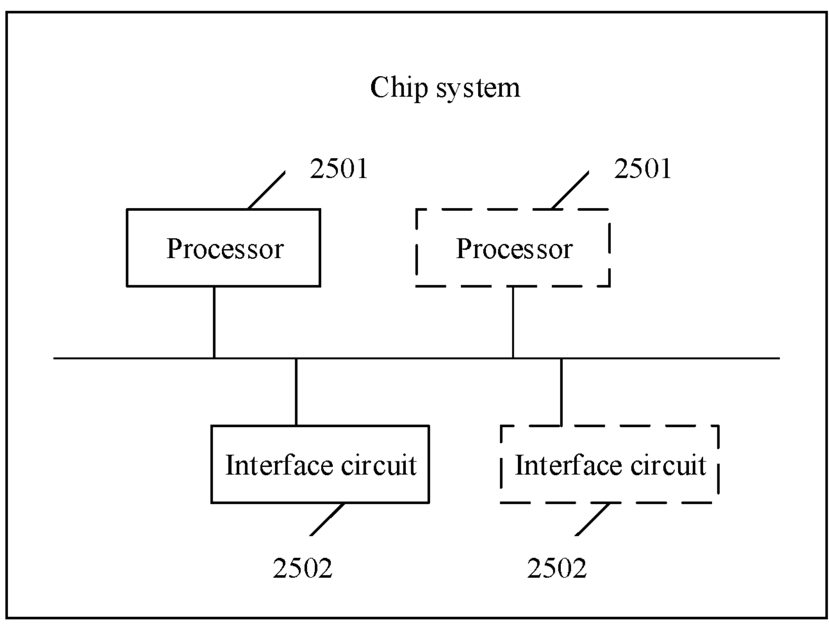
FIG. 41 is a schematic diagram of a chip system according to an embodiment of this application.

An embodiment of this application further provides a chip system, and the chip system may be applied to the terminal device in the foregoing embodiment. As shown in FIG. 41, the chip system includes at least one processor 2501 and at least one interface circuit 2502. The processor 2501 may be the processor in the electronic device. The processor 2501 and the interface circuit 2502 may be interconnected through a line. The processor 2501 may receive computer instructions from the memory of the electronic device by using the interface circuit 2502 and execute the computer instructions. When the computer instructions are executed by the processor 2501, the electronic device is enabled to perform the steps performed by the mobile phone in the foregoing embodiments. Certainly, the chip system may further include another discrete component. This is not specifically limited in this embodiment of this application.

In some embodiments, it may be clearly understood by a person skilled in the art through descriptions of the foregoing implementations that, for ease and brevity of description, division of the foregoing functional modules is merely used as an example for description. In actual application, the foregoing functions may be allocated to different functional modules for completion based on a requirement, that is, an internal structure of the apparatus is divided into different functional modules to complete all or some of the functions described above. For a specific working process of the system, the apparatus, and the unit described above, refer to a corresponding process in the foregoing method embodiments. Details are not described herein again.

Functional units in embodiments of embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions in embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, for example, a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A communication method, wherein the method comprises:

displaying, by a first device, a first interface, wherein the first interface comprises a plurality of dialing options and a first number, the plurality of dialing options comprise an option of a first subscriber identity module (SIM) card and an option of a second SIM card, the first SIM card is configured in a second device, the second SIM card is configured in a third device, and the first device, the second device, and the third device belong to a same local area network;

in response to a first operation on the option of the first SIM card, displaying, by the first device, a second interface, and sending a dialing instruction to the second device to trigger the second device to send a session request to a fourth device, wherein a third SIM card corresponding to the first number is configured in the fourth device, and the second interface comprises the first number;

displaying, by the first device, a third interface, wherein the third interface comprises a dialing key and the first number;

after the second device exits the local area network, displaying, by the first device, a fourth window in the third interface in response to a second operation on the dialing key, wherein the fourth window comprises the option of the second SIM card and does not comprise the option of the first SIM card; and in response to an operation on the option of the second SIM card, displaying, by the first device, a fifth interface, and sending a dialing instruction to the third device to trigger the third device to send a session request to the fourth device.

2. The method according to claim 1, wherein before the displaying, by the first device, a first interface, the method further comprises:

displaying, by the first device, the third interface; and the displaying, by the first device, a first interface comprises: displaying, by the first device, the first interface in response to the second operation on the dialing key, wherein the first interface further comprises a first window, and the first window displays the option of the first SIM card and the option of the second SIM card.

3. The method according to claim 1, wherein when no SIM card is configured in the first device, after the first device exits the local area network, the method further comprises:

displaying, by the first device, a home screen in response to a third operation;

during display of the home screen, displaying, by the first device, a fourth interface in response to a fourth operation of enabling a phone application, wherein the fourth interface comprises a first pop-up box, and the first pop-up box prompts a user that dialing cannot be performed temporarily; and during display of the fourth interface, cancelling, by the first device in response to a tap operation, display of the first pop-up box.

4. The method according to claim 2, wherein the third interface comprises a first call record, the first call record is a call record between the first SIM card and the third SIM card, and the method further comprises:

during display of the third interface, in response to an operation on the first call record, displaying, by the first device, the second interface, and sending the dialing instruction to the second device to trigger the second device to send the session request to the fourth device.

5. The method according to claim 4, wherein after the second device exits the local area network, the method further comprises:

during display of the third interface, displaying, by the first device, a second window in response to the operation on the first call record, wherein the second window displays the option of the second SIM card and second prompt information, and the second prompt information indicates that the first SIM card is unavailable.

6. The method according to claim 2, wherein the third interface comprises a first call record, the first call record is between the first SIM card and the third SIM card, and the method further comprises:

during display of the third interface, displaying, by the first device, a third window in response to an operation on the first call record, wherein the third window comprises the option of the first SIM card and the option of the second SIM card.

7. The method according to claim 2, wherein the method further comprises:

when dialing performed by using the first SIM card fails, displaying, a second pop-up box in the second interface of the first device, wherein the second pop-up box indicates a dialing failure.

8. The method according to claim 1, wherein before the displaying, by the first device, a first interface, the method further comprises:

displaying, by the first device, a home screen, wherein the home screen comprises a first icon corresponding to a phone application; and the displaying, by the first device, a first interface comprises: displaying, by the first device, the first interface in response to an operation on the first icon.

9. The method according to claim 8, wherein when a fourth SIM card is configured in the first device, the method further comprises:

displaying, by the first device, a sixth interface, wherein the sixth interface comprises a third option and a navigation bar, and the third option corresponds to a default dialing card; and when the default dialing card is the first SIM card, in response to a sixth operation on the third option, displaying, by the first device, the second interface, and sending the dialing instruction to the second device to trigger the second device to send the session request to the fourth device.

10. The method according to claim 8, wherein when a fourth SIM card is configured in the first device, the method further comprises:

displaying, by the first device, a sixth interface, wherein the sixth interface comprises a third option and a navigation bar;

displaying, by the first device, a fifth window in response to an operation on the navigation bar, wherein the fifth window comprises the option of the first SIM card, the option of the second SIM card, and an option of the fourth SIM card;

in response to the operation on the option of the second SIM card, setting, by the first device, the second SIM card as a default dialing card, and displaying the sixth interface again; and in response to a sixth operation on the third option, displaying, by the first device, a fifth interface, and sending the dialing instruction to the third device to trigger the third device to send the session request to the fourth device.

11. The method according to claim 2, wherein after the displaying, by the first device, a second interface, the method further comprises:

displaying, by the first device, a seventh interface after a session is established between the second device and the fourth device;

receiving, by the first device, first call data sent by the second device, wherein the first call data is sent by the fourth device to the second device by using a mobile communication network;

playing, by the first device, voice data corresponding to the first call data; and sending, by the first device, second call data to the fourth device by using the second device.

12. An electronic device, wherein the electronic device comprises one or more processors and a memory, the memory is coupled to the processor, the memory is configured to store computer program code, the computer program code comprises computer instructions, and when the one or more processors execute the computer instructions, the one or more processors perform operations comprising:

displaying a first interface, wherein the first interface comprises a plurality of dialing options and a first number, the plurality of dialing options comprise an option of a first subscriber identity module (SIM) card and an option of a second SIM card, the first SIM card is configured in a second device, the second SIM card is configured in a third device, and the electronic device, the second device, and the third device belong to a same local area network;

in response to a first operation on the option of the first SIM card, displaying a second interface, and sending a dialing instruction to the second device to trigger the second device to send a session request to a fourth device, wherein a third SIM card corresponding to the first number is configured in the fourth device, and the second interface comprises the first number;

displaying a third interface, wherein the third interface comprises a dialing key and the first number;

after the second device exits the local area network, displaying a fourth window in the third interface in response to a second operation on the dialing key, wherein the fourth window comprises the option of the second SIM card and does not comprise the option of the first SIM card; and in response to an operation on the option of the second SIM card, displaying a fifth interface, and sending a dialing instruction to the third device to trigger the third device to send a session request to the fourth device.

13. A non-transitory computer storage medium, comprising computer instructions, wherein when the computer instructions are run on an electronic device, the electronic device is enabled to perform operations comprising:

displaying a first interface, wherein the first interface comprises a plurality of dialing options and a first number, the plurality of dialing options comprise an option of a first subscriber identity module (SIM) card and an option of a second SIM card, the first SIM card is configured in a second device, the second SIM card is configured in a third device, and the electronic device, the second device, and the third device belong to a same local area network;

in response to a first operation on the option of the first SIM card, displaying a second interface, and sending a dialing instruction to the second device to trigger the second device to send a session request to a fourth device, wherein a third SIM card corresponding to the first number is configured in the fourth device, and the second interface comprises the first number;

displaying a third interface, wherein the third interface comprises a dialing key and the first number;

after the second device exits the local area network, displaying a fourth window in the third interface in response to a second operation on the dialing key, wherein the fourth window comprises the option of the second SIM card and does not comprise the option of the first SIM card; and in response to an operation on the option of the second SIM card, displaying a fifth interface, and sending a dialing instruction to the third device to trigger the third device to send a session request to the fourth device.

* * * * *